US011113290B1

(12) United States Patent
Braziel et al.

(10) Patent No.: US 11,113,290 B1
(45) Date of Patent: Sep. 7, 2021

(54) INFORMATION VISUALIZATION DISPLAY USING ASSOCIATIVE CLUSTERED TILING AND TESSELLATION

(71) Applicants: Edward Russell Braziel, Lindale, TX (US); Eric Matthew Penner, Richmond, CA (US)

(72) Inventors: Edward Russell Braziel, Lindale, TX (US); Eric Matthew Penner, Richmond, CA (US)

(73) Assignee: CLUSTER COMMUNICATIONS, INC., Houston, TX (US)

(*) Notice: Subject to any disclaimer, the term of this patent is extended or adjusted under 35 U.S.C. 154(b) by 81 days.

(21) Appl. No.: 15/932,953

(22) Filed: May 29, 2018

(51) Int. Cl.
*G06F 17/00* (2019.01)
*G06F 16/2457* (2019.01)
*G06F 16/38* (2019.01)
*G06F 16/48* (2019.01)
*G06F 16/248* (2019.01)
*G06F 16/28* (2019.01)
*G06F 16/35* (2019.01)

(52) U.S. Cl.
CPC ...... *G06F 16/24578* (2019.01); *G06F 16/248* (2019.01); *G06F 16/287* (2019.01); *G06F 16/358* (2019.01); *G06F 16/38* (2019.01); *G06F 16/48* (2019.01)

(58) Field of Classification Search
CPC .... G06F 21/54; G06F 21/566; G06F 9/44521; G06F 2221/033; G06F 16/24578; G06F 16/248; G06F 16/287; G06F 16/358; G06F 16/38; G06F 16/48
See application file for complete search history.

(56) References Cited

U.S. PATENT DOCUMENTS

| 5,179,643 | A | 1/1993 | Homma |
| 5,806,079 | A | 9/1998 | Rivette |
| 6,671,680 | B1 | 12/2003 | Iwamoto |
| 6,804,394 | B1 * | 10/2004 | Hsu ..................... G06K 9/6253 382/113 |
| 7,028,036 | B2 | 4/2006 | Chickering |
| 7,246,128 | B2 | 7/2007 | Jordahl |
| 7,555,476 | B2 | 6/2009 | Holbrook |
| 7,966,328 | B2 | 6/2011 | Germeraad |
| 8,132,121 | B2 | 3/2012 | Risch |
| 8,543,573 | B2 | 9/2013 | MacPherson |

(Continued)

FOREIGN PATENT DOCUMENTS

| EP | 0864989 A2 | 9/1998 |
| WO | WO 02/095622 A2 | 11/2002 |

OTHER PUBLICATIONS

Juan A. Colmenares et al., Tessellation: Refactoring the OS Around Explicit Resource Containers with Continuous Adaption, DAC '13, Proceedings of the 50th Annual Automation Conference, Article No. 76, pp. 1-10, May 2013.*

(Continued)

*Primary Examiner* — Greta L Robinson
(74) *Attorney, Agent, or Firm* — Henry L. Smith, Jr.

(57) ABSTRACT

An exemplary embodiment includes a system for an information visualization engine designed to dynamically organize, via associative clustered tiling and tessellation, and then present instantly addressable content via any electronic user interface, but especially via mobile devices such as touch screen cellular phones, and tablets.

9 Claims, 37 Drawing Sheets

(56) References Cited

U.S. PATENT DOCUMENTS

| | | | |
|---|---|---|---|
| 9,183,285 B1 | 11/2015 | Brown | |
| 9,195,816 B2 | 11/2015 | Ferren | |
| 9,256,664 B2 | 2/2016 | Chakerian | |
| 9,454,785 B1 | 9/2016 | Hunter | |
| 9,465,891 B1 | 10/2016 | Kagan | |
| 9,483,546 B2 | 11/2016 | Erenrich | |
| 9,495,641 B2 | 11/2016 | Schmidt | |
| 2003/0231209 A1 | 12/2003 | Kappe | |
| 2008/0250007 A1 | 10/2008 | Masuyama | |
| 2013/0067367 A1 | 3/2013 | Torrens | |
| 2014/0089297 A1* | 3/2014 | Cardno | G06F 16/532 707/722 |
| 2014/0101580 A1 | 4/2014 | Shen | |
| 2015/0052165 A1 | 2/2015 | Velden | |
| 2015/0109338 A1* | 4/2015 | McKinnon | G06F 16/5866 345/633 |
| 2015/0339373 A1 | 11/2015 | Carlson | |
| 2016/0019270 A1* | 1/2016 | Jones | G06F 16/248 700/98 |
| 2016/0063097 A1 | 3/2016 | Brown | |
| 2016/0171764 A1* | 6/2016 | Chew | G06T 11/206 345/423 |
| 2016/0210534 A1 | 7/2016 | Padubrin | |
| 2019/0362029 A1* | 11/2019 | Huang | G06T 17/20 |

OTHER PUBLICATIONS

Qiang Du et al., Centroid Voronoi Tessellation based Algorithm for Vector Fields Visualization and Segmentation, VIS '04, Proceedings on the Conference on Visualization '04, pp. 43-50, Oct. 2004.*
Macskassy, Contextual Linking . . . Soc Anal Min 2011 1:355-375.
Blei et al, Latent Diricklet Allocation, J Machine Learning Research, 3(2003) 993-1022.
Sedig et al Interaction Design for Complex . . . Transactions on Human-Computer Interaction, v5, issue 2 Jun. 2013.
Mannor et al, Dynamic Abstraction in Reinforcement . . . Pro. of 21st Internet Conf on Machine Learning, 2004.
Ultsch et al. ESOM-Maps: tool for clustering . . . Mar. 17, 2005.
Venkasubramanya et al, Techniques for Organizing and Presenting Search . . . J Inform Sci and Tech 4(2)2007.
Klerkx et al, Using Information visualization, Proc Eigth Int Conf on IEEE, 2004.
Walczak Periscope:a system for adaptive 3D . . . Proc of Ninth Int Conf 3D Web Technology, Jan. 2004.
Kules et al. Catgorized Graphical Overviews . . . Inst for Systems Research 2004 TR2005-71,SIGHCI 2004 Proc.
Becks Benefits of Document Maps . . . Proc of 2002 ACM sympon Applied Computing, ACM2002.

* cited by examiner

Modal View 902

Florida Daily News

Huge Oil Reserves Found Near Miami

US Geological Survey annouces find of nearly 100 Bbbls

By Marcus Crassus

Lorem ipsum dolor sit amet, consectetur adipiscing elit. Integer pretium, lacus a dictum placerat, tortor mauris commodo elit, ullamcorper vestibulum massa felis lobortis risus. Integer risus arcu, tincidunt sed orci in, facilisis viverra erat. Integer tincidunt finibus consequat. Integer luctus laoreet consequat. In vel lorem at arcu imperdiet ultricies tempus eleifend ante. Etiam ultricies lorem neque, ut sodales augue porta in. Pellentesque aliquet, eros at fringilla finibus, eros erat ornare risus, tempus blandit nulla quam eu urna. Sed vel tincidunt leo. Integer viverra magna vel auctor tristique. Nam elementum magna ut ipsum porttitor, quis ultrices mi auctor.

Integer accumsan non nibh a tempor. Ut ullamcorper malesuada erat, nec dictum consequat vel. Nunc at sapien vel dui dapibus mollis nec viverra diam. Aenean sit amet feugiat risus. Nunc iaculis risus egestas ex mollis ornare. Aliquam ullamcorper, leo eu consectetur tempus, tortor lectus malesuada felis, eget venenatis lorem leo ac velit. Quisque ligula dolor, pretium vel scelerisque et, bibendum eu libero. Nulla vitae convallis nibh. Fusce sit amet pulvinar est. In a dui eu felis vehicula rhoncus sed pharetra urna. Donec ut odio erat. Integer sed elementum augue, id posuere lectus. Proin volutpat faucibus elit.

Duis pellentesque vel odio eu dictum. Vestibulum metus eros, pharetra quis maximus vel, sagittis id nibh. Fusce eros nulla, luctus malesuada mi vel, sodales lobortis lectus. Suspendisse in hendrerit augue. Maecenas maximus justo quis lacinia consequat. Curabitur imperdiet mauris vel purus euismod, a eleifend.

Surface View 901

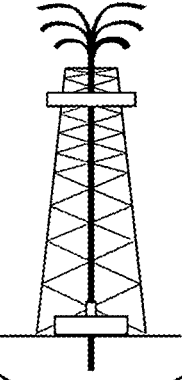

FD: Huge Reserves Found in Florida

FIG. 9

Cell Vectors 1301

|      | Cell 1 | Cell 2 | Cell 3 | Cell 4 | Cell 5 | Cell 6 |
|------|--------|--------|--------|--------|--------|--------|
| X    | 0.361  | 1.116  | 0.203  | 0.326  | 0.396  | 0.186  |
| Y    | 1.965  | 0.210  | 1.328  | 0.746  | 1.196  | 0.256  |
| Tile | 305    | 301    | 301    | 304    | 304    | 303    |

Distance Matrix 1302

|        | Cell 1 | Cell 2 | Cell 3 | Cell 4 | Cell 5 | Cell 6 |
|--------|--------|--------|--------|--------|--------|--------|
| Cell 1 | 0.00   | 1.91   | 0.65   | 1.21   | 0.77   | 1.71   |
| Cell 2 | 1.91   | 0.00   | 1.44   | 0.95   | 1.22   | 0.93   |
| Cell 3 | 0.65   | 1.44   | 0.00   | 0.59   | 0.23   | 1.07   |
| Cell 4 | 1.21   | 0.95   | 0.59   | 0.00   | 0.45   | 0.51   |
| Cell 5 | 0.77   | 1.22   | 0.23   | 0.45   | 0.00   | 0.96   |
| Cell 6 | 1.71   | 0.93   | 1.07   | 0.51   | 0.96   | 0.00   |

Relative Ranking Matrix 1303

|        | Cell 1 | Cell 2 | Cell 3 | Cell 4 | Cell 5 | Cell 6 |
|--------|--------|--------|--------|--------|--------|--------|
| Rank 1 | Cell 3 | Cell 6 | Cell 5 | Cell 5 | Cell 3 | Cell 4 |
| Rank 2 | Cell 5 | Cell 4 | Cell 4 | Cell 6 | Cell 4 | Cell 2 |
| Rank 3 | Cell 4 | Cell 5 | Cell 1 | Cell 3 | Cell 1 | Cell 5 |
| Rank 4 | Cell 6 | Cell 3 | Cell 6 | Cell 2 | Cell 6 | Cell 3 |
| Rank 5 | Cell 2 | Cell 1 | Cell 2 | Cell 1 | Cell 2 | Cell 1 |

FIG. 13A

|   | A | B | C | D | E | F | G | H | I | J |
|---|---|---|---|---|---|---|---|---|---|---|
| 1 |   | Tile | Cell Name | Keyword 1 | Keyword 2 | Keyword 3 | Keyword 4 | Keyword 5 | Keyword 6 | Keyword 7 |
| 2 | Cell 1 | 301 | MBVC3 | Export | Boiler | Pad | Bakken | Rail Car | Null | Null |
| 3 | Cell 2 | 305 | US_PI | Frac | Bakken | Export | HSA | Plastic | Null | Null |
| 4 | Cell 3 | 305 | INEOS | Hub | Trace | Y Grade | Formation | Import | Pad | Pump |
| 5 | Cell 4 | 304 | C3FWD | Flare | Henry Hub | HSA | Trace | OPEC | Null | Null |
| 6 | Cell 5 | 301 | MBIC4 | Compress | Export | Henry Hub | Frac | Boiler | Crude | Null |
| 7 | Cell 6 | 301 | CONC4 | Well | Import | Hub | Bakken | Flare | Trace | Null |
| 8 | Cell 7 | 305 | LPGEX | Boiler | Compress | Bakken | Flare | Frac | OPEC | Null |
| 9 | Cell 8 | 301 | C3ROT | Cooler | Hub | Y Grade | Formation | Plastic | Pad | Rail Car |
| 10 | Cell 9 | 301 | NYHRB | Plastic | Frac | Pump | Flare | Pad | Gasket | Rail Car |
| 11 | Cell 10 | 301 | MBNC4 | OPEC | EPA | Hub | Export | Boiler | PetChem | Rail Car |
| 12 | Cell 11 | 301 | CONNC | Well | Import | Flare | Pump | Rail Car | Formation | Boiler |
| 13 | Cell 12 | 301 | PROPG | Crude | Pump | OPEC | PetChem | Pipe | Flare | Trace |
| 14 | Cell 13 | 304 | PROPR | Crude | Plastic | Compress | Import | Henry Hub | PetChem | Well |
| 15 | Cell 14 | 301 | CUWTI | Cooler | Gasket | Trace | Plastic | Boiler | Pipe | Null |
| 16 | Cell 15 | 301 | MBC5+ | Hub | Y Grade | Henry Hub | Frac | Pad | Crude | Import |
| 17 | Cell 16 | 301 | CNC5+ | Bakken | Y Grade | Formation | Import | Export | Null | Null |
| 18 | Cell 17 | 302 | NGLCR | Plastic | Hub | Gasket | EPA | HSA | Well | Null |
| 19 | Cell 18 | 302 | GPNGL | HSA | Pad | PetChem | Gasket | Compress | Well | Null |
| 20 | Cell 19 | 301 | PRORG | PetChem | Hub | Pipe | Formation | Pad | EPA | Boiler |
| 21 | Cell 20 | 301 | CONC3 | Crude | HSA | Flare | Plastic | Pad | Null | Null |
| 22 | Cell 21 | 301 | NG-HH | Flare | Well | Rail Car | Pad | Pipe | Export | Null |
| 23 | Cell 22 | 301 | MBVC2 | Y Grade | EPA | Pump | Bakken | Frac | Pad | Formation |
| 24 | Cell 23 | 301 | CONEP | Rail Car | Pump | Trace | Y Grade | Compress | Bakken | Boiler |
| 25 | Cell 24 | 301 | SARC3 | Pipe | Crude | OPEC | EPA | Rail Car | Export | Frac |
| 26 | Cell 25 | 301 | NWEC3 | Pad | Frac | Pump | OPEC | Gasket | Null | Null |
| 27 | Cell 26 | 302 | PROST | Frac | Export | Henry Hub | Plastic | Gasket | Formation | Null |
| 28 | Cell 27 | 305 | PEMBI | Plastic | Trace | Frac | Rail Car | Pad | Cooler | Null |
| 29 | Cell 28 | 302 | CSTGR | Pump | EPA | OPEC | Compress | Pad | Y Grade | Flare |
| 30 | Cell 29 | 301 | C3EDM | Rail Car | Formation | Hub | Well | Compress | Bakken | Null |
| 31 | Cell 30 | 302 | C3TCR | Compress | Pad | Crude | Export | Pipe | Null | Null |
| 32 | Cell 31 | 302 | RBNEB | Pad | Well | Y Grade | Hub | OPEC | Trace | Null |
| 33 | Cell 32 | 303 | C3BUF | Flare | Boiler | Trace | Crude | Pump | Import | Null |
| 34 | Cell 33 | 304 | C3SFB | Well | Rail Car | Plastic | Henry Hub | Pump | Flare | Pipe |
| 35 | Cell 34 | 305 | PROTT | Y Grade | OPEC | Rail Car | Pipe | HSA | Pump | Export |
| 36 | Cell 35 | 304 | VANC3 | Formation | Boiler | Crude | Import | Pad | Null | Null |
| 37 | Cell 36 | 302 | C2SHC | Plastic | Pad | Pump | Gasket | Cooler | Y Grade | Rail Car |
| 38 | Cell 37 | 304 | C4SHC | Compress | Plastic | Trace | Crude | HSA | PetChem | Henry Hub |
| 39 | Cell 38 | 306 | NG-HH | Pipe | Compress | Hub | Y Grade | Pad | Frac | Henry Hub |
| 40 | Cell 39 | 303 | MBVC2 | EPA | Cooler | PetChem | Well | Henry Hub | Trace | Rail Car |
| 41 | Cell 40 | 301 | WLPOS | Bakken | Pipe | Compress | Frac | Flare | OPEC | Hub |
| 42 | Cell 41 | 305 | YTC5+ | Compress | OPEC | Pipe | PetChem | EPA | Import | Null |
| 43 | Cell 42 | 304 | MUC5+ | Flare | EPA | Export | Well | Henry Hub | Import | Null |
| 44 | Cell 43 | 302 | NGLH2 | Compress | Rail Car | HSA | Frac | Hub | Null | Null |
| 45 | Cell 44 | 304 | MUMPR | Gasket | Pump | Henry Hub | Plastic | Boiler | Cooler | Null |
| 46 | Cell 45 | 303 | CRGSR | Pad | Plastic | Trace | OPEC | Formation | Null | Null |
| 47 | Cell 46 | 306 | NWOCB | Cooler | Plastic | Trace | Gasket | Import | Null | Null |
| 48 | Cell 47 | 303 | KATET | Bakken | Pad | Gasket | Export | Hub | Compress | Flare |
| 49 | Cell 48 | 304 | BAR07 | Export | Gasket | Pipe | OPEC | Crude | Well | Bakken |
| 50 | Cell 49 | 302 | CSTGR | Flare | Trace | Gasket | Y Grade | Henry Hub | Well | Null |
| 51 | Cell 50 | 306 | C8NIV | Frac | Bakken | OPEC | Pump | HSA | Null | Null |
| 52 | Cell 51 | 301 | C3EDM | Bakken | Export | Well | Boiler | Gasket | Henry Hub | Null |
| 53 | Cell 52 | 301 | RBNEB | Pipe | Y Grade | Well | Pump | Pad | EPA | Null |
| 54 | Cell 53 | 301 | C5MFD | Formation | Well | Import | Henry Hub | EPA | Rail Car | Null |
| 55 | Cell 54 | 301 | YTC2+ | Y Grade | Import | Plastic | Bakken | OPEC | Cooler | Null |
| 56 | Cell 55 | 301 | RBNTW | Rail Car | Hub | Pad | Boiler | Frac | Trace | Null |

FIG. 20  ← 2000

|  | A | B | C | D | E | F | G | H | I | J |
|---|---|---|---|---|---|---|---|---|---|---|
| 1 |  | MBVC3 | US_PI | INEOS | C3FWD | MBIC4 | CONC4 | LPGEX | C3ROT | NYHRB |
| 2 | MBVC3 | 0.133 | 0.245 | 0.286 | 0.321 | 0.242 | 0.283 | 0.242 | 0.250 | 0.250 |
| 3 | US_PI | 0.245 | 0.110 | 0.321 | 0.262 | 0.248 | 0.283 | 0.248 | 0.280 | 0.245 |
| 4 | INEOS | 0.286 | 0.321 | 0.061 | 0.290 | 0.321 | 0.211 | 0.321 | 0.166 | 0.252 |
| 5 | C3FWD | 0.321 | 0.262 | 0.290 | 0.146 | 0.283 | 0.254 | 0.274 | 0.321 | 0.286 |
| 6 | MBIC4 | 0.242 | 0.248 | 0.321 | 0.283 | 0.083 | 0.321 | 0.207 | 0.321 | 0.286 |
| 7 | CONC4 | 0.283 | 0.283 | 0.211 | 0.254 | 0.321 | 0.102 | 0.248 | 0.283 | 0.286 |
| 8 | LPGEX | 0.242 | 0.248 | 0.321 | 0.274 | 0.207 | 0.248 | 0.122 | 0.321 | 0.250 |
| 9 | C3ROT | 0.250 | 0.280 | 0.166 | 0.321 | 0.321 | 0.283 | 0.321 | 0.024 | 0.209 |
| 10 | NYHRB | 0.250 | 0.245 | 0.252 | 0.286 | 0.286 | 0.286 | 0.250 | 0.209 | 0.065 |
| 11 | MBNC4 | 0.207 | 0.283 | 0.283 | 0.309 | 0.242 | 0.283 | 0.268 | 0.248 | 0.286 |
| 12 | CONNC | 0.245 | 0.321 | 0.199 | 0.286 | 0.280 | 0.209 | 0.245 | 0.237 | 0.217 |
| 13 | PROPG | 0.321 | 0.321 | 0.257 | 0.243 | 0.273 | 0.254 | 0.274 | 0.321 | 0.252 |
| 14 | PROPR | 0.321 | 0.280 | 0.280 | 0.283 | 0.197 | 0.245 | 0.283 | 0.280 | 0.280 |
| 15 | CUWTI | 0.280 | 0.280 | 0.290 | 0.290 | 0.280 | 0.290 | 0.280 | 0.214 | 0.239 |
| 16 | MBC5+ | 0.286 | 0.286 | 0.174 | 0.283 | 0.199 | 0.242 | 0.286 | 0.214 | 0.250 |
| 17 | CNC5+ | 0.245 | 0.245 | 0.199 | 0.321 | 0.283 | 0.242 | 0.283 | 0.240 | 0.321 |
| 18 | NGLCR | 0.321 | 0.221 | 0.283 | 0.262 | 0.321 | 0.248 | 0.321 | 0.242 | 0.239 |
| 19 | GPNGL | 0.286 | 0.262 | 0.286 | 0.262 | 0.283 | 0.286 | 0.283 | 0.286 | 0.245 |
| 20 | PRORG | 0.245 | 0.321 | 0.199 | 0.321 | 0.280 | 0.283 | 0.280 | 0.199 | 0.286 |
| 21 | CONC3 | 0.286 | 0.221 | 0.286 | 0.227 | 0.273 | 0.286 | 0.286 | 0.245 | 0.209 |
| 22 | NG-HH | 0.212 | 0.283 | 0.286 | 0.286 | 0.283 | 0.250 | 0.286 | 0.250 | 0.215 |
| 23 | MBVC2 | 0.248 | 0.248 | 0.171 | 0.321 | 0.286 | 0.283 | 0.248 | 0.204 | 0.217 |
| 24 | CONEP | 0.207 | 0.283 | 0.223 | 0.290 | 0.242 | 0.252 | 0.204 | 0.252 | 0.252 |
| 25 | CONEP | 0.248 | 0.248 | 0.321 | 0.309 | 0.199 | 0.321 | 0.274 | 0.286 | 0.250 |
| 26 | SARC3 | 0.286 | 0.286 | 0.252 | 0.309 | 0.286 | 0.321 | 0.274 | 0.286 | 0.176 |
| 27 | NWEC3 | 0.283 | 0.207 | 0.273 | 0.283 | 0.210 | 0.321 | 0.286 | 0.232 | 0.204 |
| 28 | PROST | 0.250 | 0.245 | 0.254 | 0.290 | 0.286 | 0.290 | 0.286 | 0.143 | 0.174 |
| 29 | PEMBI | 0.286 | 0.321 | 0.219 | 0.274 | 0.283 | 0.286 | 0.236 | 0.252 | 0.217 |
| 30 | CSTGR | 0.248 | 0.283 | 0.235 | 0.321 | 0.283 | 0.210 | 0.245 | 0.199 | 0.286 |
| 31 | C3EDM | 0.248 | 0.283 | 0.286 | 0.321 | 0.197 | 0.321 | 0.283 | 0.286 | 0.286 |
| 32 | C3TCR | 0.286 | 0.321 | 0.183 | 0.278 | 0.321 | 0.216 | 0.309 | 0.214 | 0.286 |
| 33 | RBNEB | 0.280 | 0.321 | 0.216 | 0.254 | 0.232 | 0.213 | 0.245 | 0.321 | 0.252 |
| 34 | C3BUF | 0.286 | 0.280 | 0.288 | 0.248 | 0.283 | 0.250 | 0.286 | 0.245 | 0.176 |
| 35 | C3SFB | 0.248 | 0.224 | 0.255 | 0.250 | 0.283 | 0.321 | 0.309 | 0.252 | 0.252 |
| 36 | PROTT | 0.245 | 0.321 | 0.196 | 0.321 | 0.232 | 0.280 | 0.280 | 0.237 | 0.286 |
| 37 | VANC3 | 0.250 | 0.280 | 0.219 | 0.321 | 0.321 | 0.321 | 0.321 | 0.110 | 0.135 |
| 38 | C2SHC | 0.321 | 0.221 | 0.290 | 0.193 | 0.197 | 0.290 | 0.283 | 0.280 | 0.280 |
| 39 | C4SHC | 0.286 | 0.286 | 0.214 | 0.283 | 0.210 | 0.283 | 0.248 | 0.214 | 0.250 |
| 40 | NG-HH | 0.286 | 0.321 | 0.290 | 0.252 | 0.283 | 0.254 | 0.321 | 0.219 | 0.286 |
| 41 | MBVC2 | 0.283 | 0.248 | 0.283 | 0.274 | 0.248 | 0.210 | 0.163 | 0.283 | 0.250 |
| 42 | YTC5+ | 0.321 | 0.321 | 0.280 | 0.309 | 0.283 | 0.280 | 0.271 | 0.321 | 0.321 |
| 43 | MUC5+ | 0.283 | 0.283 | 0.280 | 0.248 | 0.245 | 0.209 | 0.286 | 0.321 | 0.286 |
| 44 | NGLH2 | 0.286 | 0.227 | 0.283 | 0.262 | 0.248 | 0.283 | 0.248 | 0.248 | 0.250 |
| 45 | MUMPR | 0.280 | 0.280 | 0.288 | 0.283 | 0.242 | 0.321 | 0.280 | 0.214 | 0.206 |
| 46 | CRG5R | 0.286 | 0.280 | 0.206 | 0.278 | 0.321 | 0.290 | 0.309 | 0.196 | 0.245 |
| 47 | NWOC8 | 0.321 | 0.280 | 0.249 | 0.290 | 0.321 | 0.249 | 0.321 | 0.214 | 0.239 |
| 48 | KATET | 0.210 | 0.245 | 0.248 | 0.286 | 0.245 | 0.210 | 0.210 | 0.248 | 0.209 |
| 49 | BAR07 | 0.245 | 0.245 | 0.321 | 0.309 | 0.235 | 0.248 | 0.271 | 0.321 | 0.280 |
| 50 | CSTGR | 0.321 | 0.321 | 0.257 | 0.216 | 0.283 | 0.219 | 0.286 | 0.288 | 0.245 |
| 51 | C8NIV | 0.283 | 0.189 | 0.288 | 0.250 | 0.286 | 0.283 | 0.236 | 0.321 | 0.252 |
| 52 | C3EDM | 0.204 | 0.245 | 0.321 | 0.283 | 0.204 | 0.248 | 0.242 | 0.321 | 0.280 |
| 53 | RBNEB | 0.286 | 0.321 | 0.219 | 0.321 | 0.321 | 0.286 | 0.321 | 0.252 | 0.252 |
| 54 | C5MFD | 0.286 | 0.321 | 0.232 | 0.283 | 0.283 | 0.245 | 0.321 | 0.237 | 0.286 |
| 55 | YTC2+ | 0.283 | 0.242 | 0.247 | 0.309 | 0.321 | 0.242 | 0.271 | 0.181 | 0.280 |
| 56 | RBNTW | 0.209 | 0.286 | 0.216 | 0.290 | 0.245 | 0.252 | 0.245 | 0.212 | 0.215 |

FIG. 21A ← 2100

|   | A | B | C | D | E | F | G | H | I | J |
|---|---|---|---|---|---|---|---|---|---|---|
| 1 |   | MBVC3 | US_PI | INEOS | C3FWD | MBIC4 | CONC4 | LPGEX | C3ROT | NYHRB |
| 2 | Rank 1 | CONEP | C8NIV | CNC5+ | C4SHC | LPGEX | C3BUF | CONEP | INEOS | NWEC3 |
| 3 | Rank 2 | MBNC4 | NGLCR | RBNEB | CSTGR | PROPR | MUC5+ | WLPOS | C3EDM | CONC3 |
| 4 | Rank 3 | RBNTW | CONC3 | MBC5+ | CONC3 | C4SHC | RBNEB | C8NIV | C2SHC | PROST |
| 5 | Rank 4 | C3EDM | PROST | CRGSR | C8NIV | MBC5+ | CSTGR | MBVC3 | CRGSR | C3SFB |
| 6 | Rank 5 | LPGEX | C4SHC | C3ROT | PROPG | PROST | CONNC | MBIC4 | PEMBI | C2SHC |
| 7 | Rank 6 | NG-HH | NGLH2 | MBVC2 | PROTT | C3TCR | C3EDM | KATET | YTC2+ | PEMBI |
| 8 | Rank 7 | KATET | YTC2+ | CONNC | US_PI | C3EDM | YTC2+ | CSTGR | RBNEB | CSTGR |
| 9 | Rank 8 | US_PI | PROTT | VANC3 | C3BUF | MBVC3 | INEOS | C3EDM | MBVC2 | MUMPR |
| 10 | Rank 9 | MBIC4 | MBVC3 | CONC4 | NGLH2 | SARC3 | WLPOS | C3BUF | NW0C8 | KATET |
| 11 | Rank 10 | CNC5+ | PEMBI | C3BUF | MBVC2 | NG-HH | KATET | C3EDM | PRORG | C3ROT |
| 12 | Rank 11 | VANC3 | C3FWD | PRORG | MUC5+ | C3BUF | C3FWD | RBNTW | PROST | US_PI |
| 13 | Rank 12 | PROTT | CNC5+ | CSTGR | CRGSR | VANC3 | CNC5+ | NGLH2 | MBC5+ | C8NIV |
| 14 | Rank 13 | C3TCR | LPGEX | CONEP | GPNGL | MBNC4 | LPGEX | C3FWD | RBNTW | RBNTW |
| 15 | Rank 14 | CONNC | C3EDM | C3EDM | CONC4 | BAR07 | NW0C8 | CONC4 | NYHRB | CONNC |
| 16 | Rank 15 | SARC3 | SARC3 | C5MFD | LPGEX | CONEP | MBC5+ | US_PI | CUWTI | NG-HH |
| 17 | Rank 16 | BAR07 | BAR07 | YTC2+ | C3SFB | MUMPR | C5MFD | CONNC | CNC5+ | CRGSR |
| 18 | Rank 17 | PRORG | NYHRB | RBNTW | RBNEB | RBNTW | PROPG | MBNC4 | MBVC2 | NW0C8 |
| 19 | Rank 18 | PEMBI | MBIC4 | NG-HH | NGLCR | NGLH2 | PROPR | NWEC3 | MUMPR | GPNGL |
| 20 | Rank 19 | C3EDM | WLPOS | RBNEB | WLPOS | US_PI | BAR07 | YTC2+ | NG-HH | MBVC2 |
| 21 | Rank 20 | MBVC2 | MBVC2 | NWEC3 | C5MFD | MUC5+ | C8NIV | YTC5+ | CONNC | CSTGR |
| 22 | Rank 21 | C8NIV | KATET | C2SHC | CSTGR | WLPOS | C3EDM | MBVC2 | VANC3 | CUWTI |
| 23 | Rank 22 | C2SHC | GPNGL | NW0C8 | MUMPR | KATET | CONEP | NG-HH | NGLH2 | NGLCR |
| 24 | Rank 23 | NYHRB | CRGSR | PROPG | NW0C8 | CONC3 | NGLCR | NYHRB | CONC3 | LPGEX |
| 25 | Rank 24 | C3ROT | MUMPR | PEMBI | MBIC4 | C3FWD | MBVC2 | PROPG | C5MFD | PROPG |
| 26 | Rank 25 | MUMPR | NW0C8 | PROTT | PROST | PROPG | RBNTW | MUMPR | MBNC4 | C3BUF |
| 27 | Rank 26 | C3BUF | C3TCR | MUC5+ | YTC5+ | C8NIV | C3SFB | BAR07 | NGLCR | NGLH2 |
| 28 | Rank 27 | MUC5+ | C2SHC | NGLH2 | PROPR | CSTGR | NGLH2 | CNC5+ | MBVC3 | MBVC3 |
| 29 | Rank 28 | CONC4 | MUC5+ | CSTGR | NG-HH | C5MFD | NG-HH | C3TCR | PROTT | PROTT |
| 30 | Rank 29 | CRGSR | CONC4 | PROST | C3EDM | CNC5+ | YTC5+ | VANC3 | C3SFB | INEOS |
| 31 | Rank 30 | NWEC3 | PROPR | YTC5+ | CUWTI | GPNGL | MBVC3 | GPNGL | RBNEB | WLPOS |
| 32 | Rank 31 | YTC2+ | NG-HH | KATET | MBC5+ | NG-HH | VANC3 | SARC3 | CSTGR | SARC3 |
| 33 | Rank 32 | WLPOS | C3ROT | NYHRB | NWEC3 | NWEC3 | MBNC4 | CSTGR | CONEP | RBNEB |
| 34 | Rank 33 | NGLH2 | NWEC3 | PROPR | YTC2+ | MBVC2 | US_PI | CUWTI | NG-HH | CONEP |
| 35 | Rank 34 | INEOS | MBNC4 | MBNC4 | INEOS | CONNC | MBVC2 | PRORG | US_PI | MBC5+ |
| 36 | Rank 35 | CUWTI | C3EDM | C3FWD | CONNC | C3EDM | C3ROT | C4SHC | KATET | NG-HH |
| 37 | Rank 36 | PROST | C3SFB | C8NIV | NG-HH | YTC5+ | RBNEB | PROPR | C4SHC | C3FWD |
| 38 | Rank 37 | RBNEB | CUWTI | WLPOS | SARC3 | CUWTI | PRORG | CONC3 | PROPR | C4SHC |
| 39 | Rank 38 | MBVC2 | CONEP | NGLCR | RBNTW | PRORG | NG-HH | PEMBI | CONC4 | C3EDM |
| 40 | Rank 39 | RBNEB | RBNTW | C3TCR | PEMBI | PROTT | CRGSR | MUC5+ | NWEC3 | PROPR |
| 41 | Rank 40 | C5MFD | NG-HH | MBVC2 | BAR07 | C3SFB | CUWTI | PROST | WLPOS | YTC2+ |
| 42 | Rank 41 | CONC3 | MBC5+ | MUMPR | CONEP | CSTGR | CONC3 | NG-HH | CSTGR | RBNEB |
| 43 | Rank 42 | CSTGR | PROPG | CUWTI | MBNC4 | MBVC2 | C4SHC | C3SFB | C3TCR | MBVC2 |
| 44 | Rank 43 | GPNGL | YTC5+ | CONC3 | NYHRB | PEMBI | CSTGR | MBC5+ | SARC3 | C3TCR |
| 45 | Rank 44 | C3SFB | CSTGR | C4SHC | KATET | NYHRB | GPNGL | RBNEB | GPNGL | BAR07 |
| 46 | Rank 45 | NG-HH | INEOS | MBVC3 | PRORG | RBNEB | PEMBI | PROTT | MBIC4 | CONC4 |
| 47 | Rank 46 | MBC5+ | CONNC | GPNGL | VANC3 | INEOS | NYHRB | CRGSR | PROPG | MBNC4 |
| 48 | Rank 47 | C3FWD | PRORG | NG-HH | RBNEB | C3ROT | C2SHC | C2SHC | YTC5+ | MUC5+ |
| 49 | Rank 48 | PROPG | CSTGR | C3SFB | MBVC3 | NGLCR | MBIC4 | RBNEB | C3FWD | C5MFD |
| 50 | Rank 49 | PROPR | RBNEB | US_PI | C3ROT | RBNEB | SARC3 | INEOS | LPGEX | MBIC4 |
| 51 | Rank 50 | NGLCR | C3BUF | MBIC4 | CNC5+ | C2SHC | C3TCR | C3ROT | C3BUF | VANC3 |
| 52 | Rank 51 | C4SHC | VANC3 | LPGEX | MBVC2 | NW0C8 | NWEC3 | NGLCR | BAR07 | PRORG |
| 53 | Rank 52 | YTC5+ | MBVC2 | SARC3 | C3EDM | CONC4 | PROST | NW0C8 | C3EDM | C3EDM |
| 54 | Rank 53 | NW0C8 | RBNEB | BAR07 | C3TCR | CRGSR | PROTT | MBVC2 | MUC5+ | YTC5+ |
| 55 | Rank 54 | CSTGR | C5MFD | C3EDM | C2SHC | YTC2+ | MUMPR | C5MFD | C8NIV | CNC5+ |

Table 2202 (top) and Table 2203 (bottom):

Top grid (2202), rows 1–16, columns A–O:

| | A | B | C | D | E | F | G | H | I | J | K | L | M | N | O |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 |
| 3 | 0 | 0 | 0 | 0 | NG-HH | 0 | 0 | LPGEX | LPGEX | 0 | 0 | 0 | 0 | 0 | 0 |
| 4 | 0 | 0 | 0 | 0 | NG-HH | 0 | C8NIV | LPGEX | LPGEX | 0 | 0 | 0 | 0 | 0 | 0 |
| 5 | 0 | 0 | 0 | 0 | NG-HH | WLPOS | C8NIV | NWEC3 | KATET | KATET | KATET | C3EDM | 0 | 0 | 0 |
| 6 | 0 | 0 | 0 | PROST | PROST | NYHRB | C8NIV | US_PI | US_PI | NGLCR | NGLCR | CSMFD | 0 | 0 | 0 |
| 7 | 0 | 0 | 0 | C4SHC | MBIC4 | C3ROT | YTC2+ | US_PI | US_PI | NGLH2 | NGLH2 | PRORG | 0 | 0 | 0 |
| 8 | 0 | 0 | 0 | C4SHC | C3EDM | MBVC2 | CNC5+ | INEOS | INEOS | MBCS+ | RBNTW | RBNEB | BAR07 | 0 | 0 |
| 9 | 0 | 0 | 0 | CUWTI | CONC4 | CONEP | MBVC3 | INEOS | INEOS | RBNEB | RBNEB | PROPG | BAR07 | 0 | 0 |
| 10 | 0 | 0 | 0 | MUMPR | CONNC | PROTT | PROTT | C3FWD | CRGSR | CRGSR | CRGSR | C3TCR | C3TCR | 0 | 0 |
| 11 | 0 | 0 | 0 | MUMPR | MBNC4 | PROTT | PROTT | C3FWD | NWOC8 | PEMBI | PEMBI | CSTGR | CSTGR | 0 | 0 |
| 12 | 0 | 0 | GPNGL | GPNGL | VANC3 | C3BUF | C3BUF | C3BUF | NWOC8 | PEMBI | PEMBI | CONC3 | 0 | 0 | 0 |
| 13 | 0 | 0 | YTC5+ | YTC5+ | VANC3 | MUC5+ | C3SFB | PROPR | NWOC8 | C2SHC | C2SHC | CSTGR | CSTGR | 0 | 0 |
| 14 | 0 | 0 | YTC5+ | YTC5+ | SARC3 | MUC5+ | C3SFB | PROPR | MBVC2 | MBVC2 | MBVC2 | 0 | 0 | 0 | 0 |
| 15 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 |

Bottom grid (2203), rows 1–16, columns A–O:

| | A | B | C | D | E | F | G | H | I | J | K | L | M | N | O |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | VANC3 | 0 | 0 | 0 | 0 | 0 | 0 | 0 |
| 4 | 0 | 0 | 0 | 0 | 0 | C3TCR | C3TCR | VANC3 | 0 | NG-HH | YTC5+ | YTC5+ | 0 | 0 | 0 |
| 5 | 0 | 0 | 0 | 0 | PROTT | PROTT | SARC3 | BAR07 | C3EDM | CONEP | NG-HH | YTC5+ | YTC5+ | 0 | 0 |
| 6 | 0 | 0 | 0 | 0 | PROTT | PROTT | C8NIV | BAR07 | MBVC3 | RBNTW | NG-HH | CSTGR | CSTGR | 0 | 0 |
| 7 | 0 | 0 | 0 | 0 | MUMPR | NYHRB | C8NIV | PROPG | MBIC4 | MBCS+ | RBNEB | RBNEB | RBNEB | 0 | 0 |
| 8 | 0 | 0 | 0 | 0 | MUMPR | NWEC3 | C8NIV | CONC3 | C3FWD | INEOS | INEOS | CRGSR | CRGSR | CRGSR | 0 |
| 9 | 0 | 0 | MBVC2 | LPGEX | LPGEX | US_PI | US_PI | C3FWD | INEOS | INEOS | CONC4 | YTC2+ | CNC5+ | 0 | 0 |
| 10 | 0 | 0 | 0 | LPGEX | LPGEX | US_PI | US_PI | C4SHC | C3BUF | C3BUF | C3BUF | CUWTI | 0 | 0 | 0 |
| 11 | 0 | 0 | 0 | C3EDM | WLPOS | NGLH2 | NGLH2 | C4SHC | PROPR | MUC5+ | CSTGR | CSTGR | 0 | 0 | 0 |
| 12 | 0 | 0 | 0 | C3ROT | NGLCR | NGLCR | GPNGL | GPNGL | PROPR | MUC5+ | MBVC2 | MBVC2 | MBVC2 | 0 | 0 |
| 13 | 0 | 0 | PEMBI | PEMBI | C3SFB | CONNC | NG-HH | MBNC4 | CSMFD | PROST | PROST | NWOC8 | 0 | 0 | 0 |
| 14 | 0 | 0 | PEMBI | PEMBI | C3SFB | C2SHC | C2SHC | PRORG | KATET | KATET | KATET | NWOC8 | 0 | 0 | 0 |
| 15 | 0 | 0 | 0 | 0 | 0 | 0 | 0 | 0 | 0 | 0 | 0 | NWOC8 | 0 | 0 | 0 |
| 16 | 0 | 0 | 0 | 0 | 0 | 0 | 0 | 0 | 0 | 0 | 0 | 0 | 0 | 0 | 0 |

FIG. 22B

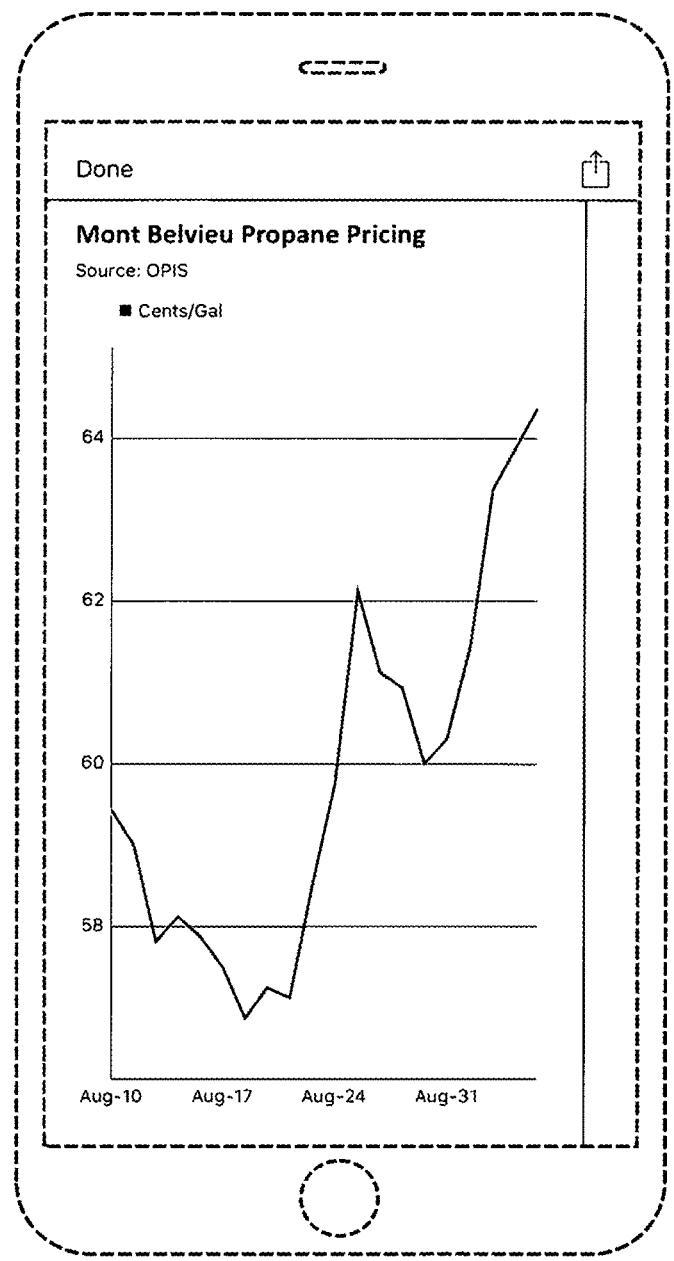
FIG. 24B  ↖— 2401

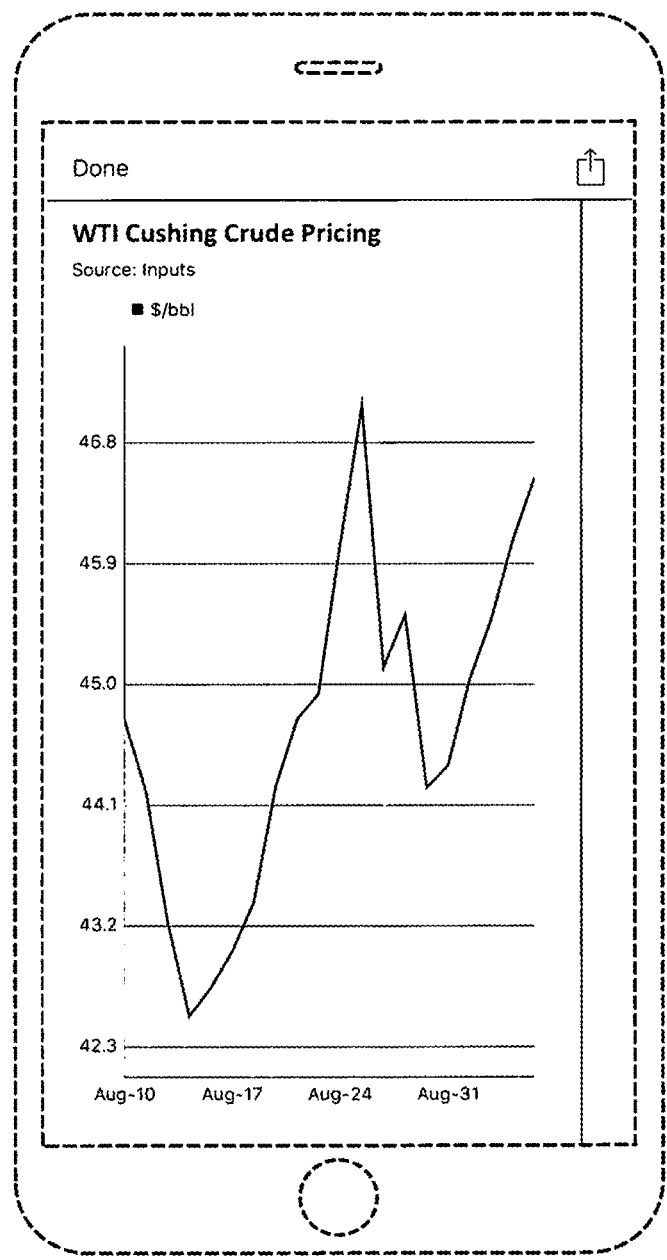
FIG. 24C     ← 2402

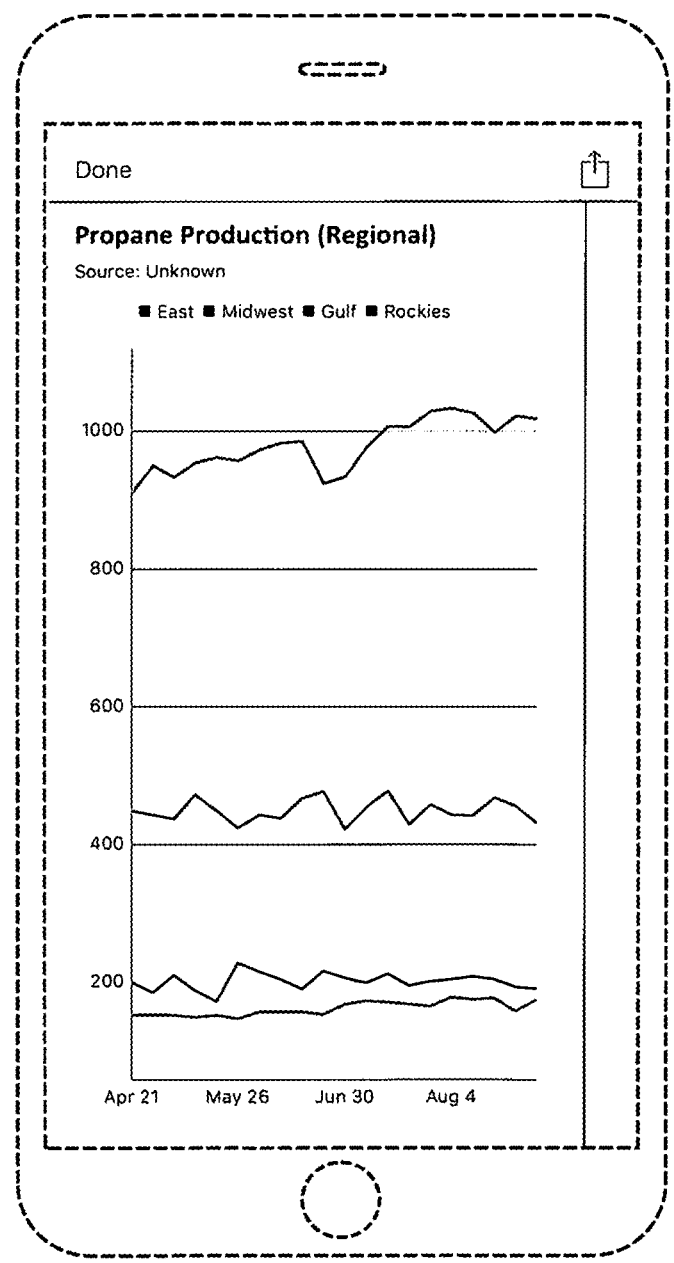
FIG. 24D  ↖—— 2403

INFORMATION VISUALIZATION DISPLAY USING ASSOCIATIVE CLUSTERED TILING AND TESSELLATION

CROSS REFERENCE TO RELATED APPLICATIONS

None

STATEMENT REGARDING FEDERALLY SPONSORED RESEARCH AND DEVELOPMENT

None

BACKGROUND AND TECHNICAL FIELD

One useful embodiment or variation of the invention relates to the following field, although the invention may also relate to other fields and uses. The invention may have various embodiments and variations. The field is a system and method to display on a smartphone constantly changing and updated data from a particular subject field, displayed in certain display groupings. The technical field of the invention is the display of related data in a visual manner.

Today the amount and specificity of the information that we have access to is unprecedented. Inquiries once requiring a lengthy trip to the library or a long wait for the next edition of the local newspaper can now be resolved in seconds using a wide range of internet-based technologies and products. Unfortunately, the typical manner in which collections of information are electronically presented fails to provide us with a sense of the interconnection between those pieces of information. The suppression of this sense of interrelation is a holdover from the classical linearized presentation style mandated by the limitations of producing physical media (e.g., printed documents). A linearized presentation format has been adopted almost wholesale by electronic media platforms, even though electronic display has no such physical constraints.

This sense of interconnectivity is vital as it provides us with a roadmap of how to explore a topic in search of greater understanding. Having a roadmap is especially helpful when we, as we so often do, use a few keywords to find an entry point into a topic and hope that the information we are truly interested in can be found from there. Accordingly, there is a need for a method by which information can be electronically organized and presented which provides a more complete sense of the connection and interrelatedness between collections of data, allowing viewers to easily navigate their own way to a fuller understanding of a topic. In particular, this method should take full advantage of the capabilities of electronic user interfaces by breaking away from the traditional linear presentation style and instead presenting the user a spatially dimensioned "roadmap" of the data. This roadmap will allow users to explore data in whichever way they choose and it obeys one fundamental rule—collections of data which are closely related should be displayed as closely as possible to one another.

The following text contains a number of technical terms and references to software packages that may be unfamiliar to those who have only a cursory knowledge of the financial, and software engineering industries. Definitions for such terms and further details about such software packages have been provided in the Definitions section. Note that FIGS. 20 and 21 contain screen shots of excel workbooks containing the actual output of, and implementation of, the invention. Also note that FIG. 23 and FIG. 24 contain photographs; these are necessary as they are screenshots of an actual implementation of the invention discussed herein and as such are included in their full and unaltered condition.

BACKGROUND—DESCRIPTION OF RELATED ART

Typical of the art related to widely useful embodiments and variations of the present invention is the following patent. The following example of related art and its limitations are illustrative and not exclusive. Other limitations of the related art will become apparent to those skilled in the art upon study of the specification and drawings of this application. Other embodiments and variations of the invention may relate to other arts and uses.

U.S. Pat. No. 9,183,285, Nov. 10, 2015 to Fred A. Brown et al describes a data clustering system and method.

SUMMARY

One of the widely useful embodiments and variations of the present invention may be summarized as follows. This embodiment or variation is exemplary only. Other embodiments and variations will become apparent to those skilled in the art upon study of the specification and drawings of this application. Other embodiments and variations of the invention may relate to other arts and have usefulness in those arts. The present invention includes, but is not limited to, a system for an information visualization engine designed to dynamically organize, via associative clustered tiling and tessellation, and then present instantly addressable content via any electronic user interface, but especially via mobile devices such as touch screen cellular phones, and tablets.

Purposes and Advantages

The invention may have various embodiments and variations and may be useful in different fields and for different purposes. The purposes and advantages of the more widely useful embodiments or variations of the present invention include, but are not limited to, the following, and may include other purposes and advantages in different fields of use not listed herein.

The invention organizes and displays multiple relationships or linkages between data items simultaneously in a format that makes those relationships more easily understandable than more traditional methods of organizing and presenting data. More traditional information displays in common use typically display information such that data items most related to a topic of interest are listed linearly, such that the first item is most related to the topic of interest, then the second most related item is listed, and so on. For example, the display of search engine results lists the items in the order of their relationship to the searched topic, with different search engines using various algorithms to establish the order of relationships. In contrast, the present invention depicts the relationships of each data item to all other data items for a particular topic of interest in a single grid-based spatial display.

Continuing with the search engine example, consider that a search for topic A (the data target) retrieves five search result items. Typically they are presented in the order of their relationship to topic A:

| | |
|---|---|
| A | Search topic |
| B | Most closely related to A |
| C | Next most closely related to A |
| E | Next most closely related to A |
| D | Next most closely related to A |
| F | Least closely related to A |

Instead consider the grid-based format used to organize and present the data by the current invention. In this grid, the search topic data target A is placed in the center, Row 0, Column 0. B is most closely related to A, and is placed in the position adjacent and to the right of A. C is next most closely related to A, and is placed in the position adjacent and below A. Positions adjacent to A are reserved for those item most closely related A.

But D is more closely related to B than it is A. So it is placed in the position adjacent and to the right of B, showing the strength of the relationship between B and D. E is closely related to A, but is also related to B and C, so it is placed at the position that "touches" A, B, and C. On the other hand, F is most closely related to E and D, so it is placed in the position which "touches" both of those related items.

| | Col. −2 | Col. −1 | Col. 0 | Col. +1 | Col. +2 |
|---|---|---|---|---|---|
| Row −1 | — | — | — | — | — |
| Row 0 | — | — | A | B | D |
| Row +1 | — | — | C | E | F |

If there were other items, they too would be placed in such a way within the grid that they are nearest to the items they are most closely related to, not necessarily in a way that they are most closely related to the initial search topic.

Therefore, the invention depicts all the relationships between data items, not just the relationship between all data items and a single data target.

Not only is the grid scrollable up and down, it is scrollable left-to-right, or any angle in any direction, allowing the relationships in and between all data items to be understood and interpreted by the user.

At any time the user can select a different search topic, and the entire grid can be rebuilt around that central theme, with items placed based on their relationship with the new theme.

REFERENCE NUMERALS IN DRAWINGS

100 Illustrative system for an information visualization engine
102 Data
104 Structured Data
106 Unstructured Data
110 Initial Preprocessor
112 Data Division Unit
114 Cell Construction Unit
115 Proprietary Data
120 Metadata Preprocessor
121 Metadata Tag Extraction Unit
122 Metadata Tag Addition/Removal Unit
123 Statistical Analysis Unit
130 Display Data Preprocessor
131 Display Data Division Unit
132 Surface View Unit
133 Modal View Unit
134 Tessellation Scheme Designation Unit
135 Tile Assignment Unit
140 Cell Ranking Unit
141 Distance Calculation Unit
142 Augmented Distance Unit
143 Exhaustive Partial Orderings/Rankings Unit
150 Associative Clustered Tiling Unit
151 Centroid Selection Unit
152 Pre-Tiling Area Designation Unit
153 Tessellation Construction Unit
155 User Direction
160 Archived Data
170 User/Proprietary Data
180 Tessellated Data
200 Basic tessellation and numbering system of a polyomino based tessellation scheme.
301 Trivial tile in a polyomino based tessellation scheme
302 Double wide tile in a polyomino based tessellation scheme
303 Triple wide tile in a polyomino based tessellation scheme
304 Double tall tile in a polyomino based tessellation scheme
305 2 by 2 tile in a polyomino based tessellation scheme
306 Triple tall tile in a polyomino based tessellation scheme
400 Basic tessellation and numbering system of a hexagon based tessellation scheme
501 Trivial tile in a hexagon based tessellation scheme
502 Double wide tile in a hexagon based tessellation scheme
503 Triple wide tile in a hexagon based tessellation scheme
504 Upward pointing triangle triple tile in a hexagon based tessellation scheme
505 Downward pointing triangle triple tile in a hexagon based tessellation scheme
600 Example of a finished tessellation utilizing a polyomino based tessellation scheme
700 Example of a finished tessellation utilizing a hexagon based tessellation scheme
800 Example of a finished tessellation utilizing a polyomino based tessellation scheme with surface views for each cell included
901 Example surface view of a tile in a polyomino based tessellation scheme
902 Example modal view of a tile in a polyomino based tessellation scheme
1001 Start node
1002 Centroid trivial tile assessment node
1003 Centroid non-trivial tile placement node
1004 Centroid trivial tile placement node
1005 Unplaced cell collection designation node
1006 Tessellation construction loop start node
1007 Tessellation completion assessment node
1008 Next placement block designation node
1009 Tessellation completion node
1010 Cell placement consideration collection node
1011 Relative rank evaluation node
1101 Cell trivial tile assessment node
1102 Trivial tile placement node
1103 Cell with trivial tile deletion node
1104 Valid orientation assessment node
1105 Valid orientation rank assessment node
1106 Valid orientation placement node
1107 Cell with valid orientation deletion node
1108 Cell with no valid orientation deletion node
1201 Tile 305 Orientation 1
1202 Tile 305 Orientation 2
1203 Tile 305 Orientation 3
1204 Tile 305 Orientation 4
1301 Cell Vectors Table 1302 Distance Matrix
1303 Relative Ranking Matrix
1304 Incomplete tessellation number 1
1400 Example of orientation 1 of tile 304 in incomplete tessellation 1300
1401 Orientation 1 of tile 304
1500 Example of orientation 2 tile 304 in incomplete tessellation 1300
1501 Orientation 2 of tile 304
1600 Incomplete tessellation number 1 after a cell 4 has been placed in it
1700 Incomplete tessellation number 2
1800 Example of orientation 1 of tile 302 in incomplete tessellation 1700
1801 Orientation 1 of tile 302
1900 Example of orientation 2 of tile 302 in incomplete tessellation 1700
1901 Orientation 2 of tile 302
2000 Screen shot of cell name, tile, and metadata description table
2100 Screen shot of an excerpt of an augmented distance matrix
2101 Screen shot of and excerpt of a ranking matrix
2200 Screen shot of an example tessellation with centroid cell MBVC3
2201 Screen shot of an example tessellation with centroid cell US_PI
2202 Screen shot of an example tessellation with centroid cell INEOS
2203 Screen shot of an example tessellation with centroid cell C3FWD
2300 Screen shot of an example tessellation with surface views in landscape 1
2301 Screen shot of an example tessellation with surface views in landscape 2
2302 Screen shot of an example tessellation with surface views in portrait 1
2303 Screen shot of an example tessellation with surface views in portrait 2
2400 Modal view of "Pembina Exports LPG" tile in shown in 2300
2401 Modal view of "MB C3" tile in 2300
2402 Modal view of "WTI" tile in 2300
2403 Modal view of "Propane Prod" tile in 2301
2500 Schematic diagram of an illustrative operating environment
2510 Computing Device
2511 System Memory
2512 Multiple Core Processors
2513 Removable Storage
2514 Program Data
2520 Web Server API
2521 Cell Manager
2522 User Manager
2523 Cluster Manager
2524 Cache
2530 Database
2531 User Data
2532 Cached Tessellations
2540 Internet
2551 Touch Screen Phone
2552 Touch Screen Tablet Definitions Backwardation: is the market condition where the price of a given commodities' forward or futures contract is trading below the expected spot price at contract maturity. The resulting futures or forward curve would typically be downward sloping.

Basic Tessellation: A tessellation constructed from the repeated use of at most 2 planar shapes called blocks. Two examples of basic tessellations are shown (in an exploded view) in FIG. 2 and FIG. 4. A basic tessellation is one of the two fundamental components of a tessellation scheme.

Block: One of the at most two simple planar shapes used to construct a basic tessellation.

Brent Crude: Brent crude is a major trading classification of light sweet crude oil extracted from offshore oil rigs in the North Sea between the United Kingdom and Norway.

Centroid: The centroid of a tessellation is the geometric center of the tessellation, and is the initial focus of attention.

Confidence Interval: An interval of the real line in which it has been determined that a given parameter of a random variable will fall within the interval with specified frequency.

Correlation: The correlation between two numerical data sets is a measure of the linear relationship between them.

Deep Learning: is part of a broader family of machine learning methods based on learning data representations, as opposed to task-specific algorithms.

Forward Curve: The forward curve is a function graph in finance that defines the prices at which a contract for future delivery or payment can be concluded today.

Heuristic Algorithm: A heuristic algorithm or technique is any approach to problem solving, learning, or discovery that employs a practical method not guaranteed to be optimal or perfect, but sufficient for the immediate goals. Where finding an optimal solution is impossible or impractical, heuristic methods can be used to speed up the process of finding a satisfactory method. For example those algorithms relying on a "rule of thumb" or intuition are often termed heuristic.

Hypothesis Testing: Hypothesis testing is a statistical inference technique in which two different and opposed hypotheses or claims about a parameter of the underlying data are compared, and based on a set of criteria called a p-value, one of the two hypotheses is determined to be more likely.

Java: Java is a general-purpose computer programming language that is concurrent, class-based, object-oriented, and specifically designed to have as few implementation dependencies as possible.

Machine Learning: Is a subfield of computer science concerned with the study and construction of algorithms that give computers the ability to learn and make predictions about a given data set without being explicitly programmed to do so.

Metadata: Metadata is a set of data that characterizes and or gives information about another data set.

mySQL: mySQL (Structured Query Language) is an open source, GNU general public licensed standardized programming language used for managing relational databases and performing various operations on the data in them. See https://www.mysql.com/Natural Language Processing: The field of study that focuses on the interactions between human language and computers is called Natural Language Processing, or NLP for short. It sits at the intersection of computer science, artificial intelligence, and computational linguistics.

NYMEX: The New York Mercantile Exchange (NYMEX) is a commodity futures exchange owned and operated by CME Group of Chicago.

p-value: a p-value is a numerical value used to determine which of the hypotheses in a hypothesis test is more likely.

pandas: pandas is an open source, BSD-licensed library providing high-performance, easy-to-use data structures and data analysis tools for the Python programming language. In particular, it offers data structures and operations for manipulating numerical tables and time series. https://pandas.pydata.org/Phillips Phillips Curve: The relationship between unemployment and inflation is a famous economic model called the Phillips Curve.

Polyomino: a polyomino is a plane geometric figure formed by joining one or more equal squares edge to edge.

Proprietary Data: Proprietary data consists of internally generated data or documents containing technical or other types of data, that is not available to the public.

R: R is an open source, GNU general public licensed programming language and software environment for statistical computing and graphics https://cran.r-project.org/.

RAKE: RAKE is an open source, MIT licensed python implementation of the Rapid Automatic Keyword Extraction (RAKE) algorithm as described in: Rose, S., Engel, D., Cramer, N., & Cowley, W. (2010). Automatic Keyword Extraction from Individual Documents In M. W. Berry & J. Kogan (Eds.), Text Mining: Theory and Applications: John Wiley & Sons. See https://github.com/aneesha/RAKE.

Ranking or Partial Ordering: A ranking or partial ordering of a set of objects in the pairing of a set of objects with a binary relation that is reflexive, antisymmetric, and transitive. In practical terms a partially ordered set is a listing of the elements of that set according to some criteria. For example the placing of contestants resulting from the outcome of a 40 yard dash race i.e. $1^{st}$ place, $2^{nd}$ place, . . . is an ordering of the set of participants according to how fast they completed the race.

Regression: A regression or regression analysis is a statistical process for estimating the relationships among variables. Typically, it involves estimating the conditional expectation of one variable given a set of other variables.

Relative Rank: The ranking of a cell relative to another cell.

Structured Data: Structured data refers to information with a high degree of organization such that inclusion in a relational database is seamless and readily searchable by simple, straightforward search engine algorithms.

Spurious Correlation: A spurious correlation is a relationship between data sets in which they are not causally related to one another and yet it may appear that they are due to coincidence or the presence of confounding factors. See http://tylervigen.com/spurious-correlations for examples.

Supervised Learning Algorithm: Is a machine learning algorithm tasked with performing inference on a given data set based on an example or training data set. In practical terms it is an algorithm that uses an example data set of inputs and outputs so that when another data set is used as an input, the output of that algorithm for the new data set will closely match the output of the training data set. For example, image recognition is typically carried out with a supervised learning algorithm.

Supremum Distance: The supremum distance between two vectors is the largest distance between any two matching elements of the vector.

Surface View: Is any combination of letters, numbers, and images that summarizes the contents of a cell. For example, a cell containing a graph of the daily closing price of the S&P 500 may have a surface view with numbers.

TensorFlow: TensorFlow is an open-source, Apache 2.0 open source licensed software library used for machine learning applications such as neural networks. See https://www.tensorflow.org/.

Tessellation or Tiling (in general): A tessellation or tiling of a two dimensional planar area is a covering of that planar area by a countable number of other, smaller, two-dimensional shapes called tiles where adjacent tiles do not overlap and there are no gaps between tiles. In particular, tessellations are often constructed out of a finite number of given two-dimensional shapes, which are used repeatedly. For example, the reader may be familiar with the work of M. C. Escher who constructed several tessellations in the early to mid $20^{th}$ century. Additionally or alternatively, the reader may be familiar with the game of Tetris. As defined elsewhere, the shapes manipulated within the game of Tetris are called polyominoes, and any two dimensional surface covered, with no gaps, by non-overlapping Tetris pieces is a polyomino tessellation of that surface.

Tessellation Scheme: A framework for constructing a tessellation of a planar surface composed of a basic tessellation and a collection of tiles. For example, the combination of the basic tessellation shown in FIG. 2 and tiles shown FIG. 3 constitutes a tessellation scheme.

Tile(s): The second fundamental component of a tessellation scheme. A planar shape constructed from the attachment of blocks edge to edge in order to construct more complex planar shapes. These are the planar shapes with which the final tessellation will be constructed. Example of collections of tiles are shown in FIG. 3 and FIG. 5, which are constructed from the blocks which make up basic tessellations shown in FIG. 2 and FIG. 4 respectively.

Time Series Data: A time series is a sequence of observations or data points taken at successive equally space points in time. For example, the daily closing price of a share of Microsoft recorded over 20 days would form a time series.

Unsupervised Learning Algorithm: Is a machine learning algorithm tasked with performing inference on a given data set without the benefit of an example or training data set. For example, density estimation is an unsupervised learning task.

Unstructured Data: Unstructured data refers to information without a high degree of organization such that inclusion in a relational database would require a great deal of analysis in order for it to be readily searchable by simple, straightforward search engine algorithms.

BRIEF DESCRIPTION OF THE DRAWINGS

This Brief Description and the Detailed Description Of The Drawings cover only some embodiments and variations of the invention, and other embodiments and variations will be clear to those skilled in the art from the description, drawings, and Alternative and Additional Embodiments, etc. The Drawings are illustrative and not limiting.

The following descriptions are stated in reference to the accompanying figures.

FIG. 9 shows an example surface and modal view of a tile in a polyomino based tessellation scheme.

FIG. 13A shows an example of cell vectors, a distance matrix, and a relative ranking matrix that can be used by the tessellation construction unit 153 to generate a finished tessellation.

FIG. 20 shows a screen shot of a table that, in an implementation of the invention, was passed to the cell-ranking unit in order to facilitate its operation. This figure shows an element of one implementation of the information visualization system discussed herein.

FIG. 21A shows a screen shot of an excerpt of augmented distance matrix created from the information contained in FIG. 20. This figure shows an element of one implementation of the information visualization system discussed herein.

FIG. 21B shows a screen shot with an excerpt of a ranking matrix created from the information contained in FIG. 21A. This figure shows an element of one implementation of the information visualization system discussed herein.

FIG. 22A shows two screen shots comprising a collection of finished tessellations created from the information contained in FIG. 21B and FIG. 20. This figure shows an element of one implementation of the information visualization system discussed herein.

FIG. 22B shows two screen shots comprising an additional collection of finished tessellations created from the information contained in FIG. 21B and FIG. 20. This figure shows an element of one implementation of the information visualization system discussed herein.

DETAILED DESCRIPTION OF THE DRAWINGS

Figure 1A:
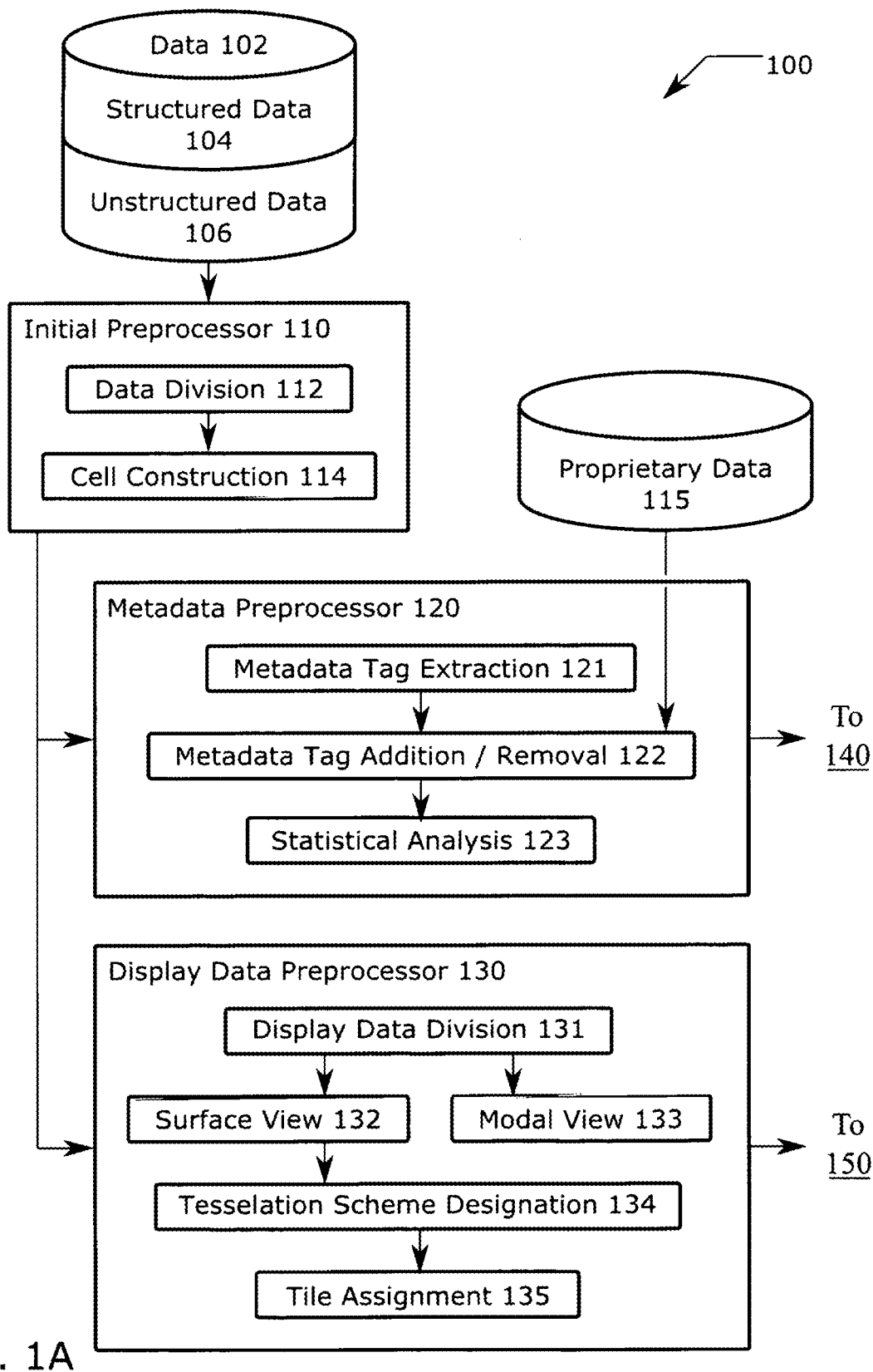
FIG. 1A shows part 1 of an illustrative system for an information visualization engine whereby data is organized into cells, analyzed, and then presented as a tessellation in such a way that the closeness of the relationship between cells is represented by the distance separating them.
Figure 1B:
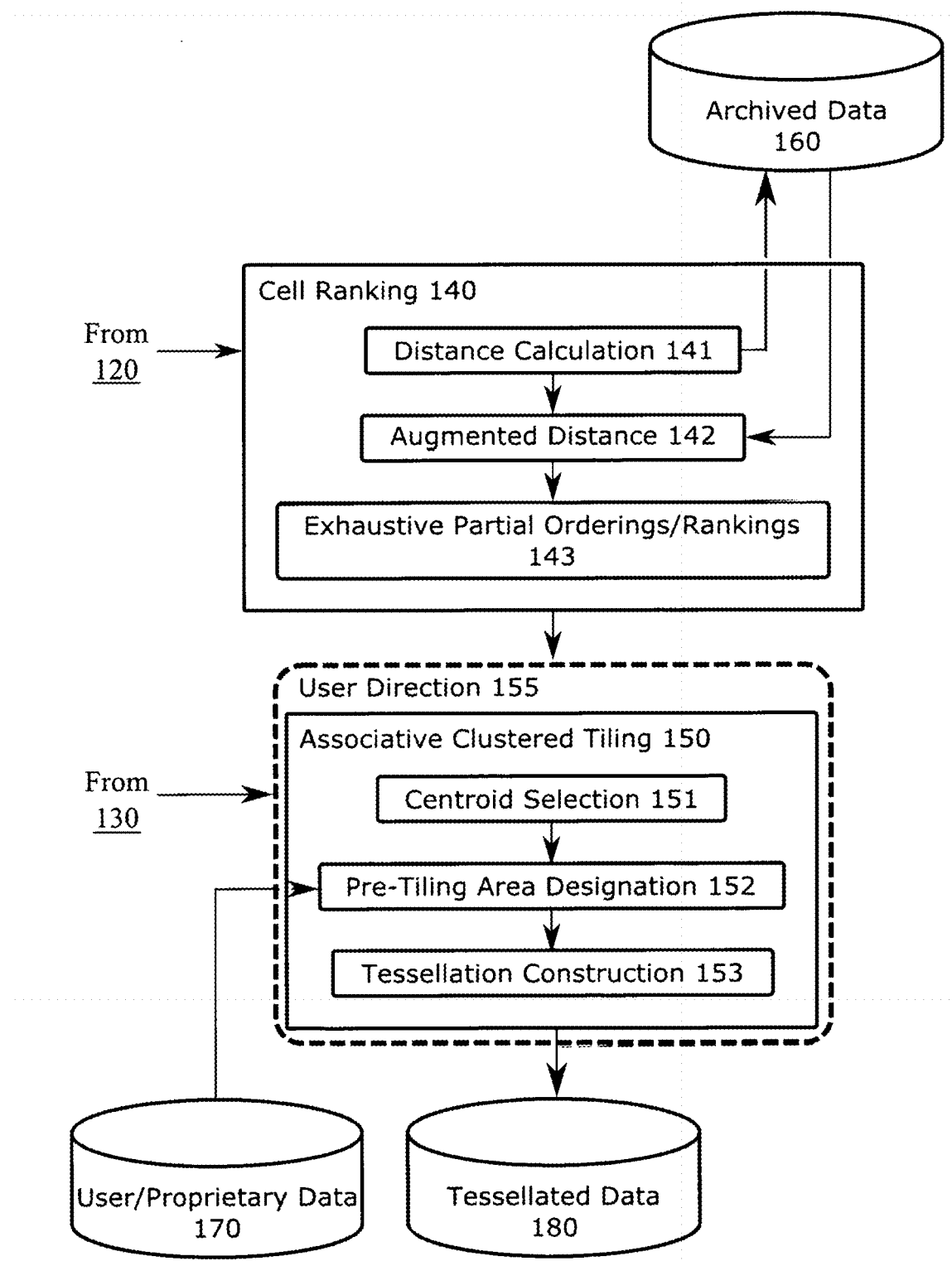
FIG. 1B shows part 2 of an illustrative system for an information visualization engine whereby data is organized into cells, analyzed, and then presented as a tessellation in such a way that the closeness of the relationship between cells is represented by the distance separating them.

FIG. 1A and FIG. 1B, (hereafter referred to as FIG. 1) Shows an illustrative system for an information visualization engine designed to dynamically organize, via associative clustered tiling and tessellation, and then present instantly addressable content via any electronic user interface, but especially via mobile devices such as touch screen cellular phones, and tablets. FIG. 1 shows the illustrative system for an information visualization engine 100 composed of data 102 to be tiled and presented, an initial preprocessor 110, a metadata preprocessor 120, a display data preprocessor 130, a cell ranking unit 140, a user directed associative clustered tiling unit 150, archived data 160, proprietary and user data 115 & 170, and tessellated data 180. Various embodiments contemplate that the data 102 to be tiled may consist of structured data 104, unstructured data 106, or any combination thereof.

FIG. 1 shows an initial preprocessor 110. The purpose of the initial preprocessor is to partition data 102 into a finite number of data collections called cells so that the contents of each cell all pertain to the same topic, event, or concept. Initial preprocessor 110 contains a data division unit 112. Depending on the contents of data 102, the data division unit 112 will employ a combination of heuristic, supervised, or unsupervised algorithms (see definitions section) to combine disparate sets of data contained in data 102 into a cell which will be organized and presented as a singular object. In one version of the invention, the data division unit 112 will use a routine implementation of the pandas library for the python programming language to collect together observations of a financial time series such as the daily closing price of Brent Crude so that it can be presented graphically as a single entity (a line graph). Additionally, in another version of the invention, the data division unit 112 will collect an article discussing a recent baseball game together with articles detailing each team's performance statistics by first extracting keywords from each article using a straight forward implementation of the RAKE software package and then determining that the number of keywords that all three share is greater than a predefined threshold. FIG. 1 also shows that data division unit contains a cell construction unit 114. The cell construction unit 114 packages the data collections constructed in the data division unit 112 into a cell and assigns a unique identifier for each. In one version of the invention, data 102 is contained within a relational database where cell construction unit 114 will then utilize the database management system MySQL to apply the attribute "Cell 10" to the three baseball articles mentioned previously.

FIG. 1 also shows a metadata preprocessor 120. The metadata preprocessor 120 extracts a metadata description from the data contained in each cell, consisting of a collection of strings such as keyword attributes, and floating point numbers such as statistical values which characterize the contents of each cell as a whole. Metadata preprocessor 120 contains a metadata tag extraction unit 121 which, depending on the contents of the cells, employs a combination of heuristic, supervised, and unsupervised learning algorithms to analyze the data contained in each cell and extract relevant strings, and figures which fully or partially characterize each cell. In one version of the invention, metadata tag extraction unit 121 utilizes the basic functionality of the 'timeSeries' package for the R programming language to analyze the current forward curve of NYMEX natural gas futures contracts and extract keywords "Backwardation" and "Yearly Cycle". In another version of the invention, metadata tag extraction unit 121 may utilize the basic functionality of the RAKE software package to analyze a Washington Post article and extract and assign keyword attributes "Taxation", and "Statute" to the article.

FIG. 1 shows a metadata addition/removal unit 122. Depending on the data contained in each cell, metadata addition/removal unit 122 will employ a combination of heuristic, supervised, or unsupervised learning algorithms along with proprietary data 115 to guide the removal or addition of metadata keywords attributes assigned/not assigned by the metadata tag extraction unit 121. In particular, the metadata tag addition/removal unit 122 utilizes proprietary data 115 to either add keyword attributes necessary for a complete description of a cell or remove keywords already assigned that are deemed irrelevant or non-descriptive. In one version of the invention, metadata tag addition/removal unit 122 utilizes a proprietary data set detailing pipeline routing and service interruptions to assign the attribute "Keystone XL" to an Oil and Gas Journal article. A few lines of code accomplish this in database management system MySQL that implements of a set of rules stored within proprietary data 115. These rules specify that a keyword attribute will be added to a cell whenever a given set of keyword attributes is already present. Here, the rule is that keyword attribute "Keystone XL" is added to any cell whose metadata description already contains keywords "North Dakota," "Transportation," "Pipeline," and "Environment". Additionally, in another version of the invention, the metadata tag addition/removal unit 122 utilizes a proprietary data set detailing well known spurious correlations (see definitions) to remove a keyword attribute "Chicken Consumption" from a financial time series (see definitions) regarding US crude oil imports. In this context, proprietary data 115 will contain information which shows that the relationship between a time series and a keyword to be spurious or so weak as to be uninformative. This keyword removal is easily implemented in database management system MySQL as a rule-based procedure similar to the previous example where a keyword attribute is removed whenever a cell also contains a given set of keyword attributes.

FIG. 1 shows a statistical analysis unit 123, which utilizes a combination of heuristic, unsupervised, or supervised algorithms to apply statistical analysis techniques to numerical cell data in order to further characterize their contents. In one version of the invention, the statistical analysis unit 123 will utilize the base functionality of the R software package to calculate the coefficients of a regression function describing the relationship between a person's wages and her level of education. In another version of the invention, statistical analysis unit 123 may calculate the correlation coefficient between a data set concerning the unemployment rate and a data set concerning rates of inflation to better characterize the relationship between them.

FIG. 1 shows a display data preprocessor 130, which contains a display data division unit 131. The display data division unit 131 will generate two different visual representations, surface and modal, of the data contained within each cell. This surface view is a combination of letters, numbers, and/or images, which previews the contents of each cell for users and is to be displayed in conjunction with all other cells in a tessellation. In one version of the invention, display data division unit 131 will analyze a cell containing the daily closing price of Brent Crude front month commodities contracts for the last two years, and construct a surface view for it containing "Brent Crude Oil", "57.58 USD/bbl", and "−0.26%" displayed above a graph of the last 5 hourly prices as seen in the lower right hand corner of FIG. 8. This can most easily be implemented with a large collection of templates pre-made to accommodate varying types of cells, distinguished by the collection of keyword attributes that they are assigned. In this version of the invention, metadata tag extraction unit 121 will assign the attribute "Financial Time Series" to this cell. Subsequently display data division unit 131 will perform a sequence of steps, which are easily implemented in many high level programming languages such as Java to fill in a predetermined surface view "financial time series" template with information contained within the cell as follows. First the display data division unit 131 will compare the keyword attributes assigned to the cell with a preexisting list of valid market price titles and find "Brent Crude Oil" is the closest match. This is especially easy if "Brent Crude Oil" is already an assigned attribute. Display data division unit 131 will then place "Brent Crude Oil" in the designated "Title" block of the template. Next, display data division unit 131 will designate the last value of the time series, in this case "57.58" as the most recent price and place it in the designated "Most Recent Price" block of the template, along with the price per unit "USD/bbl" associated with "Brent Crude Oil". In a similar fashion the percent change value of "−0.26%" can be calculated from the time series and place it in the designated "Percent Change" block of the template. Lastly, display data division unit 131 will utilize the base functionality of the R programming language and construct a graph of the last five values of the time series and export it as a JPEG file to the Java implementation which will place it in the designated "Graph" block of the template. Note that although the foregoing explanation of this implementation of the display data division unit 131 may seem overly complex, be assured that implementing each of the described steps would not be challenging for someone of middling skill. As a result, the entirety of the implementation is possible for a novice.

Additionally, in another version of this invention, the display data division unit 131 may analyze a cell containing data characterizing the discovery of a large oil reserve off the coast of Florida and determine that the surface view of this cell, shown as surface view 901 in FIG. 9, will be the combination of a headline from a Florida Daily News article and a picture of an oil derrick. This surface view can be generated within a "news article with picture" template and implemented in much the same fashion described in the above paragraph.

The modal view of a cell is the information displayed to the user when the user selects, or "clicks" on, the surface view representation of the cell within the user interface. In particular, this modal view can be a graph, article, or image that provides detailed and easily accessible information regarding the data contained within each cell. In the same version of the invention as mentioned above, the display data division unit 131 analyzes a cell containing an article discussing the discovery of a large oil reserve off the coast of Florida and determines that the modal view will consist of that article as shown in modal view 902.

FIG. 1 shows a tessellation scheme designation unit 134. The tessellation scheme designation unit 134 employs a combination of heuristic, supervised and/or unsupervised learning algorithms to analyze the characteristics of all surface views assigned by display data division unit 131 and selects one of a finite number of pre-designated tessellation schemes. A tessellation consists of a finite number of planar (2 dimensional) shapes placed on a planar surface so that any finite connected area (one with no holes) drawn on that surface can be completely covered by repeated placement of those planar shapes with no gaps between them. A simple example would be to draw a shape, with no holes, on a large piece of paper and then place a number of books on top of that shape in such a way that the entire shape is covered with no gaps between books. From above (ignoring the thickness of each book) this can be viewed as a tessellation of the drawn shape by rectangular covers of those books. Normally these tessellations are constructed by the repeated use of a small set of shapes. For reference, the reader may be familiar with some of the work of M. C. Escher.

Figure 2:
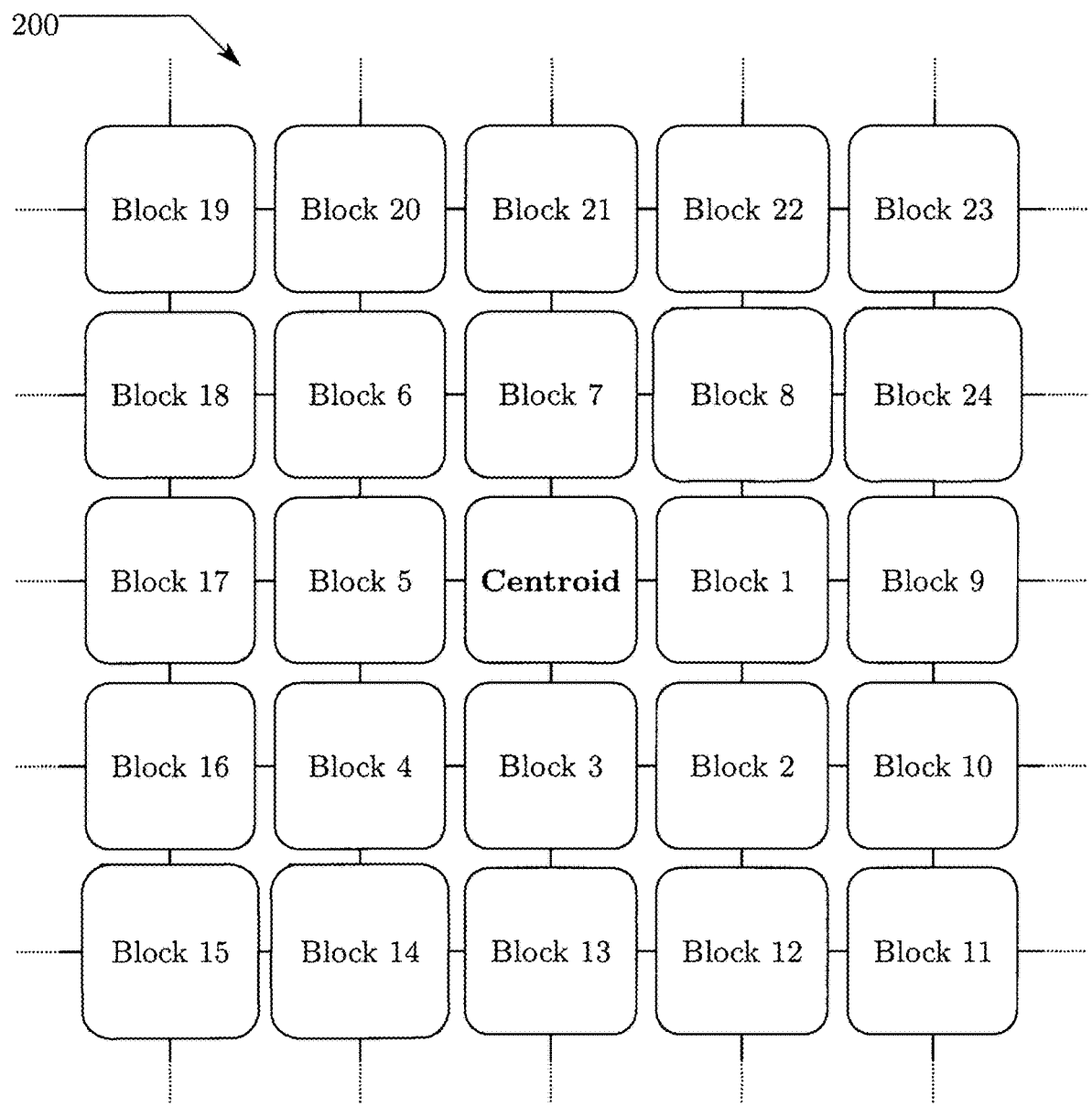
FIG. 2 shows the basic tessellation and numbering system of a polyomino based tessellation scheme. This is one of many frameworks for the construction of a tessellation within which cells can be presented and readily accessed.
Figure 3:
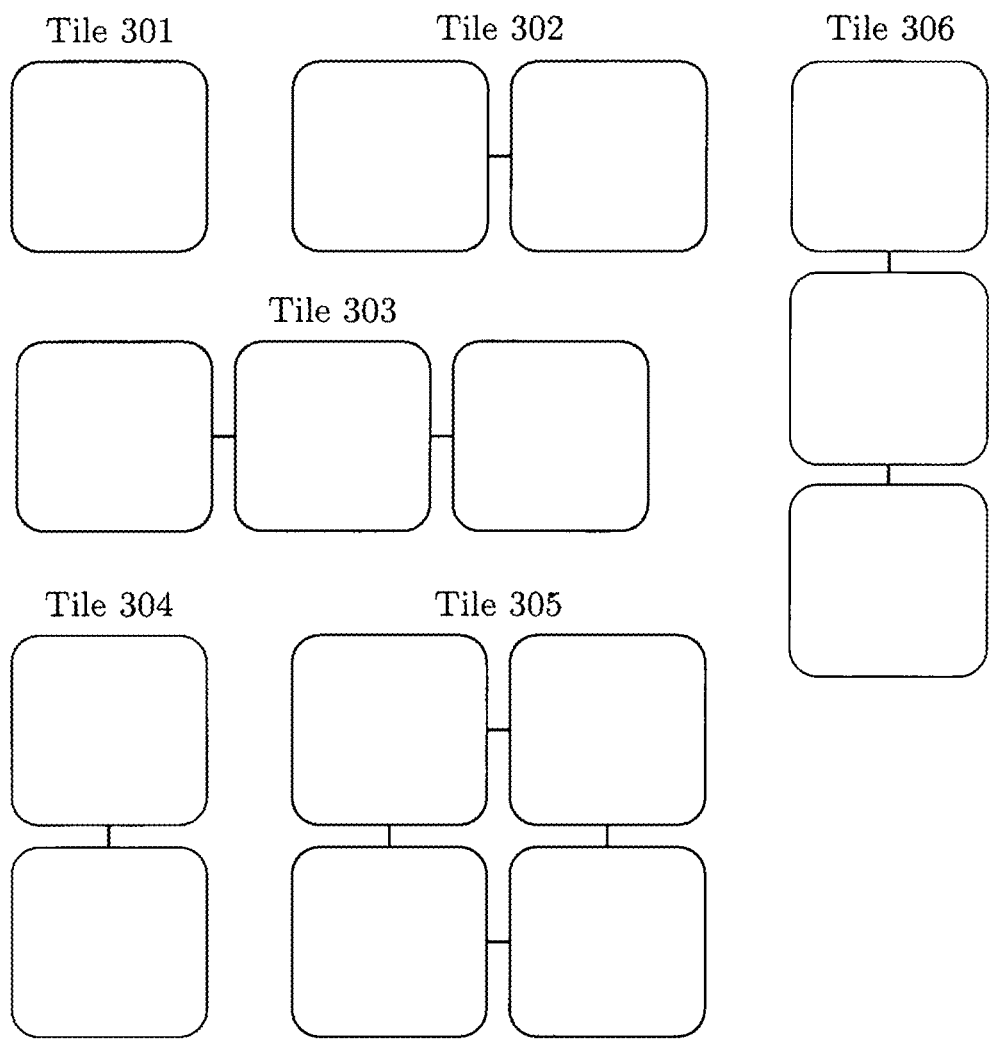
FIG. 3 shows a collection of tiles corresponding to a polyomino based tessellation scheme. These tiles are the collection of components with which each tessellation is constructed.
Figure 4:
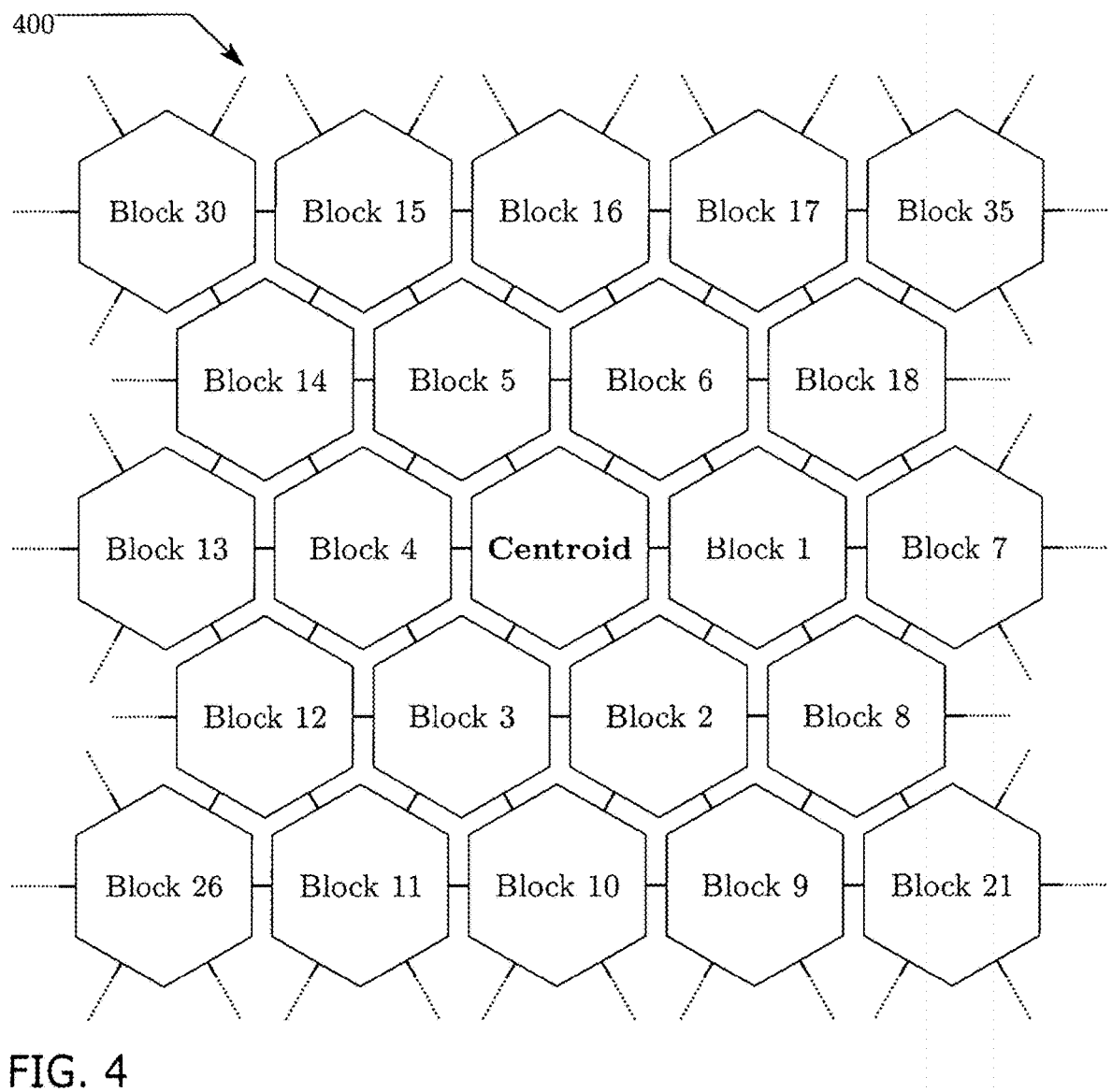
FIG. 4 shows the basic tessellation and numbering system of a hexagon based tessellation scheme. This is another of the possible frameworks for the construction of a tessellation.
Figure 5:
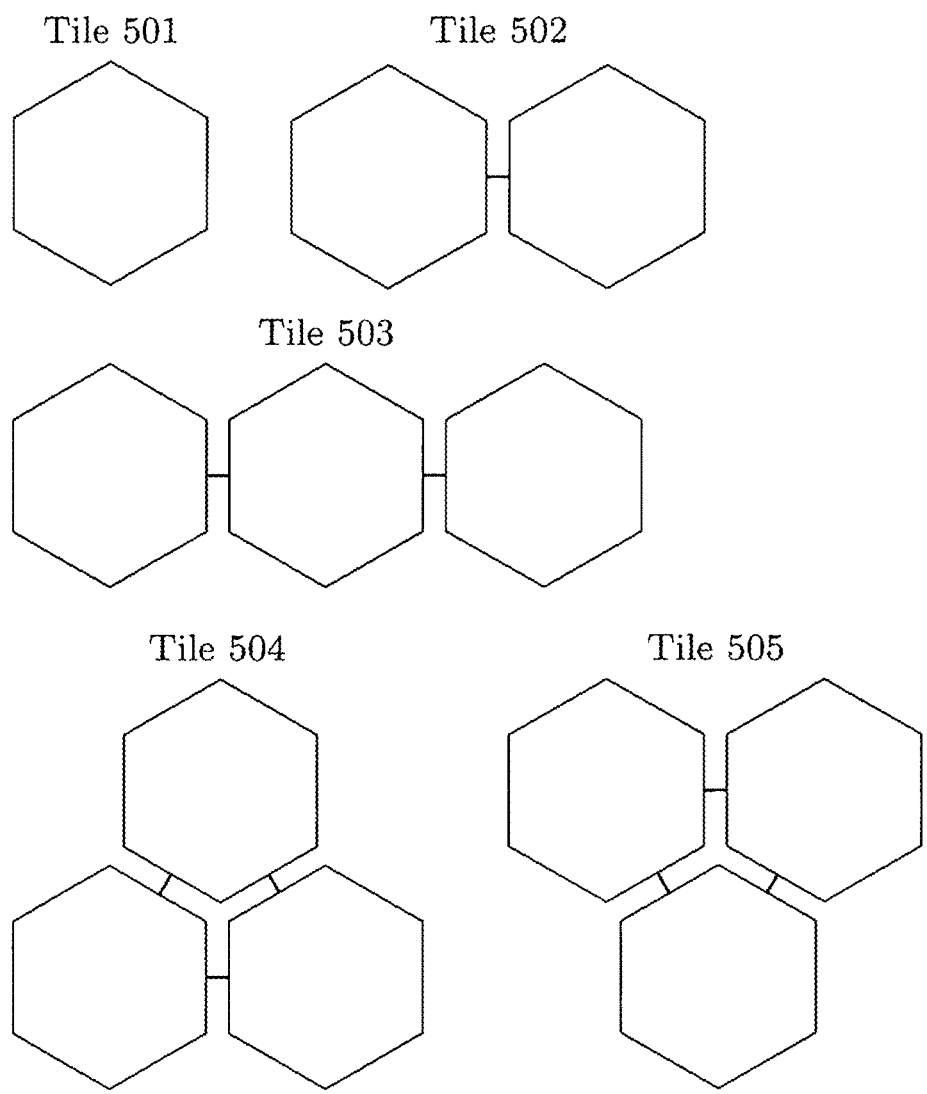
FIG. 5 shows a collection of tiles corresponding to a hexagon based tessellation scheme. These tiles are the collection of components with which each tessellation is constructed.

A tessellation scheme consists of 3 components. The first component is an initial, basic tessellation, constructed from one or two basic shapes, called blocks. Blocks are fundamentally containers for cells so that the process of constructing a tessellation is a process of placing/assigning cells within/to blocks. The second component is a centroid designator and numbering system that aids in the construction of the final tessellations in which the surface view of each cell will be displayed. This numbering system is constructed for the purpose of quickly determining the weak relative distance between each block and the centroid, meaning that blocks with lower numbers cannot be further away from the centroid than those with higher numbers. FIG. 2 and FIG. 4 contain exploded views of two such basic tessellations and their numbering systems constructed from square and hexagonal blocks respectively. Note, in a basic tessellation, blocks are placed edge to edge, but they have been presented in an exploded view in FIG. 2 and FIG. 4 to emphasize the connections between blocks. The third component of a basic tessellation scheme is a collection of planar (2 dimensional) shapes, called tiles. Tiles are constructed by connecting a finite number of blocks, defined in its corresponding basic tessellation, edge to edge. FIG. 3 and FIG. 5 contain examples of two such collections of tiles constructed from square and hexagonal blocks respectively, also presented in an exploded view. Note that tiles constructed from connecting square blocks of equal dimension edge to edge are called polyominoes. Consequently hereafter, we will call the combination of a basic tessellation shown in FIG. 2 and polyomino tiles shown in FIG. 3 as a polyomino based tessellation scheme. Note in order to aid in the following description, tiles which consist of a single block are called trivial tiles. For example FIG. 3 and FIG. 5 contain tile 301 and tile 501 respectively, which are trivial.

Out of many possible schemes, the tessellation scheme designation unit 134 will analyze the assigned surface view of every cell and select the scheme that is most conducive to the presentation of those surface views. Broadly, if a collection of cells has been assigned surface views that are primarily rectangular in shape, the tessellation scheme designation unit 134 will designate a polyomino based tessellation scheme for this collection. Alternatively, if a given collection of cells has been assigned surface views that are generally circular or triangular in shape, the tessellation scheme designation unit 134 will designate a hexagon based tessellation scheme for this collection. A hexagon-based system is designated because the tile 501 in FIG. 5 can accommodate surface views that are generally circular while tile 504 and 505 in FIG. 5 can accommodate surface views that are generally triangular since they are composed of three tiles organized into a triangle. One version of this invention implements this procedure with neural networks via the software package TensorFlow.

Neural networks are algorithms that are provided a set of example inputs with its desired classification (or output) called a training set so that the algorithm will classify new, unclassified, input data in the same way as the training set. The canonical example of this is a neural network trained with a set of digital images to recognize handwritten zip codes. In this example, the neural network is supplied with hundreds of digital images of handwritten six's along with the classification "this is a six". The network is then trained so that when a new handwritten six is fed into the network it will classify it "this is a six". If this process is repeated for numbers zero through nine, the network will be able to recognize any sequence of handwritten numbers, like a zip code. Although the inner workings of training a neural network are complicated, Tensorflow automates nearly all of this process so that a person of average skill can implement procedure like the one described above and the one described below quickly and easily.

For this invention a neural network would be trained with a number of sample surface views accompanied by the way in which each should be classified (as a circular, rectangular, or triangular for example) to train the network to make similar type classifications on other surface views in the future. Once the new set of surface views has been analyze and classified by the trained neural network, the tessellation scheme designation unit 134 will designate a tessellation scheme for these cells based on the most common classification. For example, if the trained network determines that the majority of the surface views are classified as either circular or triangular, shapes best accommodated with the hexagon based tiles shown in FIG. 5, then a hexagonal based tessellation scheme will be assigned. The advantage of using neural networks is that the process of classification can be made fully automatic, and the network can be trained to pick up on subtle features of surface views such as a rectangular photograph with a picture of a basketball being classified as circular rather than rectangular.

As shown in FIG. 1 the display data preprocessor 130 contains a tile assignment unit 135. As discussed previously, a component of each tessellation scheme is a finite number of planar shapes, called tiles, with which each tessellation will be constructed. The tile assignment unit 135 analyzes the surface view of each cell and assigns the tile that most clearly and efficiently displays the surface view of each cell on the user interface. In one version of the invention, where polyomino tessellation scheme has been designated, the tile assignment unit 135 analyzes a cell whose surface view is a tall and relatively skinny info graphic and assigns a double tall domino tile 304, or a triple tall tromino (polyomino composed of three blocks) tile 306. In practice, a neural network written in the TensorFlow software package can carry out tile assignment automatically. In this part of the invention, a tile assignment neural network would be provided with training examples consisting of a large number of sample surface views along with the tile (corresponding to a given tessellation scheme) it should be assigned (how it should be classified). This is done so that the neural network will assign tiles to surface views in a similar manner in future.

FIG. 1 also shows a cell ranking unit 140 that contains a distance calculation unit 141. The distance calculation unit 141 employs a combination of heuristic, supervised, and unsupervised algorithms to calculate a numerical distance separating each cell from every other cell. Here, distance is calculated in such a way that the distance separating two cells is analogous to the how closely related the contents of both cells are. For example, the distance separating a cell containing the daily closing price of the Dow Jones Industrial Average from a cell containing the daily closing price of the S&P 500 Index will be smaller than the distance separating the "Dow Jones" cell from a cell containing an article discussing the World Cup. In order to accomplish this task while accommodating a variety of cell data types, the distance calculation unit 141 can employ a combination, or algebraic equivalent of established distance measures such as Manhattan, Euclidean, Supremum, Minkowski, Hamming, Canberra, Binary, and Jaccard among numerous others. Each of the mentioned distance measures is tailored for use with a set of specific data types and can be easily implemented using the base functionality of any high level programming language. In one version of the invention, where the metadata description of each cell consists solely of keywords attributes, the distance calculation unit 141 calculates the distance between two cells by subtracting the number of keyword attributes shared by both cells from the total number of keyword attributes assigned to all cells. In another version of the invention where the metadata extracted from each cell is embodied by a collection of points in 3 dimensional space, where metadata for Cell i is $(x\_i, y\_i, z\_i)$, the distance calculation unit 141 calculates the distance between two cells by adding up the element wise squared difference between both metadata vectors i.e. Distance between Cell 1 and Cell 2 is $(x\_1-x\_2)^2+(y\_1-y\_2)^2+(z\_1-z\_2)^2$. FIG. 1 shows archived data unit 160. The archived data unit 160 stores all cell, metadata, and distance data generated in all upstream units up to and including distance calculation unit 141 within a database a task easily implemented with MySQL.

FIG. 1 shows an augmented distance unit 142. The augmented distance unit 142 utilizes data stored within the archived data 160 together with a combination of heuristic, supervised, or unsupervised algorithms to augment the values calculated in the distance calculation unit 141. Augmented distance unit 142 will either increase or decrease the distance value separating two cells according to a set of criteria contained within archived data 160. Consider one version of the invention, where augmented distance unit 142 is considering the distance separating a cell containing an article on Microsoft and a cell containing a profile of the Bill and Melinda Gates Foundation. In this version of the invention, the unit will search archived data 160 and find that in the last ten instances where the distance between similar cells was calculated, the values were substantially smaller than the current value, i.e. in the past these cells were more closely related. In this case, augmented distance unit 142 will set the distance between the current cells under consideration equal to the average of the current value and the last ten values. Alternatively, the procedure described here may result in augmented distance unit 142 increasing the calculated distance between two cells if previous embodiments of both cells have been separated by a larger distance than the current value. Even though the number of rules a particular version of the invention need implement may be large, each rule is easy to implement in a number of high level programming languages such as Python or Java.

FIG. 1 also shows an exhaustive partial orderings/rankings unit 143. The exhaustive partial orderings/rankings unit 143 utilizes the distances calculated in the augmented distance unit 142 to establish, for every cell, a partial ordering or ranking of all other cells relative to a given cell where the distance between cells is weakly increasing as the ranking increases. This means that, for example, if the ranking of Cell 1 relative to Cell 2 is 6 then there are 5 Cells that are more closely related to Cell 1 than Cell 2. Furthermore, consider a simple case, shown in FIG. 13A where 6 cells are passed to the metadata preprocessor 120 which, generates a numerical representation of the contents of each cell as a point in two dimensional space, shown in cell vectors table 1301. Think of the X and Y components to be coordinates in the familiar Cartesian plane from grade school. Suppose further that in this example, distance calculation unit 141 has determined that the appropriate measure for the distance between these cells is the Euclidean distance, or the sum of squared differences. As a result, distance calculation unit 141 will use the Euclidean distance to construct distance matrix 1302 where each value represents the distance separating the cells listed in the corresponding row and column. If augmented distance unit 142 determines that no changes need be made to the values contained in distance matrix 1302, then exhaustive partial orderings/rankings unit 143 will generate an exhaustive ranking based solely on distance matrix 1302. In order to generate this ranking, exhaustive partial orderings/rankings unit 143 will designate each cell in turn as the target cell and assign a rank of one to the cell which is separated by the smallest positive distance from the target cell, assign a rank of two to the cell which is separated by the second smallest distance from the target cell and so on until all cells are ranked. Exhaustive partial orderings/rankings unit 143 will perform this task for each cell and collect the results in a table. This is shown in relative ranking matrix 1303, where Cell 3 is assigned a rank of one relative to Cell 1 because it is has the smallest nonzero distance value (0.65) in the column "Cell 1" of distance matrix 1302, where Cell 5 is assigned a rank of two relative to Cell 1 because it has the second smallest nonzero value (0.77) in column "Cell 1" of distance matrix 1302. In practice the tasks assigned to 141 and 143 described above can be accomplished with ten to fifteen lines of code in any number of high level programming languages such as Python or Java.

FIG. 1 shows a user directed associative clustered tiling unit 150. The user directed associate clustered tiling unit 150 includes a centroid selection unit 151. The centroid selection unit 151 collects data regarding user preferences, characteristics, and/or interests either from the user directly or from data stored on the device with which the user accesses the user interface. In general, the centroid selection unit 151 will determine which cell will be designated as the centroid cell that occupies the central position within the requested tessellation. In one version of the invention, the centroid selection unit 151 solicits from the user a list of keywords that the user is and is not interested in. The centroid selection unit 151 will then find the cell whose metadata description most closely matches the stated interest of the user and designate it the centroid. In another version of the invention, the user will direct the centroid selection unit 151 to designate a particular cell to be the centroid cell from a list of options. FIG. 1 also shows a pre-tiling area designation unit 152. The pre-tiling area designation unit 152 utilizes user and or proprietary data within user/proprietary data unit 170 to designate areas and tiles within the following tessellation where specific information, not necessarily contained within the data 102, will be placed. In one version of the invention, advertising is placed in designated areas of the tessellation and displayed on a designated tile.

Figure 6:
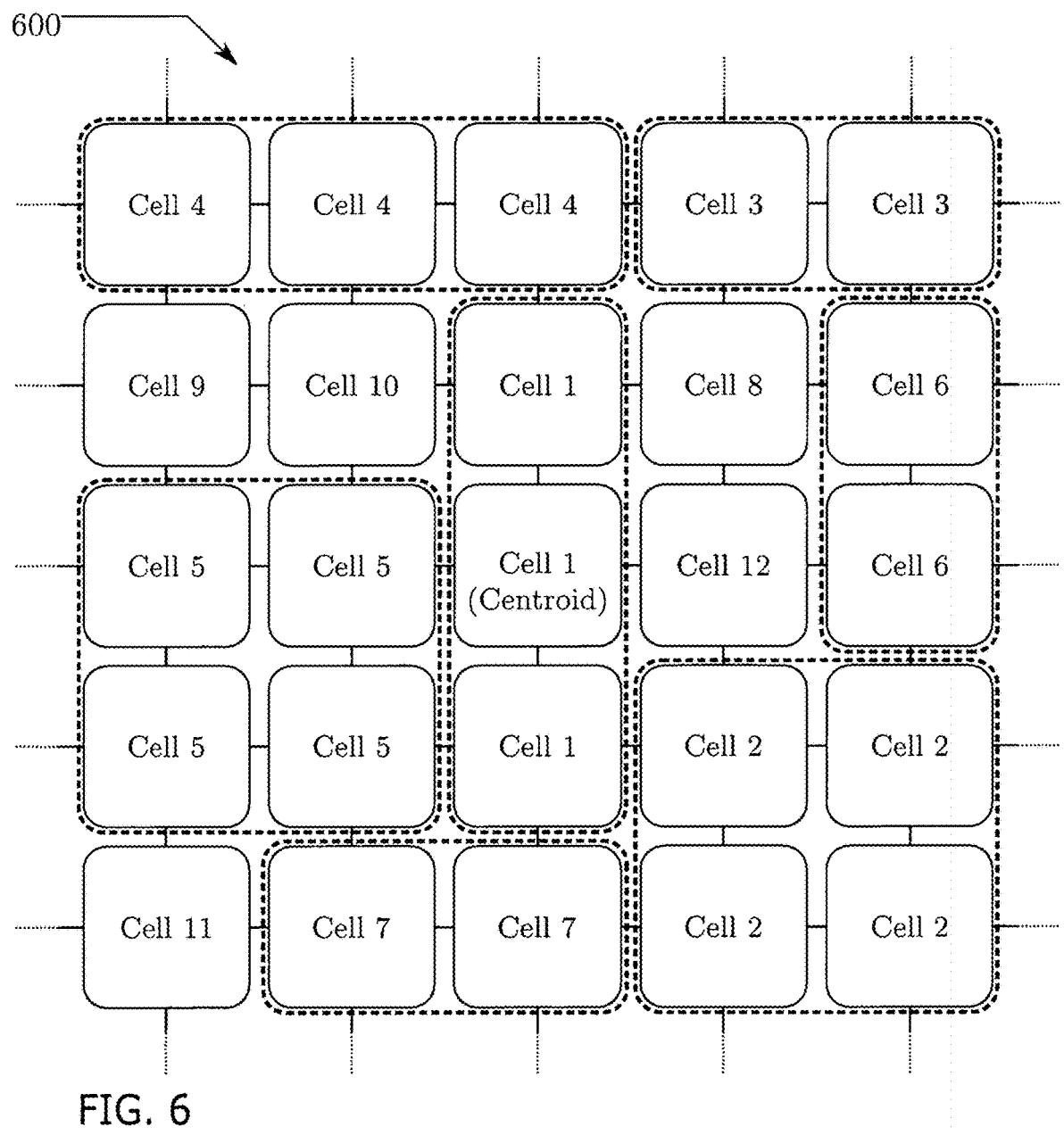
FIG. 6 shows an example of the central 25 blocks of a finished tessellation that utilizes a polyomino based tessellation scheme. This tessellation is finished in the sense that all cells have been placed within the tessellation, and it is ready for the cell numbers to be replaced with their corresponding surface views and presented to the user.
Figure 7:
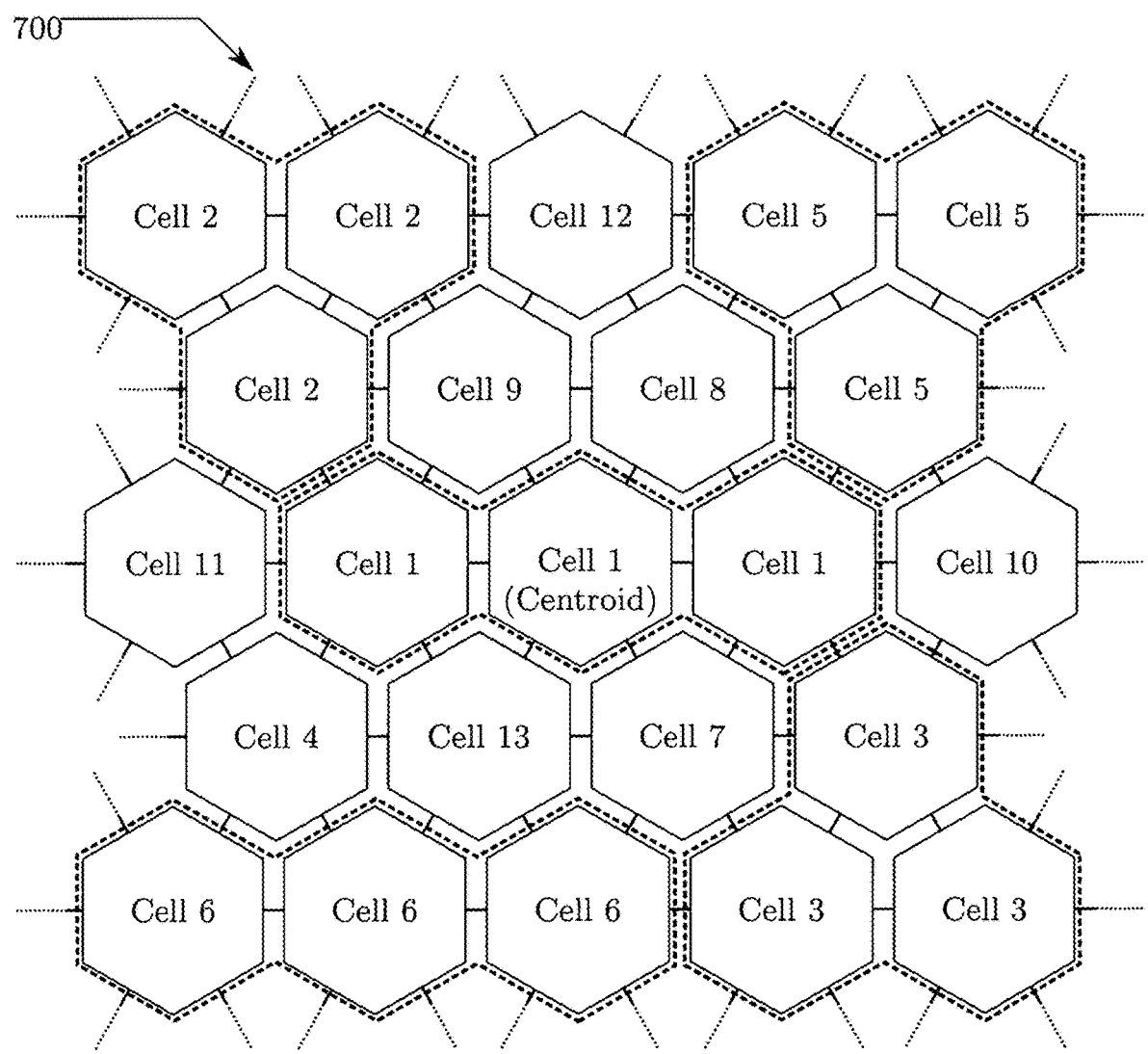
FIG. 7 shows an example of the central 25 blocks of a finished tessellation that utilizes a hexagon based tessellation scheme. This tessellation is finished in the sense that all cells have been placed within the tessellation, and it is ready for the cell numbers to be replaced with their corresponding surface views and presented to the user.
Figure 8:
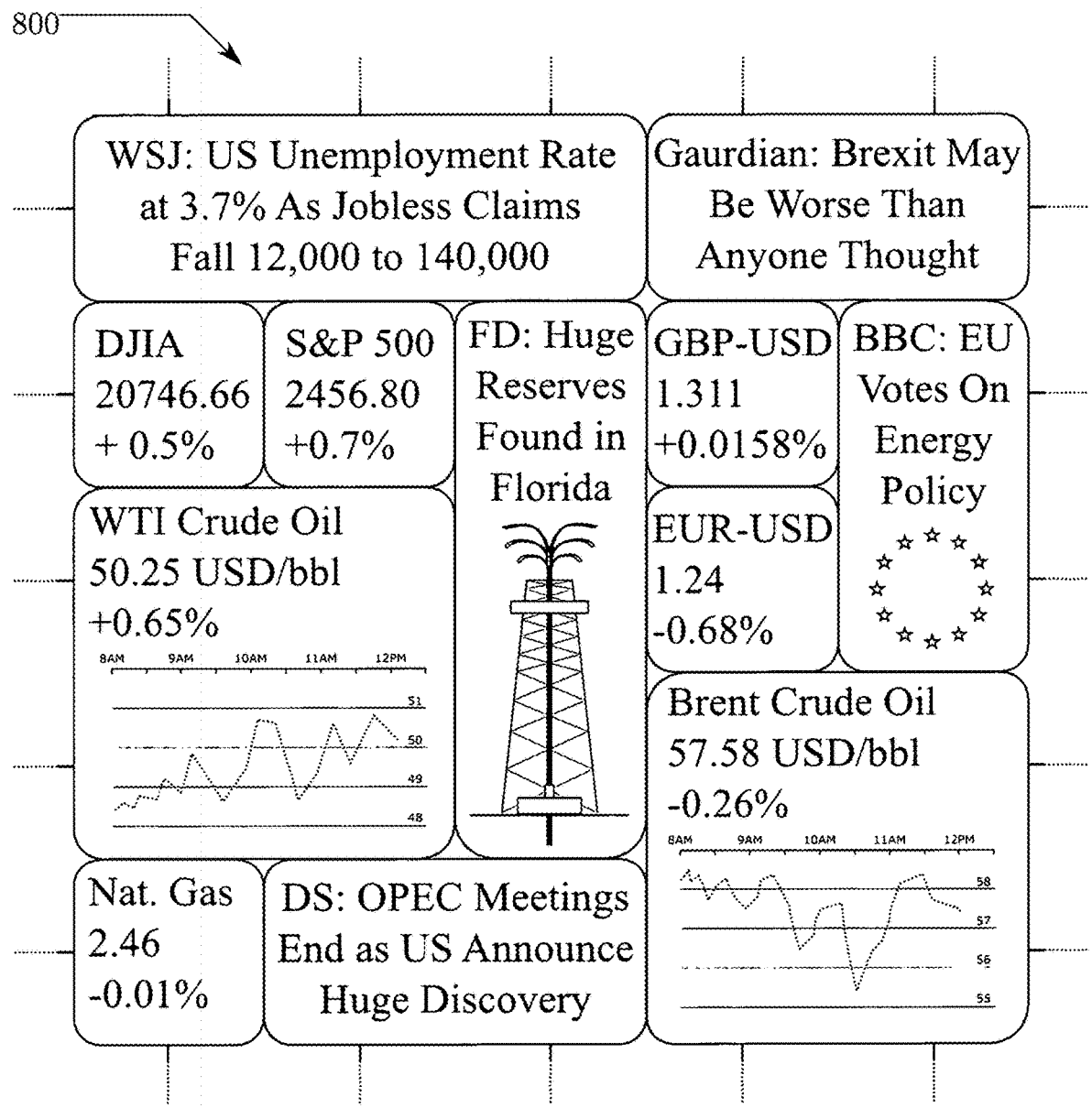
FIG. 8 shows an example of how the finished tessellation shown in FIG. 6 may appear to the user after the cell numbers in FIG. 6 are replaced with a collection of assigned surface views.

FIG. 1 also shows a tessellation construction unit 153. Tessellation construction unit 153 utilizes the partial orderings constructed in the exhaustive partial orderings/rankings unit 143 in combination with a scheme designated by the tessellation scheme designation unit 134 to construct a final tessellation. This tessellation is constructed so that cells occupying adjacent (those immediately next to one another) tiles within the finished tessellation are separated by the smallest possible distance, or equivalently, have the highest rank relative to one another as possible. Consider FIG. 6; this is an exploded view of a finished tessellation of Cell 1 through Cell 10 using the polyomino based tessellation scheme corresponding to basic tessellation, block numbering system, and collection of tiles depicted in FIG. 2 and FIG. 3 respectively. Note, the dashed lines in FIG. 6 and FIG. 7 are visual aids intended to help the viewer clearly see the tiles assigned to each cell as detailed below. In practice the tessellation in FIG. 6 is the result of the tile assignment unit 135 having analyzed the surface view of each cell and assigned the following tile representations (each of which are defined in FIG. 3 and shown on the parts list): Cell 1 is assigned tile 306, Cell 2 and Cell 5 are assigned tile 305, Cell 3 and Cell 7 are assigned tile 302, Cell 4 is assigned tile 303, Cell 6 is assigned tile 304, and the remaining cells are assigned tile 301. After each cell has been assigned a tile representation, the associative clustered tiling unit 150 solicited information from the user and passed that information to the centroid selection 151 unit which determined that cell 1 most closely matched the users expressed interests. Following this, the pre-tiling area designation unit 152 determined that no combination of blocks required designation in advance of tessellation construction 153 unit. In the penultimate step, tessellation construction unit 153 utilized the rankings generated in 143 to construct FIG. 6 in such a way that cells occupying adjacent blocks are as closely related to each other as possible. Displayed in FIG. 8 is an example of how the finished tessellation in FIG. 6 may appear to a user whose interests, when elicited by the user direction unit 155, most closely matched an article characterizing a recent oil discovery in Florida. Alternatively FIG. 7 shows an exploded view of a finished tessellation constructed utilizing the hexagon based tessellation scheme embodied by the basic tessellation, numbering system, and collection of tiles depicted in FIG. 4 and FIG. 5. In particular, FIG. 7 is the result of the tile assignment unit 135 having analyzed the surface view of each cell and assigned the following tile representations (each of which are defined in FIG. 5 and shown on the parts list): cell 1 and cell 6 are assigned tile 503, Cell 2 and Cell 5 have been assigned tile 505, Cell 3 is assigned tile 504, and all remaining cells have been assigned tile 501. Once a tessellation is constructed, it is stored within the tessellated data 180.

FIG. 10 and FIG. 11 are, in combination, flow charts of an illustrative algorithm of how tessellations are constructed in tessellation construction unit 153 with the information generated in the display data preprocessor 130, and cell ranking unit 140. In particular, tessellation construction unit 153 utilizes the algorithm summarized in FIG. 10 and FIG. 11 to populate a basic tessellation according to a scheme assigned by tessellation scheme designation unit 134, with tiles assigned by tile assignment unit 135. Furthermore, these tessellations are constructed in such a way that the relationship between cells occupying adjacent (connected) blocks is as strong (or close) as possible. Although tessellation construction unit 153 may construct tessellations in any number of schemes, for the sake of clarity we will use the construction of a polyomino based tessellation as a running example. In particular, we will use the tessellation scheme shown in FIG. 2 and FIG. 3, combined with partial orderings shown in relative rankings matrix 1303, and the assigned tiles shown in cell vectors table 1301 to demonstrate the operation of the algorithm. Note, in FIG. 12 through FIG. 19 block numbers have been abbreviated and placed in the lower right hand corner of each block.

Figure 10A:
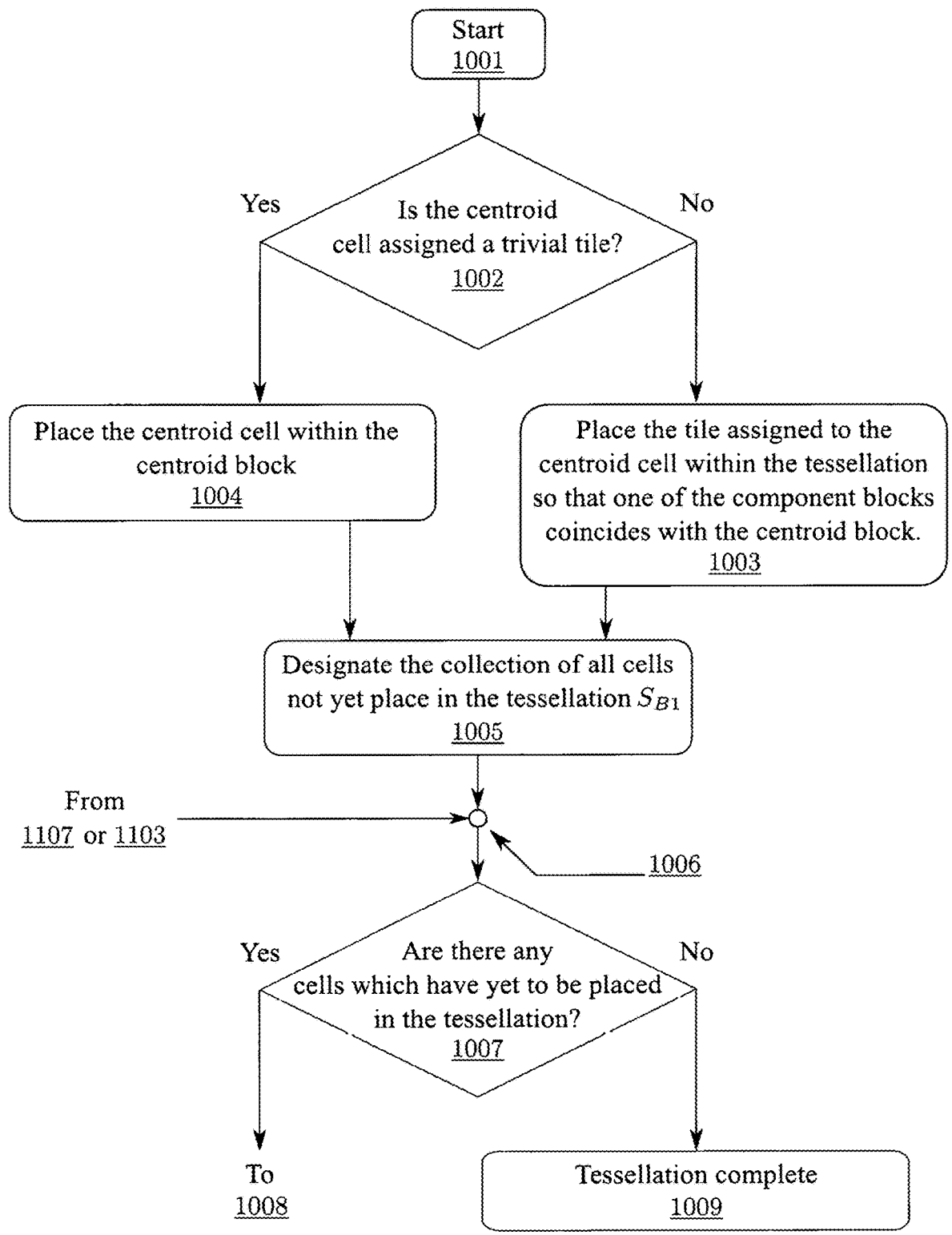
FIG. 10A shows a flow chart representing the first quarter of an illustrative algorithm detailing how tessellations are constructed in tessellation construction unit 153.
Figure 10B:
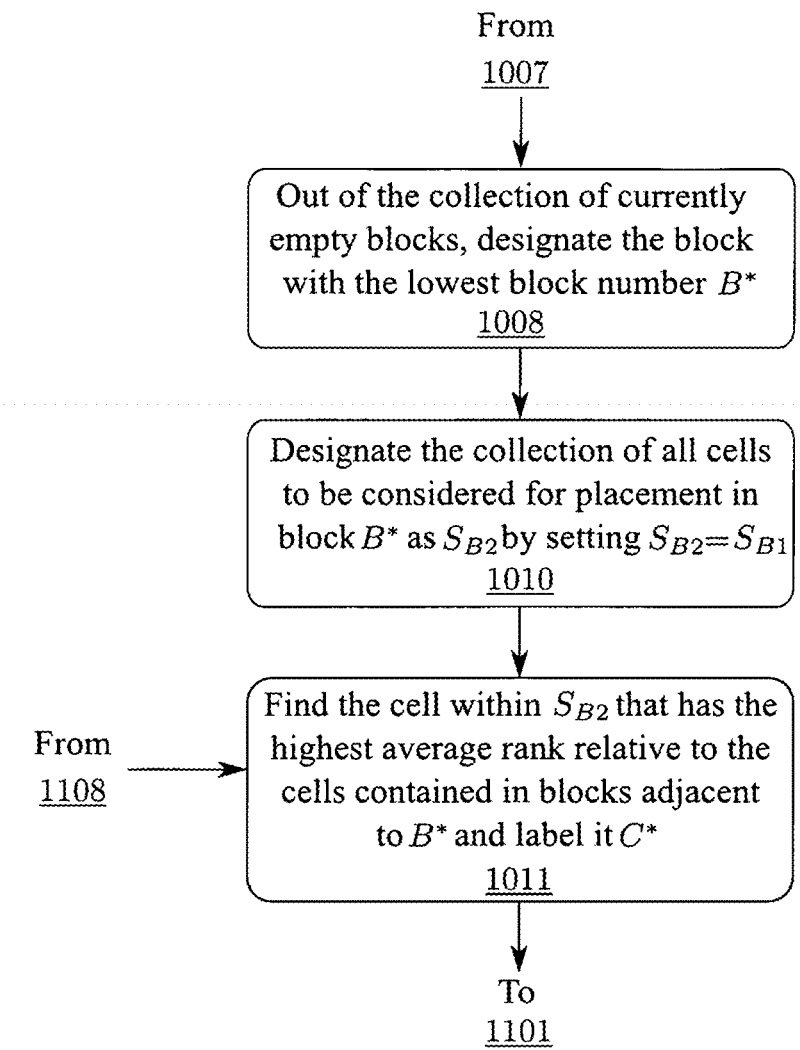
FIG. 10B shows a flow chart representing the second quarter of an illustrative algorithm detailing how tessellations are constructed in tessellation construction unit 153.
Figure 12A:
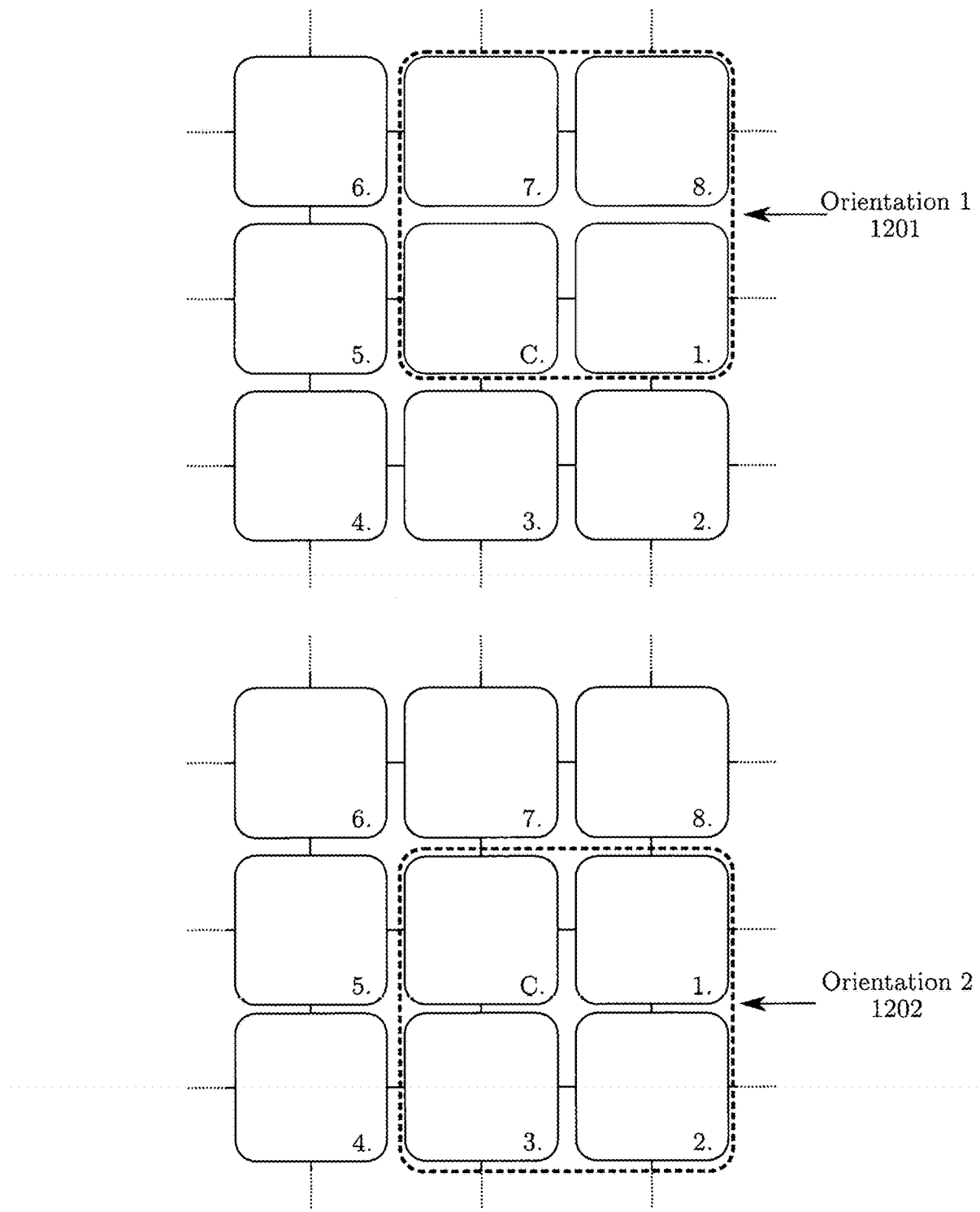
FIG. 12A shows two of four possible orientations of a two by two polyomino tile. The purpose of the figure is to demonstrate the multiple orientations in which a tile (designated as Tile 305 in FIG. 3B, and shown in the parts list) can be placed within a tessellation, relative to the centroid block.
Figure 12B:
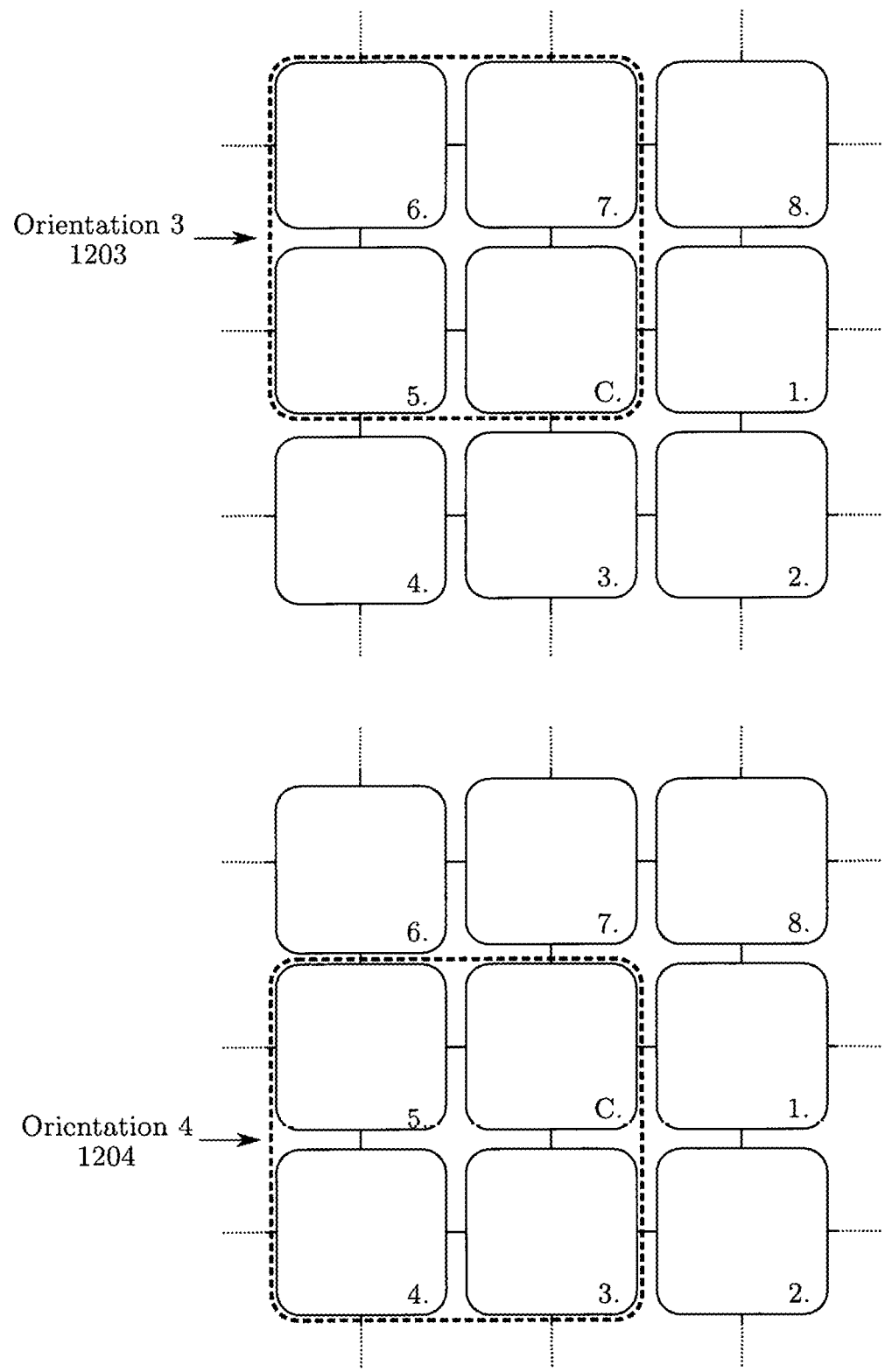
FIG. 12B shows an additional two of four possible orientations of a two by two polyomino tile. The purpose of the figure is to demonstrate the multiple orientations in which a tile (designated with number 305 in FIG. 3B, and shown in the parts list) can be placed within a tessellation, relative to the centroid block.

FIGS. 10A and 10B (hereafter called FIG. 10) contains start node 1001, this is the point where tessellation construction unit 153 has been supplied with a tessellation scheme, a collection of cells with tiles already assigned, an exhaustive partial ordering of all cells, and a designated centroid cell. The first task of tessellation construction unit 153 is to place the centroid cell within the tessellation in its assigned tile. Node 1002 determines whether the centroid cell has been assigned a trivial tile (tile composed of one block). If the centroid cell has not been assigned a trivial tile, the centroid cell will occupy more than one block within the tessellation. As a result, node 1003 will place the tile assigned to the centroid cell into the tessellation in one of its orientations or ways in which it can be placed so that one of its component blocks will coincide with the centroid block. In our running example, centroid selection unit 151 has determined that Cell 1 will be the centroid of this tessellation while tile assignment unit 135 has assigned tile 305 (defined in FIG. 3) to Cell 1. As shown in FIGS. 12A and 12B, there are 4 different ways, or orientations that tile 305 can be placed so that one of its component blocks coincides with, or overlaps, the centroid block. If the centroid cell has been assigned a trivial tile, node 1004 will place it within the centroid block since there is only one orientation in which it can be placed. The next task of tessellation construction unit 153 is to organize the remaining cells so that further cell placement can be completed in a straightforward and methodical manner. After either node 1003 or 1004 has placed the centroid cell, node 1005 will collect all the cells that have not been placed within the tessellation into a set $S_{B1}$. In our running example, after Cell 1 is placed within the centroid block, node 1005 will construct the set $S_{B1}$={Cell 2, Cell 3, Cell 4, Cell 5, Cell 6}. As we will see, as cells are placed within the tessellation, they are deleted one by one from $S_{B1}$ until $S_{B1}$ is empty, at which point the tessellation is complete.

Figure 13B:
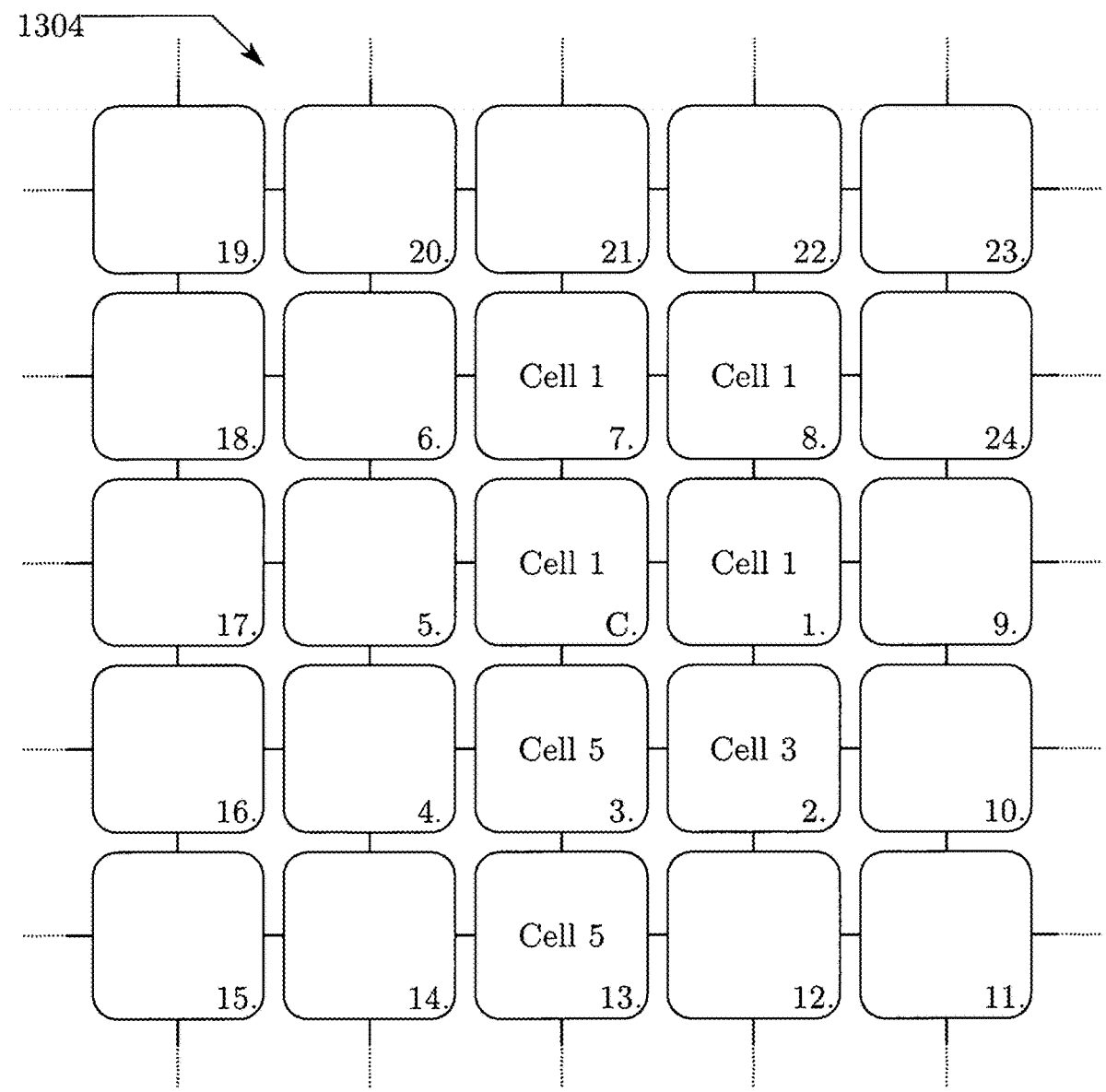
FIG. 13B shows an example incomplete tessellation. This figure aids in demonstrating the process by which the illustrative algorithm in FIG. 10 selects a sequence of blocks to be occupied and the cells to be placed within them.
Figure 14:
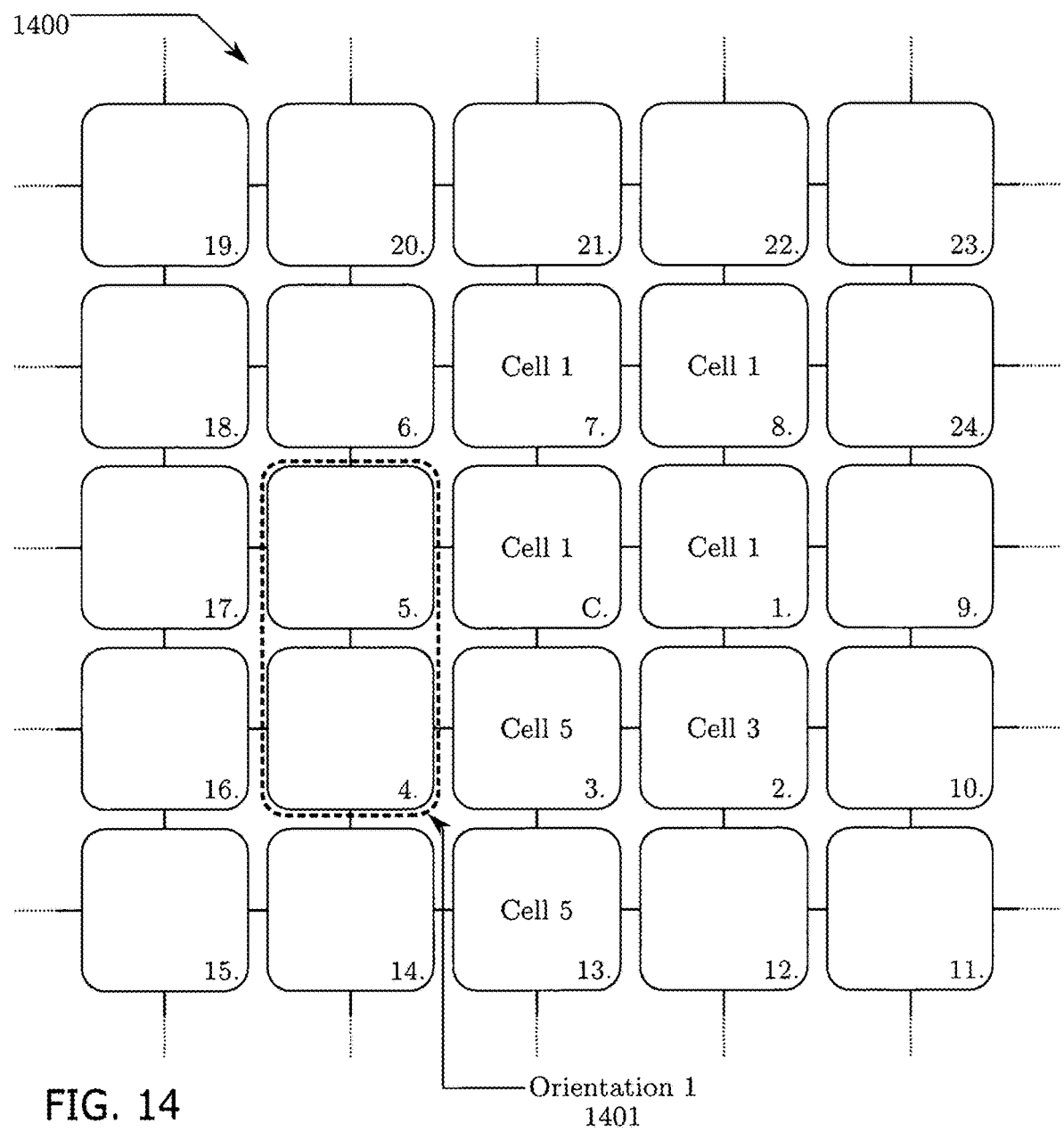
FIG. 14 shows one possible orientation of a double tall tile (designated as Tile 304 in FIG. 3B, and shown in the parts list) in incomplete tessellation shown in FIG. 13B. This figure aids in demonstrating how the illustrative algorithm in FIG. 11 determines the orientations in which a tile can be placed.

FIG. 10 contains node 1006, which serves as the beginning of a programmed loop inside of which the tessellation will be completed. As we will see, after a cell is placed within the tessellation by node 1106 or 1102 that cell will be deleted from SB1 by node 1107 or 1103 and the algorithm will return to node 1006 in order to place the next cell or terminate construction. Note, in order to demonstrate the function of all remaining nodes, moving forward we will assume that the current state of our example tessellation is shown in FIG. 13B where Cell 1, Cell 3, and Cell 5 have already been placed and $S_{B1}$={Cell 2, Cell 4, Cell 6}. Node 1007 determines whether there are any cells that have not yet been placed in the tessellation, or equivalently whether $S_{B1}$ is empty. If $S_{B1}$ is empty, all cells have been placed within the tessellation, and the tessellation has been completed. If $S_{B1}$ is not empty, node 1008 will find the empty block within the tessellation having the lowest block number and designate it B*. Recall that block numbers increase as you move further away from the centroid so in essence node 1008 looks for an empty block, which is (one of) the closest to the centroid. In FIG. 13B we can see that in our running example the empty block with the lowest number is Block 4 (since Blocks 1 through 3 already contain cells), hence B*=Block 4. Next, node 1010 will initialize the collection of all cells that will be considered for placement in B* as $S_{B2}$ by setting it equal to $S_{B1}$. We distinguish between the set of cells not yet placed in the tessellation from the set of cells still being considered for placement in B* because, as we will see, it is possible that a tile assigned to a cell we would like to place in B* will not fit. As a result, this cell will be deleted from $S_{B2}$ in order that it will no longer be considered for placement in B*, but will still be eligible for placement in other blocks since it is still contained in $S_{B1}$. Following this, node 1011 will search through $S_{B2}$ and find the cell with the highest cumulative rank relative to the cells contained in blocks adjacent to B*. In essence 1011 will calculate the rank of each cell in $S_{B2}$ relative to cells in blocks that share an edge with B*, add them up, and choose (one of) the cells with the lowest number and call it C*. Recall that rank is analogous to how closely related two cells are and that Rank 1 is the highest rank, Rank 2 is the second highest rank and so on. So, for each cell in $S_{B2}$, if one adds up its rank relative to the cells in blocks connected to B*, the smallest of these sums will represent that cell which is most closely related to these connected cells. In our running example, the only non-empty block connected to B*=Block 4 is Block 3 containing Cell 5, thus the algorithm needs only to find the cell in $S_{B2}$ which is most highly ranked relative to Cell 5. We can see that in relative ranking matrix 1303 under columns header Cell 5, Cell 4 has the second highest rank, and the cell with the highest rank, Cell 3, has already been placed, thus C*=Cell 4. Exiting node 1011, the algorithm has found a block in which to place the next cell, B*, and a cell C*, which it would like to place within this block. What remains is to determine whether the tile assigned to C* can be placed coinciding with B* in one of its orientations.

Figure 11A:
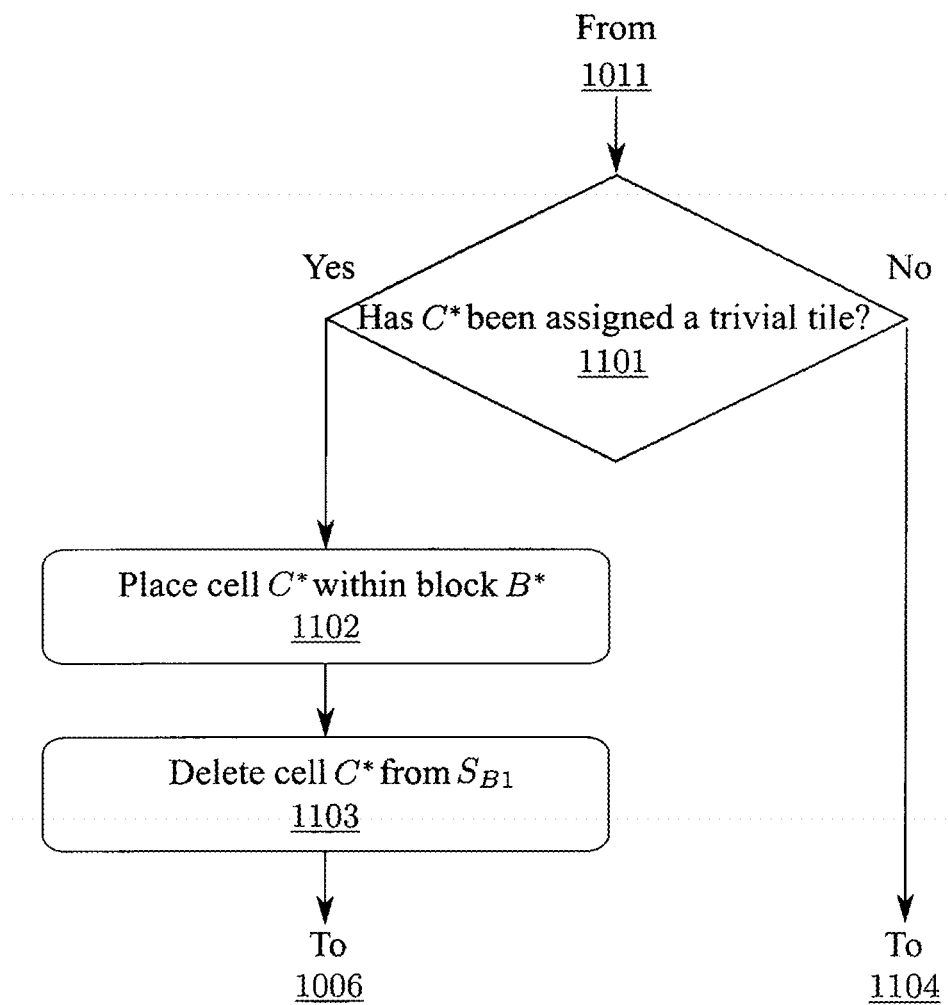
FIG. 11A shows a flow chart representing the third quarter of an illustrative algorithm of how tessellations are constructed in tessellation construction unit 153.
Figure 11B:
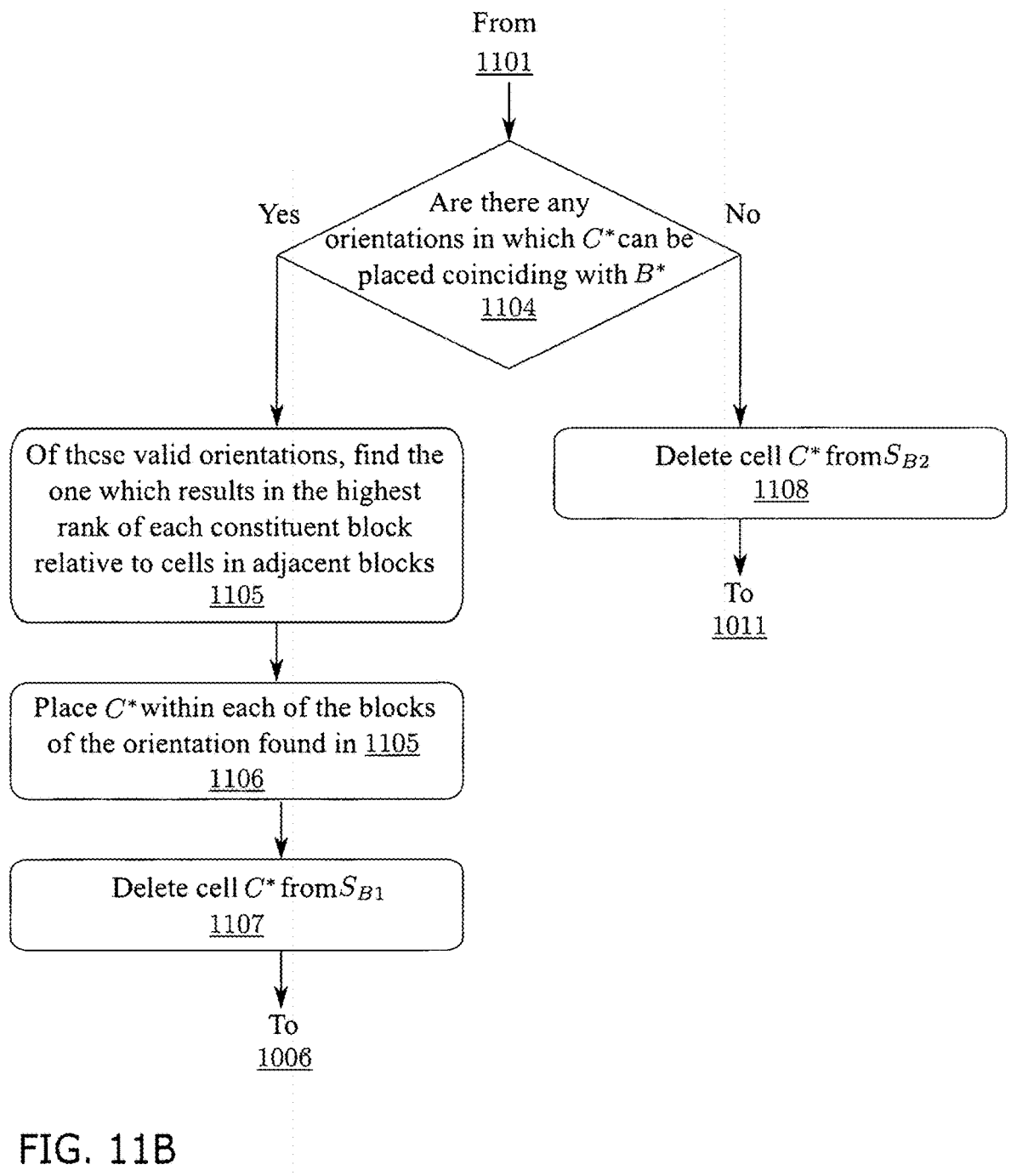
FIG. 11B shows a flow chart representing the last quarter of an illustrative algorithm of how tessellations are constructed in tessellation construction unit 153.
Figure 15:
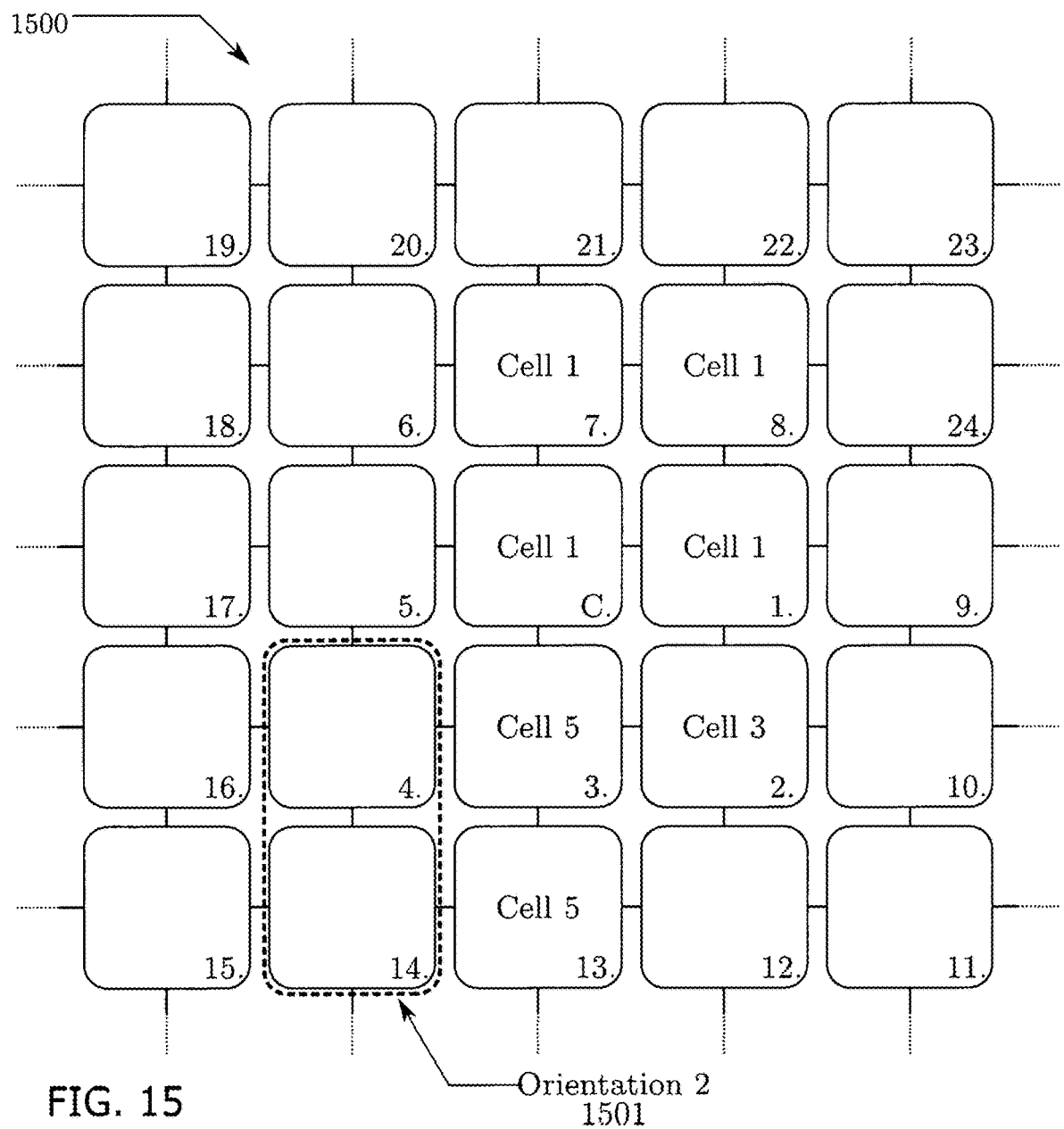
FIG. 15 shows another possible orientation of a double tall tile (designated as Tile 304 in FIG. 3B, and shown in the parts list) in incomplete tessellation shown in FIG. 13B. This figure aids in demonstrating how the illustrative algorithm in FIG. 11 determines the orientations in which a tile can be placed.
Figure 16:
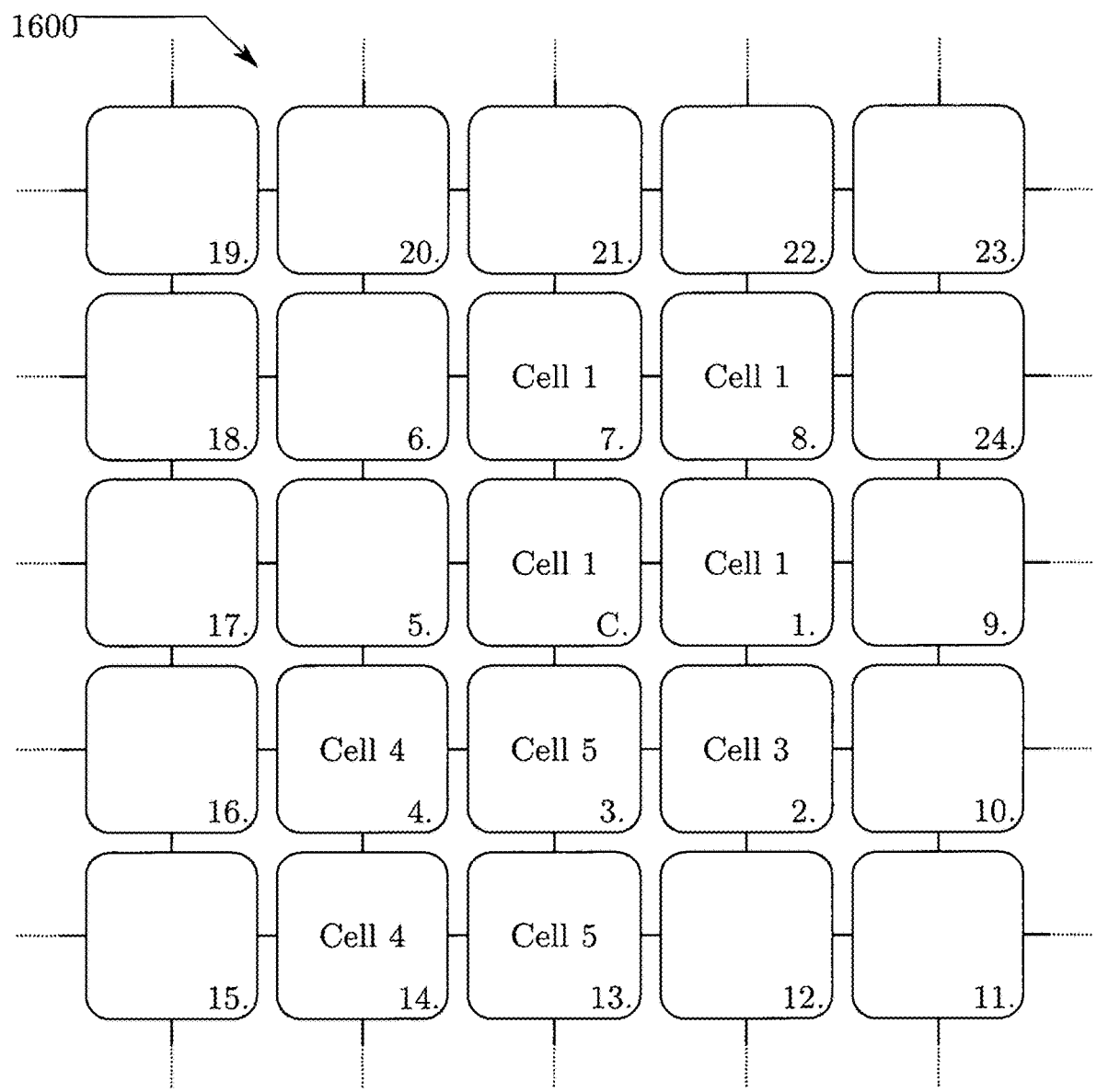
FIG. 16 shows incomplete tessellation shown in FIG. 13B after the construction algorithm has placed a cell in a valid orientation. This figure aids in demonstrating how the illustrative algorithm in FIG. 11 determines the orientations in which a tile can be placed.
Figure 17:
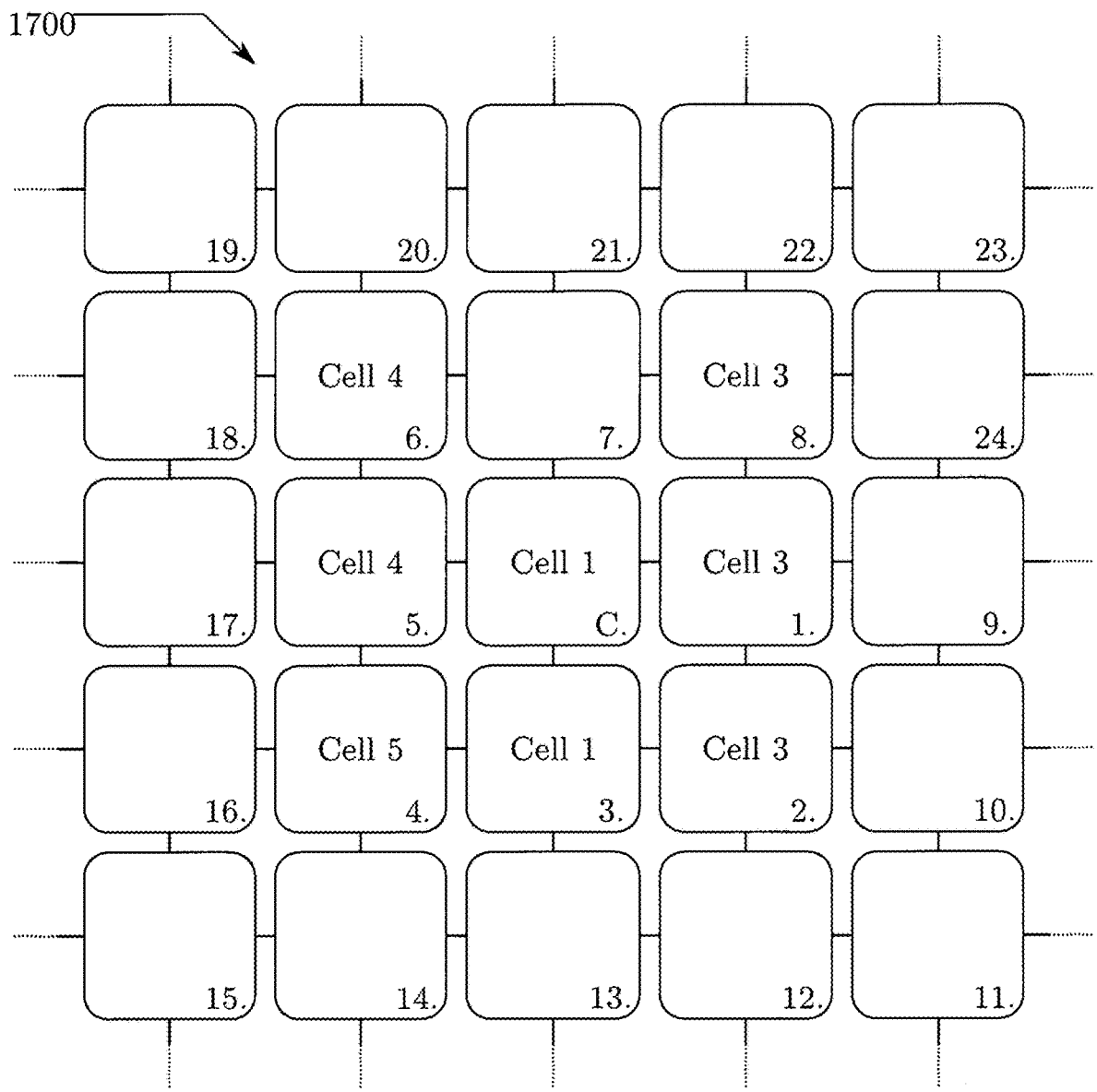
FIG. 17 shows an alternate incomplete tessellation. This figure aids in demonstrating how the illustrative algorithm in FIG. 11 determines the orientations in which a tile can be placed.

FIGS. 11A and 11B (hereafter called FIG. 11) contain node 1101 which determines whether C* has been assigned a trivial tile. If C* has been assigned a trivial tile, it requires only one empty block, B*, for valid placement. As a result, node 1102 places C* within block B*. In order so that cell C* will not be considered for placement in any other block, node 1103 deletes C* from $S_{B1}$. Following the deletion of C* from $S_{B1}$ the algorithm returns to node 1006 in FIG. 10. Alternatively, if C* has not been assigned a trivial tile, then node 1104 will determine whether this tile can be placed within the tessellation in one of its orientations without disturbing an already occupied block. In our example, the algorithm has previously determined that it will attempt to place C*=Cell 4, within block B*=Block 4. In cell vectors table 1301, we can see that Cell 4 has been assigned tile 304 which in FIG. 3 corresponds to a "double tall" polyomino or two blocks arranged vertically. Shown in FIGS. 14 and 15 there are two orientations in which tile 304 can be placed. The first of these orientations, 1401, is shown where Cell 4 would occupy Block 4 and the block immediately above it, Block 5. In FIG. 15 the second of these orientations, 1501, is shown where Cell 4 would occupy Block 4 and the block immediately below it, Block 14. As shown in both FIG. 14 and FIG. 15, neither of the orientations (dashed lines) encloses a block already occupied by a cell, and so are designated as valid orientations. As a result Cell 4 could be placed in either of these valid orientations without disturbing any already occupied blocks. Node 1105 determines which of the valid orientations found in node 1104 will result in the highest cumulative rank of each newly occupied block relative to the blocks connected to it. In other words, node 1104 searches for a valid orientation which will result in the newly occupied blocks being as closely related as possible to the cells contained in the blocks connected to them. In our example, we have seen that both orientation 1401 and orientation 1501 are valid orientations; the algorithm will then determine which of these two orientations will result in a higher total relative ranking of each block in the tessellation. Note in this respect, the only difference between orientations 1401 and 1501 is whether Cell 4 will be placed in Block 14 where, it will be adjacent to Block 13 containing Cell 5, or whether it will be placed in Block 5, where it will be adjacent to the centroid block containing Cell 1. As a result, the algorithm needs only determine whether Cell 4 has a higher rank relative to Cell 1 or Cell 5. In relative ranking matrix 1303 of FIG. 13A one can see that under column header Cell 5, Cell 4 has a rank of 2 while under column header Cell 1, Cell 4 has a rank of 3, meaning that Cell 4 is more closely related to Cell 5. As a result, node 1105 will determine that orientation 1501 will result in a higher total relative ranking for the tessellation generated by summing the relative ranking over all occupied blocks. Next, node 1106 will place C* into the block which corresponds to the valid orientation found in node 1105. In our example, node 1106 will place Cell 4 in the blocks corresponding to orientation 1501 to achieve the highest total relative ranking, which results in the incomplete tessellation shown in FIG. 16. In order so that cell C* will not be considered for placement in any other block, node 1107 deletes C* from $S_{B1}$. Following the deletion of C* from $S_{B1}$, the algorithm returns to node 1006 in FIG. 10.

Figure 18:
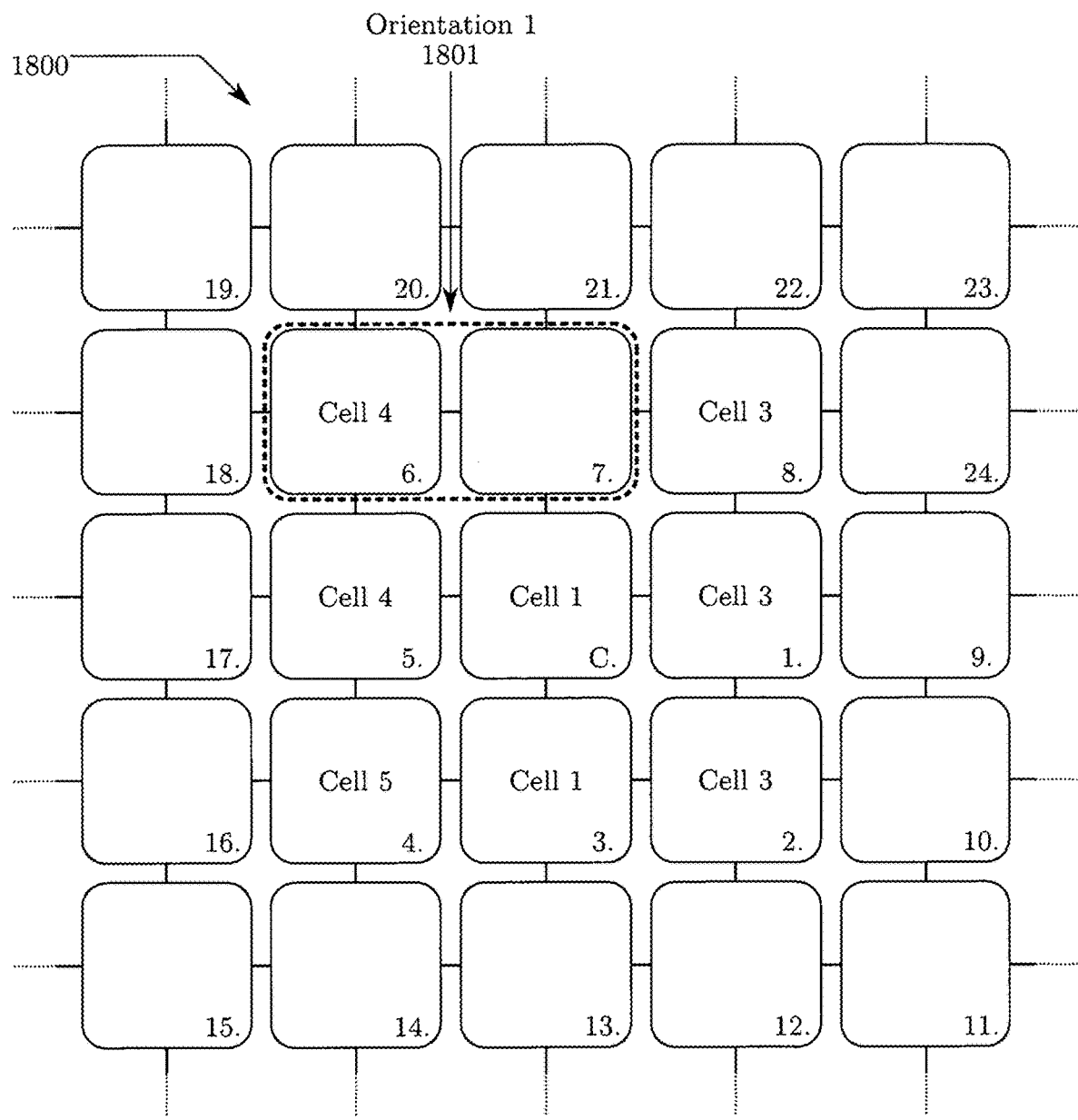
FIG. 18 shows one orientation of a doublewide tile (designated as Tile 302 in FIG. 3B, and shown in the parts list) in the incomplete tessellation shown in FIG. 17. This figure gives an example of an invalid orientation of a tile as it overlaps an occupied block.
Figure 19:
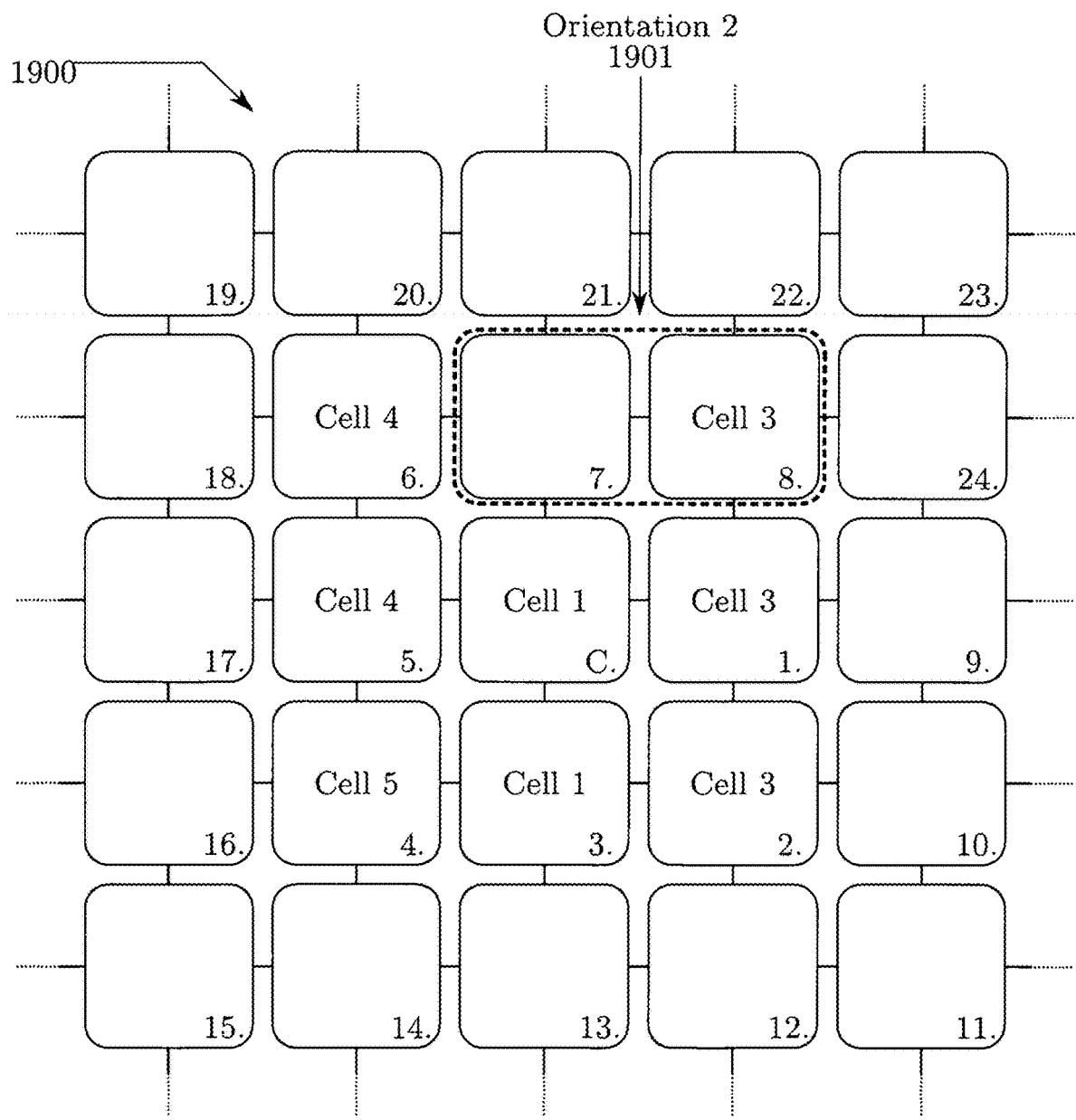
FIG. 19 shows another orientation of a doublewide tile (designated as Tile 302 in FIG. 3B, and shown in the parts list) in the incomplete tessellation shown in FIG. 17. This figure gives another example of an invalid orientation of a tile as it overlaps an occupied block.

In the event that node 1104 cannot find a valid orientation in which it can place C*, node 1108 will delete C* from the collection of cells which the algorithm will consider for placement in B*, $S_{B2}$, and return to node 1011. This is done in order so that another cell can be considered for placement in B*. As we have seen, our previous example allows for the placement of Cell 4 inside the tessellation, so to demonstrate a case where no valid orientation exists, consider the incomplete (as not all cells have been placed) tessellation in FIG. 17. Suppose that in this example node 1008 has chosen B*=Block 7, node 1011 has chosen C*=Cell 2, and Cell 2 has been assigned the "double wide" polyomino tile 302. There are two orientations in which tile 302 can be placed in the tessellation. In FIG. 18 the first of these orientations 1801 is shown. One can see that placing Cell 2 in orientation 1801 would require removing Cell 4 in Block 6 and replacing it with Cell 2, hence it is not a valid orientation. Furthermore in FIG. 19 the second of these orientations 1901 is shown. Here one can see that placing Cell 2 in orientation 1901 would require replacing Cell 3 in Block 8 with Cell 4. Consequently 1901 is not a valid orientation either. Having exhausted all possible orientations in which to place Cell 2, node 1108 would then delete Cell 2 from $S_{B2}$ and return to node 1011. Given the detail with which the operation of tessellation construction unit 153 has been described, a person of middling skill would be able to successfully implement this process in any number of higher level programming languages such as Java or Python.

Figure 25:
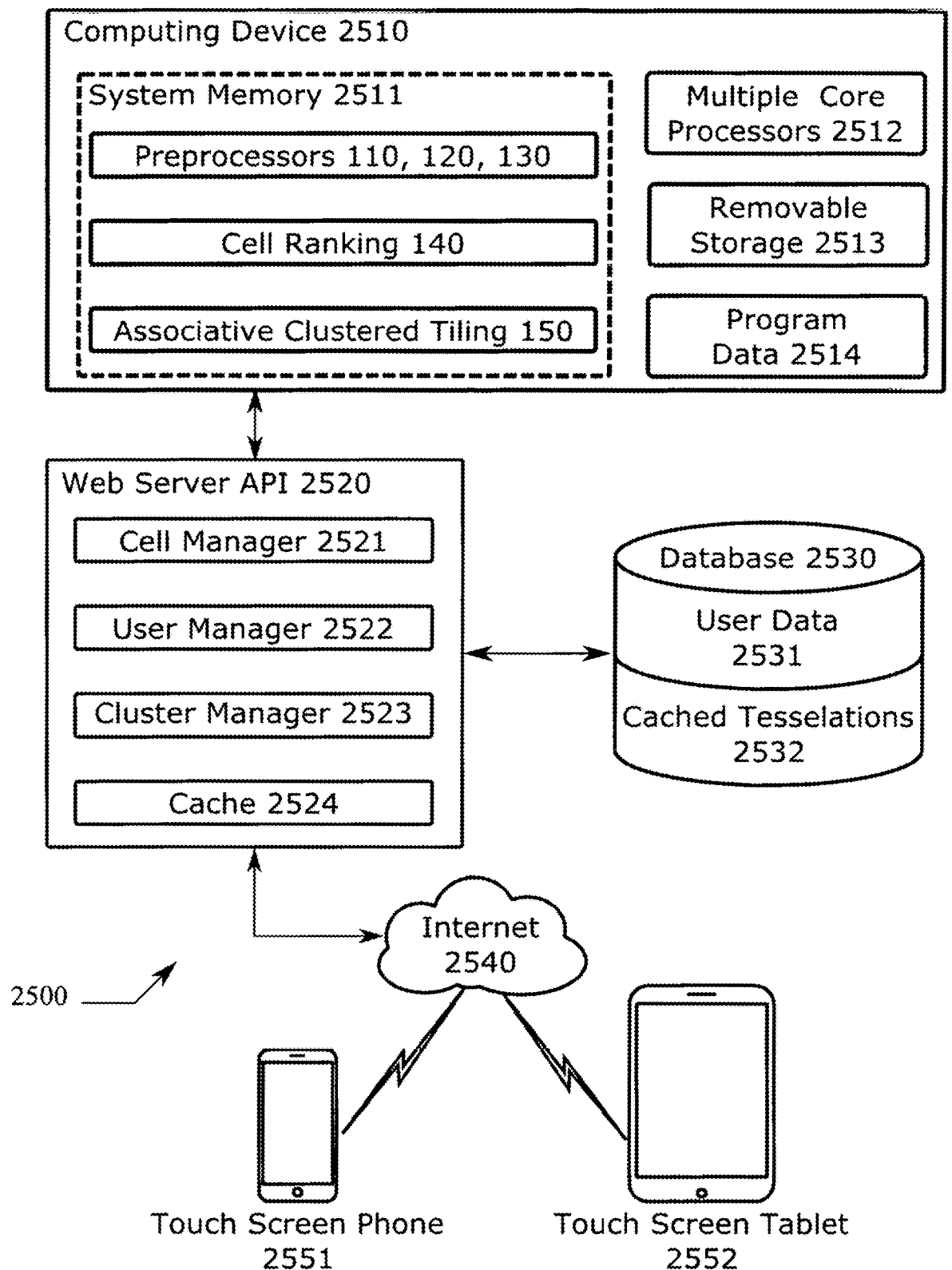
FIG. 25 shows a schematic diagram of an illustrative operating environment with which the information visualization engine depicted in FIGS. 1A and 1B can be implemented.

FIG. 25 shows a schematic diagram of an illustrative operating environment with which the information visualization engine depicted in FIGS. 1A and 1B can be implemented. FIG. 25 shows a computing device 2510 that holds in its system memory, code to implement the function of units 110, 120, 130, 140, and 150. Computing device 2510 also contains: multiple core processors 2512 that provide the computational resources for the visualization system, removable storage 2513 for required applications and operating systems, and program data 2514 that contains all data sources 102, 115, 160, 170, and 180 shown in FIG. 1. The computing device necessary for implementation of the information visualization engine is not proprietary in any way, meaning that a typical "off the shelf" laptop contains more than enough computational resources to accomplished the assigned tasks. FIG. 25 also contains web server API 2520; this is a combination of software and hardware contained on an external "Cloud" server that manages the movement of information between the computing device 2510 and the end users. Web server API 2520 contains: cell manager 2521 (a software unit that manages the manner in which cells are displayed to the end user), user manager 2522 (a software unit that manages the requests that end users make of the visualization engine), cluster manager 2523 (a software unit that manages the delivery of each tessellation to each end user), and cache 2524. Database 2530 is the memory component of 2520. The operation of each of the described units would be obvious to anyone even casually familiar with web API architecture and can be easily implemented with publically available software products and services such as Microsoft Azure. Lastly all information will be distributed to touchscreen phone 2551 or touchscreen tablet 2552 over the Internet 2540. An implementation of those operations described in the previous sections is demonstrated in the next section.

Demonstration and Testing of One Variation of the Invention

Figure 22A:
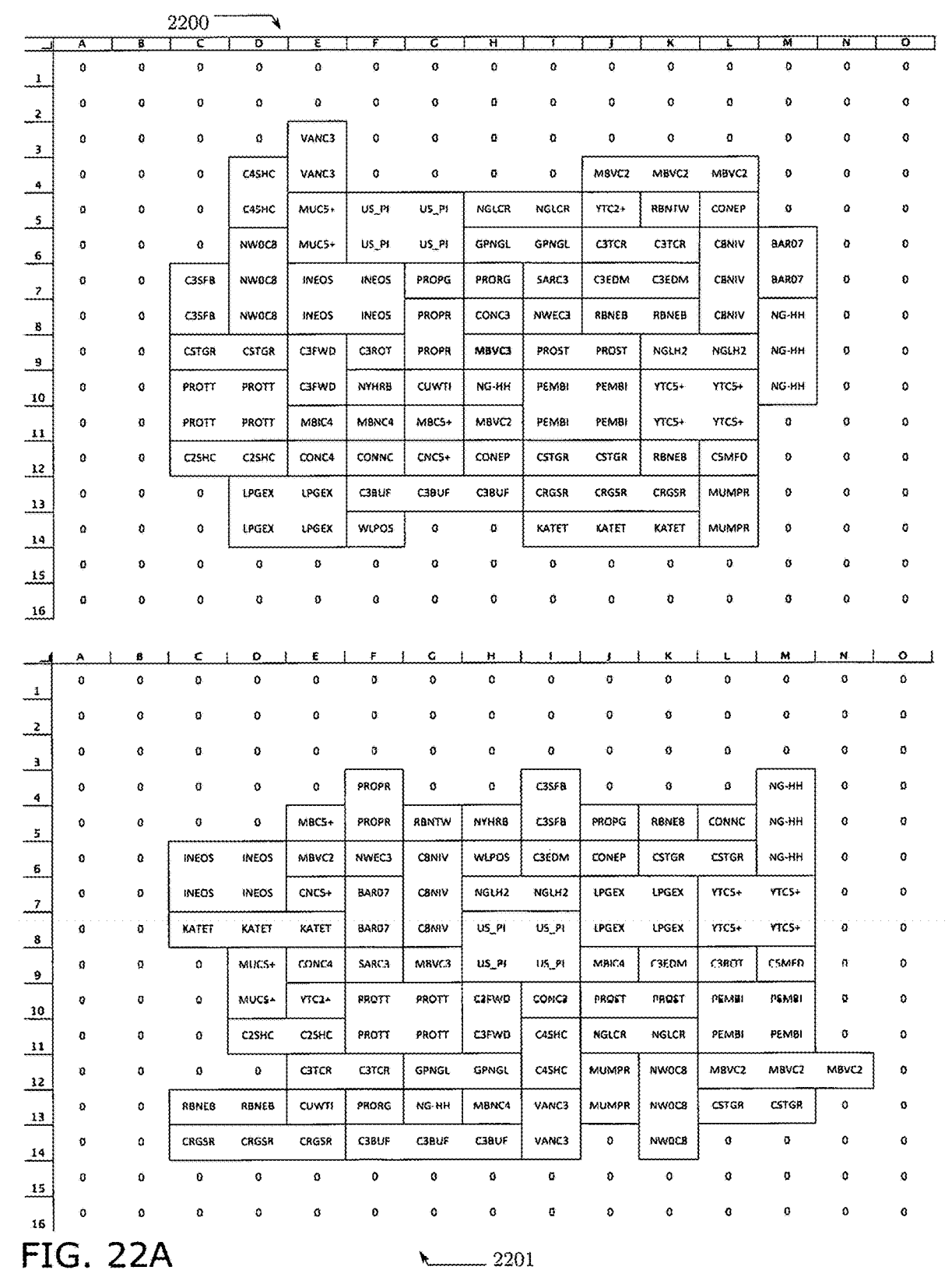

The processes described in the discussion of cell ranking unit 140 and associative clustered tiling unit 150 can be implemented in any number of high level programming languages like python and Java. A demonstration of such an implementation is shown in FIG. 20 through FIG. 24D. It was programmed and executed on a 27 inch Retina 5K IMac. FIG. 20 is an excel file showing the output of the implementation of metadata preprocessor 120 where the contents of 55 cells were analyzed and each was assigned between five and seven keyword attributes, all of which pertain to the oil and gas industry. For example cell MBVC3 (shown in FIG. 20) contains a financial time series of the daily closing price of propane bought and sold at an underground storage facility at Mont Belvieu, Tex. Additionally, shown in FIG. 20, each cell has been assigned a polyomino tile corresponding to those shown in FIG. 3. Note that some cells, e.g. Cell 16, have been assigned fewer than seven keywords where a null value reflects the lack of a keyword attribute. The table in FIG. 20 was then passed to an implementation of the procedures described in the discussion of the distance calculation unit 141 for analysis. Given that the metadata description of each cell consists solely of keywords attributes, the measure of distance applied to this collection of cells by the implementation of distance calculation unit 141 was to subtract the number of keyword tags which any two cells share from seven, the maximum number of keyword assigned to any cell (accounting for null values), and then dividing this difference by seven. A table containing these distances was passed to an implementation of augmented distance unit 142 which determined that due to the high number of cells and the frequency of the keywords assigned to all cells, the distance calculation should be augmented to reflect the frequency of assigned keywords. This was done so that cells sharing keywords tags that are less frequent (or rare) in FIG. 20 should be considered closer or more strongly related than two cells that share keywords that are more frequent (or common). Based on this determination, augmented distance unit 142 implemented a pre-defined weighted distance measure to account for these frequencies. An excerpt of the excel file output of the implementation of the described procedure is shown in FIG. 21A where the numerical values represent the augmented distance separating the cells listed in the row and column headings of the table in FIG. 21A. The table shown in FIG. 21A was then passed to the implementation of the procedures described in the discussion of exhaustive partial orderings/rankings unit 143 for analysis. Here, a ranking of all cells relative to each "target cell" was constructed; an excerpt of the excel file output is shown in FIG. 21B. At this point both the table in FIG. 20, containing the tiles assigned to each cell, and the ranking table (an excerpt of which is shown in FIG. 21B) was passed to an implementation of the procedures described in the discussion of associative clustered tiling unit 150. Here, in centroid selection unit 151, information would be solicited from the user in order to determine the appropriate centroid cell. For example the user would be shown a list of keywords on his touch screen device, and asked to select three that most closely reflect his current interest. Centroid selection unit would select the cell in FIG. 20 that most closely matched those keywords provided by the user, for example if the selected cell was the only one assigned all of the keyword tags provided by the user. After the centroid cell would have been selected, an implementation of the procedures described in the discussion of pre-tiling area designation unit 152 found that no area within the following tessellation need be pre-designated. Finally, all current data was passed to an implementation of the procedures detailed in FIG. 10 and FIG. 11 where tessellations for a selected group of centroid cells: MBVC3, US_PI, INEOS, and C3FWD was constructed. The excel file output of this implementation is shown in FIG. 22A, and FIG. 22B as finished tessellations having centroids; MBVC3, US_PI, INEOS, and C3FWD respectively (shown as bold text in those figures). Note that in each of these, cells are displayed in the tile orientation assigned to it in FIG. 20 as shown graphically in FIG. 3.

Figure 23A:
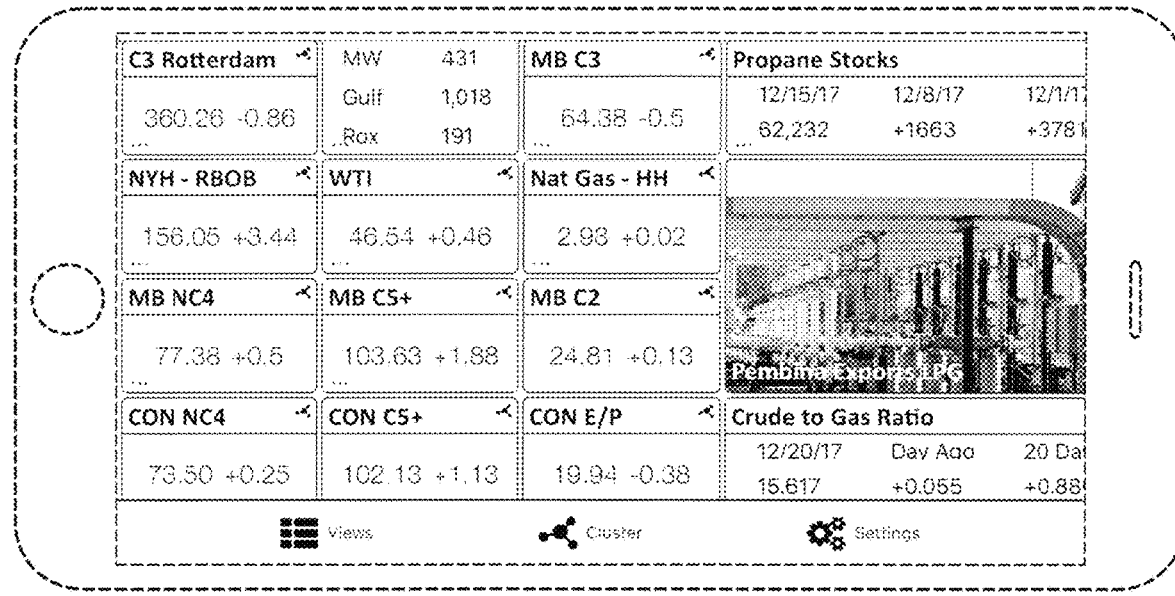
FIG. 23A shows a screen shot taken on an Apple iPhone 8 Plus in landscape mode showing how the tessellation shown in the top portion (2200) of FIG. 22A is presented to a user on a touch screen mobile device.
Figure 23B:
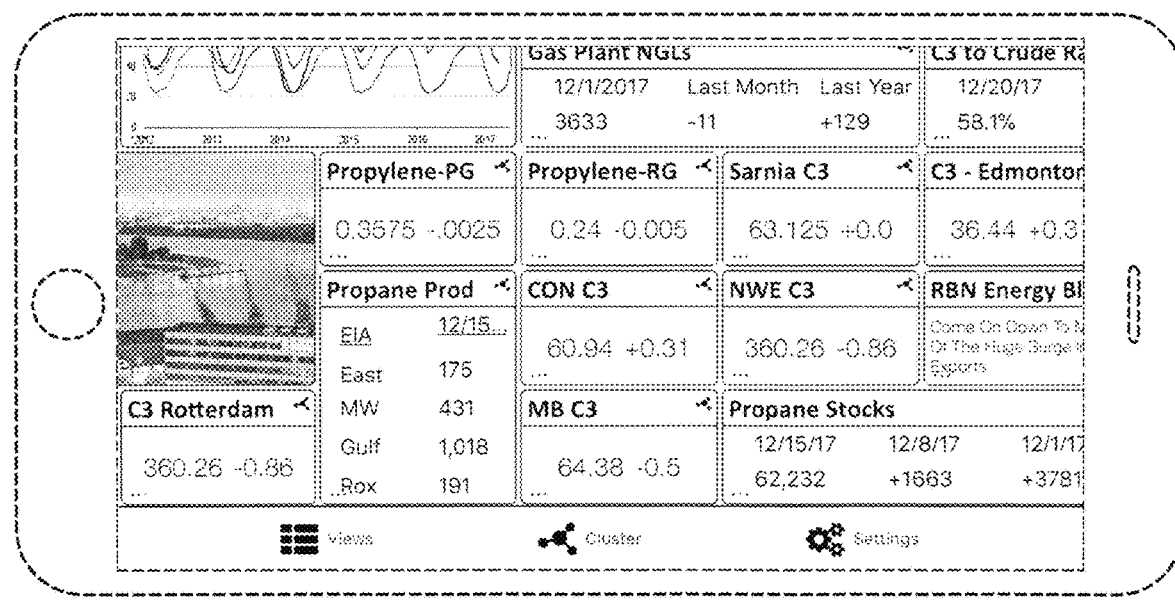
FIG. 23B shows a screen shot taken on an Apple iPhone 8 Plus in landscape mode showing how the tessellation shown in the top portion (2200) of FIG. 22A is presented to a user on a touch screen mobile device.
Figure 23C:
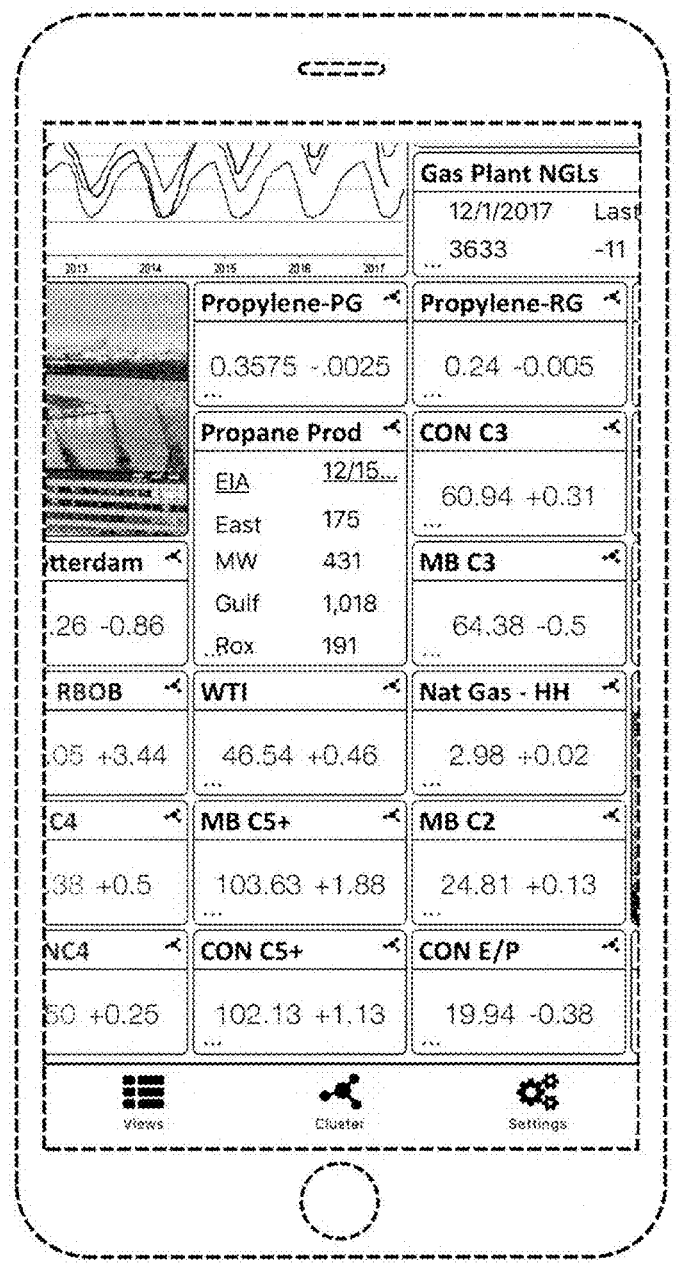
FIG. 23C shows a screen shot taken on an Apple iPhone 8 Plus in portrait mode showing how the tessellation shown in the top portion (2200) of FIG. 22A is presented to a user on a touch screen mobile device.
Figure 23D:
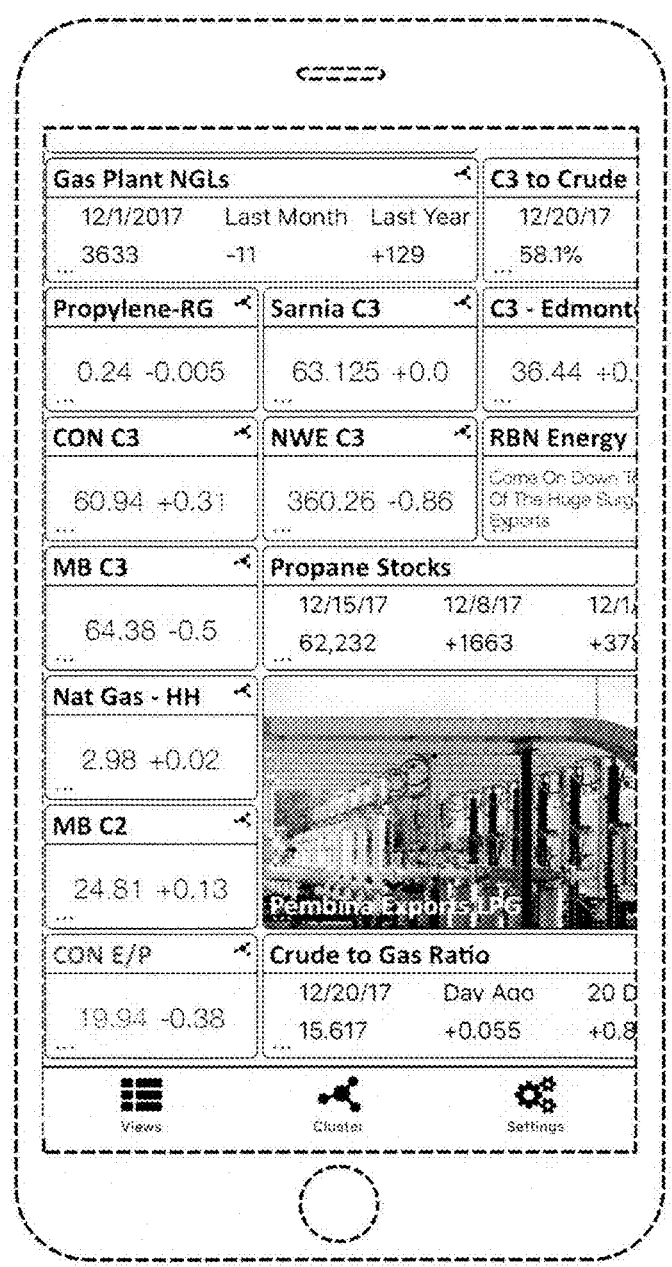
FIG. 23D shows a screen shot taken on an Apple iPhone 8 Plus in portrait mode showing how the tessellation shown in the top portion (2200) of FIG. 22A is presented to a user on a touch screen mobile device.
Figure 24A:
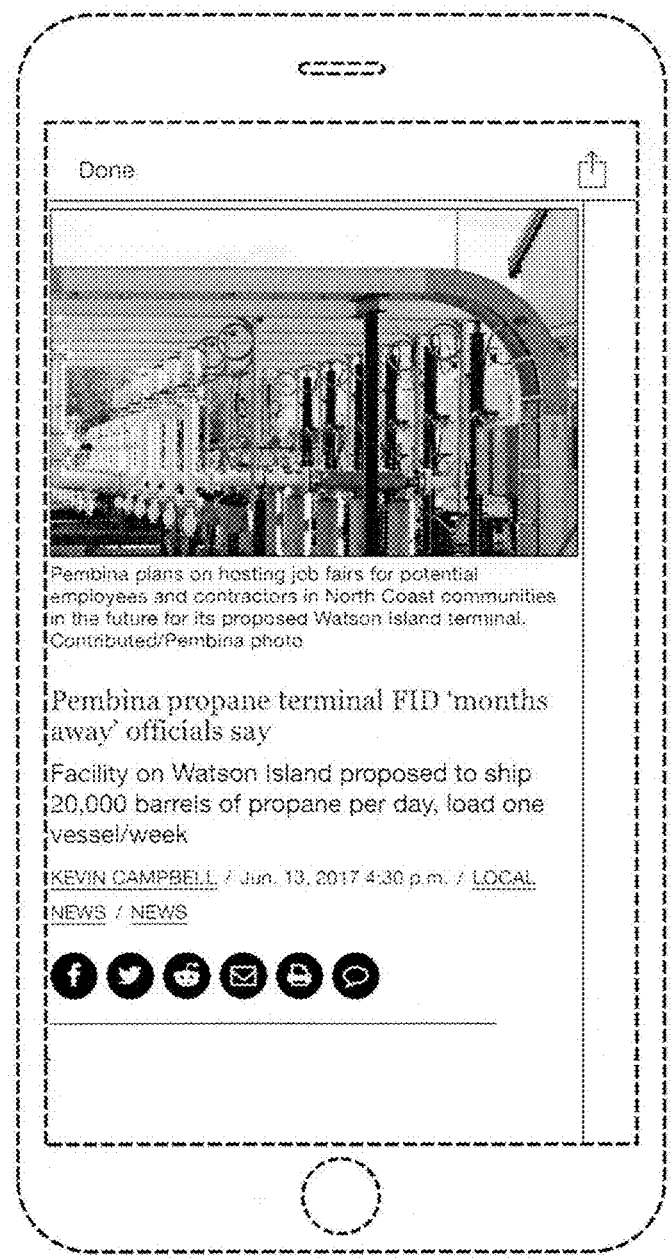
FIG. 24A/B/C/D. show a collection of sample modal views that correspond to surface views shown in FIG. 23. This figure shows an element of one implementation of the information visualization system discussed herein.

After the requested tessellation is completed within the tessellation construction unit 153 and stored in tessellated data 180, it was digitally delivered to the inventor's touch-screen phone via the Internet in accordance with FIG. 25. FIG. 23A through FIG. 24D are screen shots taken on the author's Apple iPhone 8 plus of an app, distributed by the Apple app store, showing an example of how a finished tessellation, in one version of the invention, looks to the end user in landscape and portrait mode respectively. FIG. 24, is a collection of modal views, also screen shots from the authors iPhone 8 plus, corresponding to surface view of four tiles shown in FIG. 23. In particular this tessellation is the tessellation 2200 shown at the top of FIG. 22A meaning that the structure and organization are identical in both. The centroid of the tessellation presented in FIG. 23, "MB C3", which is the same as "MBVC3" in FIG. 20 through FIG. 22B, is the spot price for propane delivered at an underground storage facility in Mont. Belvieu, Tex. If the user selects the surface view of this cell, by pressing firmly on this surface view she will be presented with the model view of that cell shown in FIG. 24B. Similarly, the user will be presented with modal view FIG. 24C or FIG. 24D if the user selects (in FIG. 23C) the surface view of the cells entitled "WTI" or "Propane Prod" respectively. In FIG. 23A one can see a tile in the right edge displaying a picture of various piping and valves entitled "Pembina Exports LPG". If the user selects this surface view, she will be presented with an article discussing this topic as shown in FIG. 24A.

This implementation was shown to work at 2323 S. Shepherd Dr. Suite 1010 Houston, Tex. 77019 and witnessed by E. Rusty Braziel.

DESCRIPTION—PREFERRED EMBODIMENT

See the above Demonstration and Testing.

Additional Embodiments (and/or Alternative Embodiments)

The invention is applicable for the organization and display of essentially any informational dataset where any individual data element has measurable relationships to all other data elements. Such datasets could include:
  a. Search results from an internet-based collection engine
  b. Pre-defined variables with periodically updated values (such as sport scores and statistics, political polling results, government economic statistics, and commodity market supply/demand data)
  c. Data from process control and automation systems (such as plant operating systems and machinery control systems)
  d. Continuously changing market data (such as stock prices and commodity prices)

CONCLUSIONS, RAMIFICATIONS AND SCOPE

A number of changes are possible to the methods, parts, uses, etc. described above while still remaining within the scope and spirit of the invention. The specifics about the form and use of the invention described in this application (including the specifics in the Background, Field, Related Art, Summary, Purposes and Advantages, Abstract, Preferred Embodiment, [[Additional Embodiments, and Alternative Embodiments[[, Descriptions of the Drawings, etc.) are examples and are not intended to be limiting in scope. Those skilled in the art will recognize certain variations, modifications, permutations, additions, subtractions and sub-combinations thereof, and may discover new fields of use. The scope of the invention is to be determined by the claims and their legal equivalents, not the examples, purposes, summary, preferred embodiments, alternative or additional embodiments, operation, tests, parameters, or limitations etc. given above. It is intended that the claims are interpreted to include all such variations, modifications, additions, subtractions, permutations and sub-combinations as are within their true spirit and scope, including those which may be recognized later by those skilled in the art.

Aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

We claim:

1. A method for information visualization designed to (a) dynamically organize the information via associative clustered tiling and tessellation, and then to (b) present instantly addressable and accessible said information content via an electronic user interface, including mobile devices such as touch screen cellular phones, and tablets, comprising the steps of (i) inputting structured data and unstructured data into an initial preprocessor, (ii) inputting data from the initial preprocessor into a metadata preprocessor, (iii) inputting proprietary data into a portion of the metadata preprocessor, (iv) inputting data from the initial preprocessor into a display data preprocessor, (v) inputting data from the metadata preprocessor into a cell ranking processor, (vi) inputting data from the display data preprocessor into an associative clustered tiling processor subject to user direction, (vii) exchanging archived data with portions of the cell ranking processor, (viii) outputting data from the cell ranking processor subject to user direction into the associative clustered tiling processor, and (ix) inputting user/proprietary data, into the pre-tiling area designation processor in the associative clustered tiling processor, and (x) outputting data from the associative clustered tiling processor as tessellated data for display on said electronic user interface.

2. A system and method for information visualization designed to (a) dynamically organize the information via associative clustered tiling and tessellation, and then to (b) present visually, instantly addressable and accessible said information content via an electronic user interface, including mobile devices such as touch screen cellular phones, and tablets, wherein, the system comprises computer-readable storage media storing computer-readable instructions which, when executed, instruct one or more processors to execute the organization and presentation in step (a) and (b), wherein the system and method further comprise a computing device including an initial preprocessor, a metadata preprocessor, a data display preprocessor, a cell ranking processor and an associative clustered tiling processor, wherein the computing device outputs data to a webserver API, which is capable of exchanging data with a database containing user data, and cashed tessellations, and which server contains a cell manager, a user manager, a cluster manager and cache, and which server sends information via the internet to a touch screen phone, or a touch screen tablet, or other user interface.

3. The system of claim 2, wherein the initial preprocessor comprises a data division processor and a cell construction processor.

4. The system of claim 2, wherein the metadata preprocessor comprises a metadata tag extraction processor, a metadata tag addition/removal processor, and a statistical analysis processor.

5. The system of claim 2, wherein the display data preprocessor comprises a display data division processor, a surface view processor, a modal view processor, a tessellation scheme designation processor, and a tile assignment processor.

6. The system of claim 2, wherein the cell ranking processor comprises a distance calculation processor, an augmented distance processor, and an exhaustive partial orderings/rankings processor.

7. The system of claim 2, wherein the associative clustered tiling processor comprises a centroid selection processor, a pre-tiling area designation processor, and a tessellation construction processor.

8. The computing device of claim 2, further comprising multiple core processors, removable storage and program data.

9. A method for constructing tessellations in a tessellation construction unit of a system and method for information visualization, comprising inputting information from a display data preprocessor and a cell ranking unit to populate a basic tessellation according to a scheme assigned by a tessellation scheme designation unit, with tiles assigned by a tile assignment unit, wherein the relationship between cells occupying adjacent (connected) blocks is as strong (or close) as possible.

* * * * *